(12) United States Patent
Okumura et al.

(10) Patent No.: US 8,556,239 B2
(45) Date of Patent: Oct. 15, 2013

(54) FLUID FILLED TYPE VIBRATION DAMPING DEVICE

(75) Inventors: Kei Okumura, Kakamigahara (JP); Yasuhiro Komiya, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 751 days.

(21) Appl. No.: 12/673,773

(22) PCT Filed: Jun. 22, 2009

(86) PCT No.: PCT/JP2009/002839
§ 371 (c)(1),
(2), (4) Date: Feb. 17, 2010

(87) PCT Pub. No.: WO2010/001543
PCT Pub. Date: Jan. 7, 2010

(65) Prior Publication Data
US 2010/0201053 A1    Aug. 12, 2010

(30) Foreign Application Priority Data

Jun. 30, 2008  (JP) ................................ 2008-171094
Jun. 30, 2008  (JP) ................................ 2008-171096
Jun. 30, 2008  (JP) ................................ 2008-171277

(51) Int. Cl.
*F16F 5/00* (2006.01)
(52) U.S. Cl.
USPC .................................................. 267/140.13
(58) Field of Classification Search
USPC ......................... 267/140.11–140.13, 219, 141
See application file for complete search history.

(56) References Cited

U.S. PATENT DOCUMENTS

| | | | |
|---|---|---|---|
| 5,443,245 A * | 8/1995 | Bellamy et al. | 267/140.13 |
| 5,769,402 A | 6/1998 | Ide et al. | |
| 7,516,947 B2 * | 4/2009 | Hatakeyama et al. | 267/140.13 |
| 2006/0001204 A1 | 1/2006 | Kato et al. | |
| 2006/0097436 A1 * | 5/2006 | Yamamoto | 267/140.12 |

(Continued)

FOREIGN PATENT DOCUMENTS

| | | |
|---|---|---|
| JP | A 6-307491 | 11/1994 |
| JP | A 2001-99222 | 4/2001 |

(Continued)

OTHER PUBLICATIONS

International Search Report issued for International Application No. PCT/JP2009/002839 on Sep. 9, 2008 (w/ translation).

(Continued)

*Primary Examiner* — Melanie Torres Williams
(74) *Attorney, Agent, or Firm* — Oliff & Berridge, PLC

(57) ABSTRACT

A fluid filled type vibration damping device including: an obstructing rubber elastic plate disposed so as to obstruct a communication aperture that connects a pressure receiving chamber and an equilibrium chamber; contact retaining portions arranged on an outer peripheral edge of the rubber plate and held in contact against a partition member; an elastic deformation zone arranged circumferentially between the contact retaining portions of the rubber plate so as to undergo elastic deformation on a basis of pressure differential between the pressure receiving chamber and the equilibrium chamber to be spaced away from the partition member to cause the aperture to open up; and a non-linearizing member provided such that the elastic characteristics of the elastic deformation zone become more rigid in a non-linear manner in association with increase in an amount of its deformation.

16 Claims, 30 Drawing Sheets

(56) References Cited

U.S. PATENT DOCUMENTS

| | | |
|---|---|---|
| 2007/0013115 A1 | 1/2007 | Katagiri et al. |
| 2008/0023897 A1 | 1/2008 | Muraoka |
| 2009/0140476 A1 | 6/2009 | Michiyama et al. |
| 2009/0140477 A1 | 6/2009 | Michiyama |

FOREIGN PATENT DOCUMENTS

| | | |
|---|---|---|
| JP | A 2002-310223 | 10/2002 |
| JP | A 2005-98331 | 4/2005 |
| JP | A 2005-351350 | 12/2005 |
| JP | A 2006-17134 | 1/2006 |
| JP | A 2006-57727 | 3/2006 |
| JP | A 2007-46777 | 2/2007 |
| JP | A-2007-120563 | 5/2007 |
| JP | A 2007-120607 | 5/2007 |
| JP | A 2007-311749 | 11/2007 |
| JP | A 2008-2618 | 1/2008 |
| JP | A 2008-32055 | 2/2008 |
| JP | A 2009-133455 | 6/2009 |
| WO | WO 2006/040809 A1 | 4/2006 |

OTHER PUBLICATIONS

International Preliminary Report on Patentability issued in International Patent Application No. PCT/JP2009/002839 dated Feb. 8, 2011.

Oct. 19, 2011 Office Action issued in Chinese Patent Application No. 200980103089.1 (with partial translation).

Sep. 18, 2012 Office Action issued in Japanese Patent Application No. 2008-171094 (with partial translation).

* cited by examiner

FLUID FILLED TYPE VIBRATION DAMPING DEVICE

TECHNICAL FIELD

The present invention relates to a fluid filled type vibration damping device adapted to utilize vibration damping effect based on the flow action of a non-compressible fluid sealed therein.

BACKGROUND ART

Vibration damping devices such as vibration damping linkages or vibration damping supports have been used to be interposed between components that make up a vibration transmission system. One type of known device is a vibration damping device having a first mounting member and a second mounting member linked by a main rubber elastic body, and a fluid filled type vibration damping device is a developed type thereof. This fluid filled type vibration damping device includes a pressure receiving chamber whose wall is partially defined by a main rubber elastic body; and an equilibrium chamber whose wall is partially defined by a flexible film, the two chambers being filled with a non-compressible fluid, and the two chambers communicating with each other through an orifice passage. This construction can exhibit vibration damping effect during vibration input to the pressure receiving chamber due to resonance or other flow action of the fluid induced to flow through the orifice passage on the basis of pressure differential between the pressure receiving chamber and the equilibrium chamber. The application of such fluid filled type vibration damping devices in automotive engine mounts, body mounts, differential mounts, suspension mounts, and suspension bushings for example, is a topic of ongoing research.

In an application such as an automotive engine mount, respective vibration damping effects against vibrations in multiple frequency ranges are required. To meet this requirement, in general, there have been proposed a construction in which an orifice passage is tuned to low-frequency, large-amplitude vibration such as engine shake while a movable film is provided for absorbing pressure fluctuations in a pressure receiving chamber to cope with high-frequency, small-amplitude vibration such as driving rumble.

Additionally, in recent years, an application such as an automotive engine mount has a problem of occurrence of vibration or noise during input of excessive vibration load or jarring load. This is thought to be caused mainly by cavitation bubbles in association with excessive negative pressure arising in the pressure receiving chamber. Specifically, when large-amplitude vibration is input to induce a condition of excessive negative pressure in the pressure receiving chamber, the air dissolved in the fluid of the pressure receiving chamber undergoes liquid phase separation to form cavitation bubbles. It is conceivable that water hammer pressure accompanying bursts of the bubbles will be propagated through the first mounting member and the second mounting member and transmitted to components such as the car body that make up a vibration transmission system, producing noise or vibration which can be a problem.

In order to address this problem, in Patent Citation 1 (Japanese Patent Application No. 2007-311749), the Applicant proposed a novel structure in which a partition member that partitions a pressure receiving chamber and an equilibrium chamber is provided with a communication passage connecting the two chambers, and an obstructing rubber elastic plate is superposed against the communication passage from a pressure receiving chamber side so as to obstruct the communication passage, thereby defining controlling means for opening/closing the communication passage. With this structure, when a sudden pressure drop occurs in the pressure receiving chamber during input of excessive vibration load or jarring load, the obstructing rubber elastic plate undergoes elastic deformation to be spaced away from the partition member to place the communication passage in the open state. The pressure receiving chamber and the equilibrium chamber are then short circuited, whereby negative pressure can be prevented from arising in the pressure receiving chamber. Moreover, the obstructing rubber elastic plate can exhibit vibration damping effect against high-frequency, small-amplitude vibration by absorbing pressure fluctuations through elastic deformation with the communication passage closed.

Research conducted by the inventors as to the fluid filled type vibration damping device disclosed in Patent Citation 1 led to the idea that there is clearly room for further improvement. Specifically, with the opening/closing control means disclosed in Patent Citation 1, during input of vibration such as engine shake, the obstructing rubber elastic plate that covers the communication passage undergoes elastic deformation on the basis of pressure differential between front and back sides thereof and pressure in the pressure receiving chamber will be absorbed in association with the elastic deformation. There is a consequent risk that the amount of fluid flow through the orifice passage will decrease, making it difficult to achieve sufficient vibration damping effect against low-frequency, large-amplitude vibration exhibited by the orifice passage.

To cope with this problem, it would be conceivable to endow the obstructing rubber elastic plate with greater elastic rigidity. However, this arrangement poses a problem that pressure fluctuations in the pressure receiving chamber may not be reduced during input of high-frequency, small-amplitude vibration such as driving rumble, causing deterioration of vibration damping ability against high-frequency, small-amplitude vibration.

That is, in some instances, the fluid filled type vibration damping device disclosed in Patent Citation 1 cannot be sufficient to meet the requirements of achieving both of (i) vibration damping effect against low-frequency, large-amplitude vibration exhibited by the orifice passage and (ii) vibration damping effect against high-frequency, small-amplitude vibration exhibited by elastic deformation of the obstructing rubber elastic plate, and further achieving (iii) inhibition of impact or noise caused by pressure fluctuations in the pressure receiving chamber in association with input of excessive vibration.

PRIOR ART DOCUMENT

Patent Citation

Patent Citation 1: Japanese Patent Application No. 2007-311749

SUMMARY OF THE INVENTION

Problem the Invention Attempts to Solve

With the foregoing in view, it is accordingly one object of the present invention to provide a fluid filled type vibration damping device of improved structure in comparison with the earlier application (Patent Citation 1) that is further effectively capable of: (i) ensuring sufficient vibration damping effect against low-frequency, large-amplitude vibration exhibited by the orifice passage; (ii) improving vibration damping effect against high-frequency, small-amplitude vibration; and (iii) inhibiting impact or noise during input of excessive vibration.

Means for Solving the Problem

The above objects of this invention may be attained according to at least one of the following modes of the invention. The following elements employed in each mode of the invention described below may be adopted at any possible optional combinations.

First Mode of the Invention

Specifically, the first mode of the present invention provides a fluid filled type vibration damping device including: a first mounting member and a second mounting member linked by a main rubber elastic body; a pressure receiving chamber whose wall is partially defined by the main rubber elastic body; an equilibrium chamber whose wall is partially defined by a flexible film, the pressure receiving chamber and the equilibrium chamber being filled with a non-compressible fluid, and the pressure receiving chamber and the equilibrium chamber communicating with each other through an orifice passage, the fluid filled type vibration damping device being characterized in that a partition member that partitions the pressure receiving chamber and the equilibrium chamber is provided with a communication aperture that connects the pressure receiving chamber and the equilibrium chamber; an obstructing rubber elastic plate is superposed against the communication aperture from a pressure receiving chamber side so as to obstruct the communication aperture, and is arranged such that pressure of the pressure receiving chamber acts upon a first face of the obstructing rubber elastic plate while pressure of the equilibrium chamber acts on another face thereof through the communication aperture; a plurality of contact retaining portions that are held in contact against the partition member are arranged circumferentially on an outer peripheral edge of the obstructing rubber elastic plate; an elastic deformation zone is arranged circumferentially between the contact retaining portions adjacently situated on the obstructing rubber elastic plate, so as to undergo elastic deformation on a basis of pressure differential between the pressure receiving chamber and the equilibrium chamber to be spaced away from the partition member to cause the communication aperture to open up; and a non-linearizing member is provided to endow non-linear elastic characteristics on the elastic deformation zone of the obstructing rubber elastic plate such that the elastic characteristics become more rigid in a non-linear manner in association with increase in an amount of elastic deformation of the elastic deformation zone.

According to the first mode, a non-linearizing member is provided so that the elastic characteristics become more rigid in a non-linear manner in association with increase in the amount of elastic deformation of the elastic deformation zone of the obstructing rubber elastic plate. The term "non-linear" herein refers to a state wherein increase in spring constant with respect to increase in the amount of elastic deformation of the elastic deformation zone changes appreciably compared to proportional relation. The mode of change is not limited in particular, but includes: changing sharply from a certain change amount in a polyline; changing two-dimensionally or multidimensionally; and changing in a stepwise manner with multiple steps.

Consequently, during input of small-amplitude vibration where pressure differential between the front and back sides of the obstructing rubber elastic plate is small, the elastic deformation zone undergoes elastic deformation relatively easily due to soft spring characteristics of the obstructing rubber elastic plate. Accordingly, the pressure receiving chamber exhibits pressure absorbing effect on the basis of elastic deformation action of the obstructing rubber elastic plate, thereby effectively achieving vibration damping effect against high-frequency, small-amplitude vibration. Moreover, in some instances, the obstructing rubber elastic plate will be spaced away from the partition member so as to open up the communication aperture. The pressure receiving chamber and the equilibrium chamber will short-circuit thereby, exhibiting a similar effect.

On the other hand, during input of low-frequency, large-amplitude vibration within the tuning frequency range of the orifice passage where pressure differential between the front and back sides of the obstructing rubber elastic plate is large, the obstructing rubber elastic plate deforms appreciably. Accordingly, the deformation reaches a zone where spring characteristics of the elastic deformation zone of the obstructing rubber elastic plate sharply become rigid in a non-linear manner, so that further elastic deformation and opening of the communication aperture in association with the elastic deformation will be limited. As a result, pressure leakage from the pressure receiving chamber through communication aperture will be inhibited, producing pressure fluctuations in the pressure receiving chamber effectively. Therefore, a sufficient amount of fluid flow will be ensured, thereby achieving vibration damping effect based on resonance action or other flow action of the fluid through the orifice passage.

Additionally, when an excessive or sharp vibration load is input and the pressure in the pressure receiving chamber has considerably dropped, even if the spring characteristics of the elastic deformation zone of the obstructing rubber elastic plate are made rigid in a non-linear manner, a pressure that is enough to deform the obstructing rubber elastic plate will act on the elastic deformation zone. As a result, the entire elastic deformation zone undergoes appreciable elastic deformation, causing the communication aperture to widely open up, so that the pressure receiving chamber and the equilibrium chamber will be short-circuited. This makes it possible to avoid or rapidly dispel excessive negative pressure in the pressure receiving chamber, being capable of preventing noise or vibration that are thought to be caused by cavitation.

Therefore, the fluid filled type vibration damping device of construction according to the present invention is able to effectively achieve all of above-mentioned effects, namely, (i) ensuring sufficient vibration damping effect against low-frequency, large-amplitude vibration exhibited by the orifice passage; (ii) improving vibration damping effect against high-frequency, small-amplitude vibration; and (iii) inhibiting impact or noise during input of excessive vibration.

Second Mode of the Invention

The second mode of the present invention provides the fluid filled type vibration damping device according to the first mode, wherein a center mounting portion is integrally formed in a center section of the obstructing rubber elastic plate; the center mounting portion is securely attached to the partition member; at least one spoke-shaped retaining portion that extends radially from the center mounting portion towards an outer peripheral side is provided; and the contact retaining portions are provided so as to extend in the circumferential direction from a distal end portion of the spoke-shaped retaining portion. According to the second mode, fastening force of the center mounting portion to the partition member will be transmitted to each of the contact retaining portions via a plurality of the spoke-shaped retaining portions and act as contact retaining force. Thus, the outer peripheral edge of the obstructing rubber elastic plate can be held in a state of contact effectively against the partition member.

Third Mode of the Invention

The third mode of the present invention provides the fluid filled type vibration damping device according to the first mode, wherein the center mounting portion is integrally formed in the center section of the obstructing rubber elastic plate; the center mounting portion is securely attached to the partition member; the spoke-shaped retaining portion that extends radially from the center mounting portion towards the outer peripheral side is provided; a circumference retaining portion that extends in the circumferential direction from a distal end portion of the spoke-shaped retaining portion is provided; and in the obstructing rubber elastic plate, spring characteristics of the spoke-shaped retaining portion and the circumference retaining portion are made more rigid than that of a zone surrounded by the spoke-shaped retaining portion and the circumference retaining portion so that the contact retaining portions comprise the center mounting portion, the spoke-shaped retaining portion, and the circumference retaining portion.

According to the third mode, fastening force of the center mounting portion to the partition member will be transmitted to the each circumference retaining portion via a plurality of the spoke-shaped retaining portions and act as contact retaining force. Thus, the obstructing rubber elastic plate can be held in a superposed state more effectively against the partition member. In addition, the principal elastic deformation zone of the obstructing rubber elastic plate will be advantageously ensured by the area surrounded by the spoke-shaped retaining portion and the circumference retaining portion.

Fourth Mode of the Invention

The fourth mode of the present invention provides the fluid filled type vibration damping device according to any one of the first to third modes, wherein the contact retaining portions comprise thick rubber portions; a press retaining portion is provided on an opposite side of the partition member with the thick rubber portions being interposed therebetween; the thick rubber portions are pressed against the partition member by the press retaining portion and held elastically clamped therebetween; the elastic deformation zone situated circumferentially between the thick rubber portions is made thinner than the thick rubber portions; and a thickness dimension of the elastic deformation zone changes so as to become smaller gradually or in a stepwise manner from the thick rubber portions located on circumferentially opposite sides thereof towards a circumferentially center section thereof so as to constitute the non-linearizing member.

Fifth Mode of the Invention

The fifth mode of the present invention provides the fluid filled type vibration damping device according to any one of the first to fourth modes, wherein a reinforcing member that is more rigid than the main rubber elastic body is attached to the outer peripheral edge of the obstructing rubber elastic plate so as to constitute the contact retaining portions while the elastic deformation zone situated circumferentially between the contact retaining portions is not attached by the reinforcing member and is allowed to readily deform; the reinforcing member is provided an extended retaining portion that extends in the circumferential direction from the contact retaining portions towards the elastic deformation zone and has lower rigidity than that of the contact retaining portions; and the extended retaining portion makes the elastic characteristics of the elastic deformation zone more rigid in the circumferentially opposite sides rather than in the circumferentially center section so as to constitute the non-linearizing member.

According to the fourth and fifth modes, in the elastic deformation zone of the obstructing rubber elastic plate there are formed a zone having soft spring characteristics in the circumferentially center section and zones having relatively rigid spring characteristics in the circumferentially opposite sides.

Sixth Mode of the Invention

The sixth mode of the present invention provides the fluid filled type vibration damping device according to any one of the second to fifth modes, wherein the reinforcing member that is integrally furnished with the center mounting portion and the at least one spoke-shaped retaining portion comprising a plurality of the spoke-shaped retaining portions is employed; and the reinforcing member partially limits elastic deformation of the obstructing rubber elastic plate so as to constitute the contact retaining portions. According to the sixth mode, it is possible to improve durability of the contact retaining portions while at the same time ensuring the soft spring characteristics of the elastic deformation zone.

Seventh Mode of the Invention

The seventh mode of the present invention provides the fluid filled type vibration damping device according to any one of the second to sixth modes, wherein the center mounting portion and the plurality of the spoke-shaped retaining portions are integrally formed with the obstructing rubber elastic plate so as to constitute the contact retaining portions. According to the seventh mode, the obstructing rubber elastic plate that is furnished with the contact retaining portions and the elastic deformation zone will be realized through a simple structure.

Eighth Mode of the Invention

The eighth mode of the present invention provides the fluid filled type vibration damping device according to any one of the first to seventh modes, wherein a pressure receiving chamber-side cover member is provided for covering the elastic deformation zone of the obstructing rubber elastic plate from the pressure receiving chamber side with a gap therebetween; an opposing contact projection is provided projecting from one of opposed faces of the elastic deformation zone and the pressure receiving chamber-side cover member towards another with a distal end portion thereof opposing to the other with a given spacing therebetween; and the elastic deformation zone is adapted to undergo elastic deformation so as to be separated away from the partition member with the opposing contact projection coming into contact with the other to constitute the non-linearizing member.

According to the eighth mode, it is possible to adjust the nonlinearity of the elastic characteristics of the elastic deformation zone by setting the shape, size, construction, number, placement and other aspects of the opposing contact projection in addition to by setting the shape, size, construction etc. of the obstructing rubber elastic plate.

Ninth Mode of the Invention

The ninth mode of the present invention provides the fluid filled type vibration damping device according to any one of the first to eighth modes, wherein the pressure receiving chamber-side cover member is provided for covering the obstructing rubber elastic plate from the pressure receiving chamber side with a gap therebetween; the pressure receiving chamber-side cover member is provided with a communication hole that connects an inside area between the pressure receiving chamber-side cover member and the obstructing rubber elastic plate with the pressure receiving chamber at a location away from an opposed portion against the elastic deformation zone of the obstructing rubber elastic plate.

According to the ninth mode, under conditions of excessive negative pressure arising in the pressure receiving chamber, the communication aperture will open up in association with deformation of the elastic deformation zone of the obstructing rubber elastic plate. At that time, bubbles may form near the opening of the aperture and flow from the inside area to the pressure receiving chamber through the communication hole. Here, bubbles come into contact with the cover member and will be inhibited from growing or segmentalized. This makes it possible to limit noise or vibration caused by water hammer pressure in association with burst of a large bubble.

Tenth Mode of the Invention

The tenth mode of the present invention provides the fluid filled type vibration damping device according to any one of the first to ninth modes, wherein an excess pressure avoiding mechanism is provided in which the obstructing rubber elastic plate is adapted to undergo elastic deformation on the basis of pressure differential between the pressure receiving chamber and the equilibrium chamber so that the outer peripheral edge of the obstructing rubber elastic plate is separated from the partition member so as to cause the communication aperture to open up; an obstructed space is formed so as to extend between superposed surfaces between the partition member and the obstructing rubber elastic plate; and the communication aperture is connected with an outer peripheral portion of the obstructed space so that the pressure of the equilibrium chamber adapted to act on the obstructing rubber elastic plate through the communication aperture acts thereon via the obstructed space.

According to the tenth mode, during input of excessive vibration load or sharp vibration load across the first mounting member and the second mounting member, the above-mentioned excess pressure avoiding mechanism will work. Accordingly, the obstructing rubber elastic plate will be separated from the partition member and the obstructed space will be open to the pressure receiving chamber, so that the pressure receiving chamber and the equilibrium chamber will short-circuit through the communication aperture. Here, the obstructed space extends over a larger area than the communication aperture does with respect to the partition-member-side face of the obstructing rubber elastic plate. Therefore, with the obstructed space formed, it is possible for the obstructing rubber elastic plate to deform so as to be separated from the partition member more rapidly compared to the case where the communication aperture only is provided. As a result, excessive negative pressure within the pressure receiving chamber will be avoided or rapidly dispelled, whereby noise or vibration that is thought to be caused by cavitation can be prevented more effectively.

On the other hand, at times of input of low-frequency, large-amplitude vibration in the tuning frequency range of the orifice passage, fluctuations of pressure differential between front and back faces of the obstructing rubber elastic plate is relatively large. Accordingly, elastic deformation of the obstructing rubber elastic plate eliminates the obstructed space, so that the obstructing rubber elastic plate will come into contact with the partition member. This will restrict the deformation and displacement of the obstructing rubber elastic plate, thereby limiting pressure absorbing action of the pressure receiving chamber through the deformation and displacement of the obstructing rubber elastic plate. As a result, large pressure fluctuations will be induced between the pressure receiving chamber and the equilibrium chamber. Consequently, a sufficient amount of fluid flow will be ensured, effectively exhibiting an intended vibration damping effect by the orifice passage.

Meanwhile, at times of input of the small-amplitude vibration, slight fluctuations of pressure differential are induced between the front and back faces of the obstructing rubber elastic plate. At that time, the first face and the other face of the obstructing rubber elastic plate will be allowed to undergo elastic deformation with a bulging component by means of the pressure receiving chamber and the obstructed space, respectively. On the basis of this minute deformation action of the obstructing rubber elastic plate, the pressure in the pressure receiving chamber will be absorbed, thereby avoiding development of high dynamic spring during input of high-frequency, small-amplitude vibration and improving vibration damping ability.

Eleventh Mode of the Invention

In the fluid filled type vibration damping device according to the present invention, it would also be possible for example that the partition member and the obstructing rubber elastic plate are partially superposed against each other via a contact member, so that the obstructed space is formed around the contact member between the separately opposed surfaces of the partition member and the obstructing rubber elastic plate. In this respect, the eleventh mode of the present invention provides the fluid filled type vibration damping device according to the tenth mode, wherein a recess is formed on at least one of superposed surfaces between the partition member and the obstructing rubber elastic plate; and the obstructed space is defined by the recess being covered. With this arrangement, the obstructed space can be realized with a sufficient forming space through a simple structure.

Twelfth Mode of the Invention

The twelfth mode of the present invention provides the fluid filled type vibration damping device according to any one of the first to eleventh modes, wherein the contact retaining portions, which are held in contact against the partition member on the obstructing rubber elastic plate, include the center mounting portion located in the center section of the obstructing rubber elastic plate and the plurality of spoke-shaped retaining portions that extend radially from the center mounting portion towards the outer peripheral side; a zone situated circumferentially between the spoke-shaped retaining portions that are adjacently situated in the circumferential direction on the obstructing rubber elastic plate defines the elastic deformation zone adapted to undergo elastic deformation on the basis of pressure differential between the pressure receiving chamber and the equilibrium chamber such that the elastic deformation zone undergoes elastic deformation in a direction of separation from the partition member so as to cause the communication aperture to become an open state via an outer peripheral edge of the elastic deformation zone; and the elastic deformation zone is provided with an elastic deformation limiting member in a center section thereof that is spaced away from both the spoke-shaped retaining portions located on the circumferentially opposite sides thereof and the outer peripheral edge thereof such that the elastic deformation limiting member is adapted to limit an amount of displacement of the elastic deformation zone in the direction of separation from the partition member.

According to the twelfth mode, in the state where high-frequency, small-amplitude vibration is input across the first mounting member and the second mounting member to induce slight fluctuations of the pressure differential between the front and back faces of the obstructing rubber elastic plate, the pressure in the pressure receiving chamber will be absorbed through minute deformation and displacement, exhibiting vibration damping effect against high-frequency, small-amplitude vibration. Also, in some instances, the obstructing rubber elastic plate will be spaced away from the partition member and cause the communication aperture to open up. The pressure receiving chamber and the equilibrium chamber will short-circuit thereby, exhibiting a similar effect.

On the other hand, at times of input of low-frequency, large-amplitude vibration in the tuning frequency range of the orifice passage where fluctuations of pressure differential between front and back faces of the obstructing rubber elastic plate is large, the elastic deformation zone will appreciably deform so as to come into contact with the partition member. Thus, the pressure absorbing action of the pressure receiving chamber through the deformation and displacement of the elastic deformation zone is inhibited. Additionally, on an as-needed basis, during input of aforementioned low-frequency, large-amplitude vibration, it is possible to limit an amount of displacement of the elastic deformation zone in the direction of separation from the partition member. This arrangement will prevent pressure leakage from the pressure receiving chamber through the communication aperture. As a result, pressure fluctuation difference as desired between the pressure receiving chamber and the equilibrium chamber will be produced, ensuring a sufficient amount of fluid flow though the orifice passage. Accordingly, vibration damping effect on the basis of resonance action or other flow action of the fluid can be stably achieved.

Moreover, when an excessive or sharp vibration load is input and the pressure in the pressure receiving chamber has considerably dropped, a pressure that is enough to deform the elastic deformation zone of the obstructing rubber elastic plate in the direction of separation from the partition member will act on the elastic deformation zone. Here, deformation of the center section of the elastic deformation zone will be limited by the elastic deformation limiting member. The center section of the elastic deformation zone refers to the section in the obstructing rubber elastic plate that is located inside: the inner peripheral edge situated on the center mounting portion side; the circumferential end edge situated on the each spoke-shaped retaining portion side; and the edge portion including the outer peripheral edge or other portions situated on the outer peripheral side of the obstructing rubber elastic plate. Moreover, since the contact retaining portions are provided at the inner peripheral side and at the circumferentially opposite sides of the elastic deformation zone, spring characteristics at these inner peripheral side and circumferentially opposite sides can be more rigid than spring characteristics at the outer peripheral side. Therefore, strain (elastic deformation) of the elastic deformation zone in the direction of separation from the partition member will be concentrated on the outer peripheral side thereof, causing the outer peripheral edge of the elastic deformation zone to be appreciably and rapidly spaced away from the partition member. As a result, excessive negative pressure within the pressure receiving chamber will be avoided or rapidly dispelled, whereby noise or vibration that is thought to be caused by cavitation can be prevented.

Thirteenth Mode of the Invention

The thirteenth mode of the present invention provides the fluid filled type vibration damping device according to the twelfth mode, wherein the pressure receiving chamber-side cover member is provided for covering the elastic deformation zone of the obstructing rubber elastic plate from the pressure receiving chamber side with a gap therebetween; a contacting projection is provided projecting from one of opposed faces of the elastic deformation zone and the pressure receiving chamber-side cover member towards another with a distal end portion thereof opposing to the other with a given spacing therebetween; and the elastic deformation zone is adapted to undergo elastic deformation so as to be spaced away from the partition member with the contacting projection coming into contact with the other so as to constitute the elastic deformation limiting member. According to the thirteenth mode, by setting shape, size, construction, number, placement and other aspects of the contacting projection, desired deformation limitation of the elastic deformation zone will be advantageously realized.

Fourteenth Mode of the Invention

The fourteenth mode of the present invention provides the fluid filled type vibration damping device according to the thirteenth mode, wherein the communication aperture of the partition member is formed so as to open in a section thereof that is situated to the outside peripheral side of a forming portion of the contacting projection between the opposed faces of the elastic deformation zone of the obstructing rubber elastic plate and the pressure receiving chamber-side cover member. According to the fourteenth mode, the deformation of the center section of the elastic deformation zone is limited by the contacting projection and the pressure receiving chamber-side cover member. In this state, the pressure of the equilibrium chamber will be able to act efficiently on the outer peripheral side of the elastic deformation zone through the communication aperture. This will further rapidly permit appreciable displacement of the outer peripheral edge of the elastic deformation zone away from the partition member as desired.

Fifteenth Mode of the Invention

The fifteenth mode of the present invention provides the fluid filled type vibration damping device according to any one of the first to fourteenth modes, wherein the obstructing rubber elastic plate is superposed against and disposed on a center section of the partition member; and the orifice passage is formed so as to extend along an outside peripheral section of the partition member in the circumferential direction. According to the fifteenth mode, both of the surface area of the obstructing rubber elastic plate and the passage length of the orifice passage can be sufficiently ensured, thereby efficiently exhibiting vibration damping ability and cavitation preventing effect as desired.

Sixteenth Mode of the Invention

The sixteenth mode of the present invention provides the fluid filled type vibration damping device according to any one of the first to fifteenth modes, wherein an annular seal rib is integrally formed with an outside peripheral section of the obstructing rubber elastic plate so as to project from an opposed face thereof against the partition member and extend continuously about an entire circumference in the circumferential direction; and in the superposed state of the obstructing rubber elastic plate against the partition member the seal rib is positioned in abutment with the partition member. According to the sixteenth mode, with the obstructing rubber elastic plate superposed against the partition member, fluidtightness in the pressure receiving chamber will be further enhanced.

Effect of the Invention

According to the present invention, the non-linearizing member is provided to endow non-linear elastic characteristics on the elastic deformation zone of the obstructing rubber elastic plate, so that the device is able to exhibit respective vibration damping effects with respect to vibrations in a multiple frequency ranges, while inhibiting impact or noise upon input of excessive vibration. Moreover, the obstructed space formed between the superposed surfaces between the partition member and the obstructing rubber elastic plate as well as the elastic deformation limiting member provided on the elastic deformation zone of the obstructing rubber elastic plate will provide further rapid short-circuit to the pressure receiving chamber and the equilibrium chamber.

EMBODIMENTS FOR CARRYING OUT THE INVENTION

Figure 1:
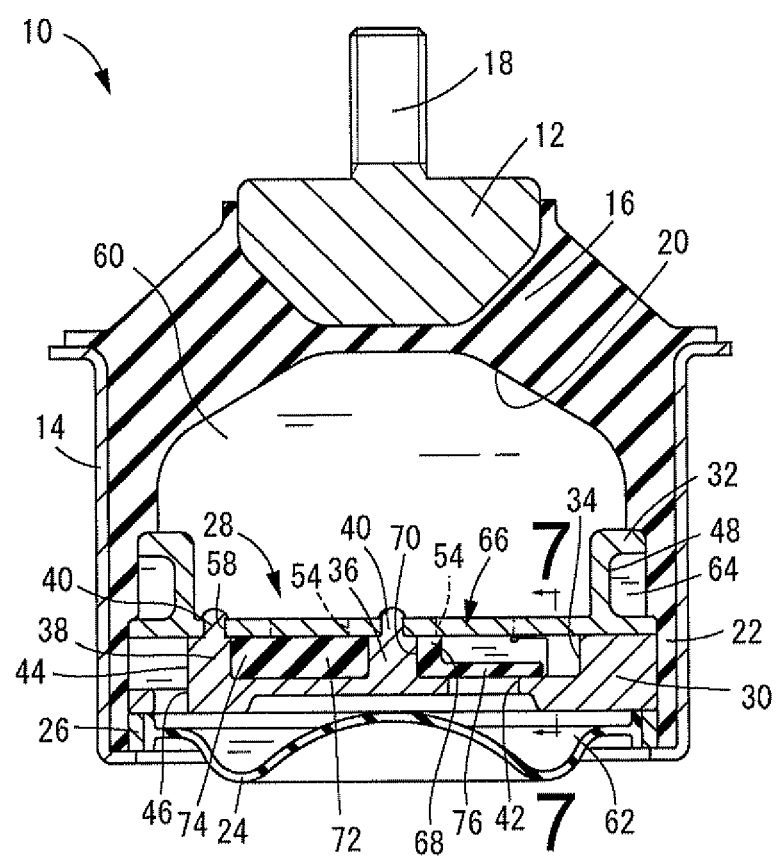
FIG. 1 is an axial or vertical cross sectional view of a fluid filled type vibration damping device in the form of an automotive engine mount of construction according to a first embodiment of the present invention, taken along line 1-1 of FIG. 2.

A more specific understanding of the invention will be provided through the following detailed description of the embodiments of the present invention, made with reference to the accompanying drawings. Referring first to FIG. 1, there is depicted an automotive engine mount 10 as a first embodiment of the fluid filled type vibration damping device according to the present invention. The automotive engine mount 10 has a construction in which a first mounting member 12 of metal and a second mounting member 14 of metal are connected to each other by a main rubber elastic body 16. The first mounting member 12 is mounted onto the power unit of the automobile, while the second mounting member 14 is mounted onto the vehicle body, thereby providing vibration damped linkage of the power unit and the vehicle body via the engine mount 10.

Whereas FIG. 1 depicts the automotive engine mount 10 in isolation prior to installation in a vehicle, with the engine mount 10 installed in the vehicle, distributed load of the power unit is input in the mount axial direction (the vertical direction in FIG. 1), thereby inducing displacement of the first mounting member 12 and the second mounting member 14 in the direction closer together in the mount axial direction, whereupon the main rubber elastic body 16 elastically deforms. In this installed state, principle vibration targeted for damping is input approximately in the mount axial direction. In the description hereinbelow, unless indicated otherwise, vertical direction refers to the vertical direction in FIG. 1.

To describe in greater detail, the first mounting member 12 has a generally round block shape and an upwardly projecting mounting bolt 18 is integrally formed with the first mounting member 12. The first mounting member 12 can be attached to the power unit by fastening the mounting bolt 18 to the power unit.

Meanwhile, the second mounting member 14 has a large-diameter, generally round tube shape and will be mounted onto the vehicle body through the agency of a bracket fitting (not shown) or the like. The first mounting member 12 is arranged spaced apart from the second mounting member 14 on the upper opening side thereof, and the main rubber elastic body 16 is positioned between the opposed faces of the first mounting member 12 and the second mounting member 14.

The main rubber elastic body 16 has a generally frusto-conical shape. The outside peripheral face of the first mounting member 12 is affixed to the small-diameter end face of the main rubber elastic body 16 while the inside peripheral face of the second mounting member 14 is affixed to the outside peripheral face of the large-diameter end of the main rubber elastic body 16. With this arrangement, the first mounting member 12 and the second mounting member 14 are elastically linked through the main rubber elastic body 16 while the upper opening of the second mounting member 14 is sealed off fluid-tightly by the main rubber elastic body 16. In addition, a large-diameter recess 20 of inverted conical shape is formed in the large-diameter end face of the main rubber elastic body 16 and opens towards inside of the second mounting member 14, while a thin-walled seal rubber layer 22 is formed covering the inside peripheral face of the second mounting member 14. Moreover, a flexible film 24 is disposed at the lower end of the second mounting member 14.

The flexible film 24 is a rubber film of thin, generally circular shape overall and is allowed to deform readily. A large-diameter ring-shaped fastener fitting 26 is affixed to the outer peripheral edge of the flexible film 24. The fastener fitting 26 is fitted internally into the lower end of the second mounting member 14, then the second mounting member 14 is subjected to a diameter reduction process such as 360-degree radial compression to fasten the fastener fitting 26 in a state of intimate contact against the second mounting member 14 via the seal rubber layer 22. By so doing, the flexible film 24 is secured to the second mounting member 14 so that the lower opening of the second mounting member 14 is sealed off fluid-tightly by the flexible film 24.

Figure 2:
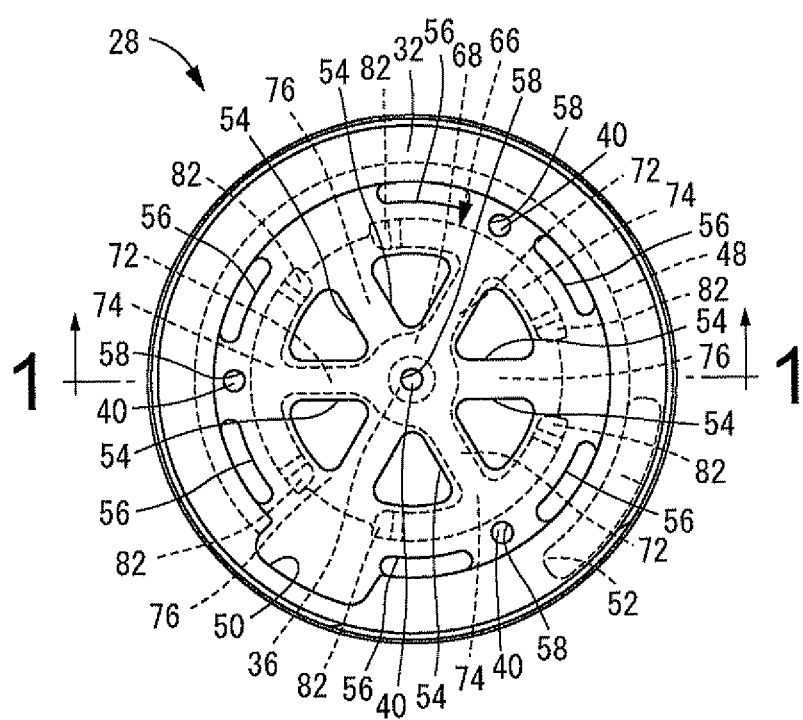
FIG. 2 is a top plane view of a dividing wall member of the automotive engine mount of FIG. 1 with an obstructing rubber elastic plate attached thereto.

A dividing wall member 28 is disposed between axially opposed faces of the main rubber elastic body 16 and the flexible film 24 inside the second mounting member 14. As depicted in FIG. 2, the dividing wall member 28 has a generally round block shape overall and is made of material having relatively high rigidity, for example a metallic material such as aluminum alloy or a synthetic resin material such as polypropylene (PP). The dividing wall member 28 includes a partition member 30 of metal and a pressure receiving chamber-side cover member 32 of metal.

Figure 3:
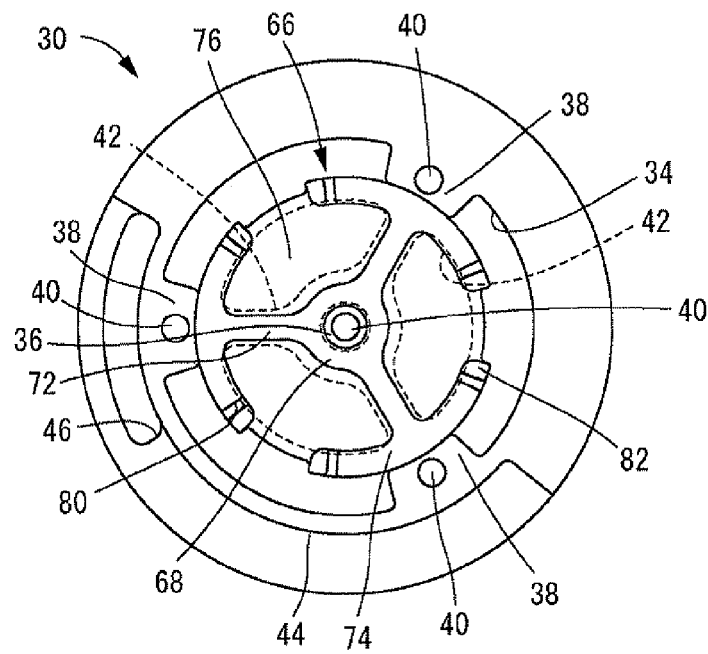
FIG. 3 is a top plane view of a partition member of the dividing wall member of FIG. 2 with the obstructing rubber elastic plate attached thereto.
Figure 4:
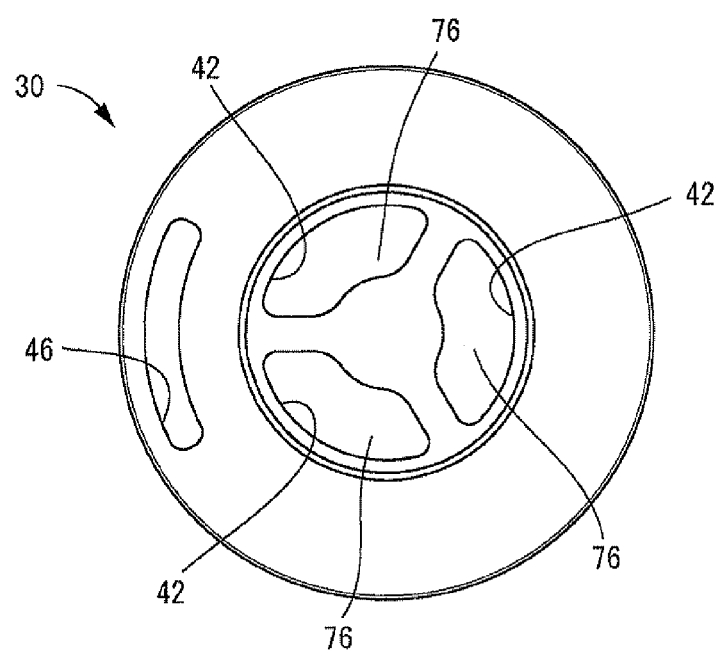
FIG. 4 is a bottom plane view of the partition member of FIG. 3.

As depicted in FIGS. 3 and 4, the partition member 30 has a generally circular disk shape and in its diametrically center section there is formed a housing recess 34 of circular shape opening upwardly. In the diametrically center section of the housing recess 34 a center projection 36 is formed projecting from the bottom wall, while on the peripheral wall of the housing recess 34 a plurality of outside peripheral projections 38 are provided projecting diametrically inward and arranged at a uniform interval in the circumferential direction. The upper end face of these center projection 36 and each of the outside peripheral projection 38 has a projecting locking projection 40. Moreover, the center side section of the bottom wall of the housing recess 34 is perforated by a plurality of communication apertures 42 that are generally fan-shaped and encircle the center projection 36, being spaced apart from one another in the circumferential direction. Additionally, in the outside peripheral section of the partition member 30 there is formed a lower circumferential groove 44 that opens onto the upper end face and the outer circumferential face, extending continuously for a prescribed length in the circumferential direction (in the present embodiment, just short of halfway about the circumference). At one circumferential end side of the lower circumferential groove 44 there is formed an opening 46 that opens onto the lower end face of the partition member 30.

Meanwhile, the pressure receiving chamber-side cover member 32 has a shallow, generally round tubular shape with a bottom. In the tubular section of the pressure receiving chamber-side cover member 32 there is formed an upper circumferential groove 48 that opens onto the outer circumferential face thereof and extends continuously for a prescribed length in the circumferential direction (in the present embodiment, just short of once around the circumference). At one circumferential end side of the upper circumferential groove 48 there is formed an opening 50 that opens onto the inside wall, while at the other circumferential end side of the upper circumferential groove 48 there is formed a connecting window 52 that opens onto the lower end face of the pressure receiving chamber-side cover member 32. The center side section of the bottom wall of the pressure receiving chamber-side cover member 32 is perforated by a plurality of through-holes 54 that are spaced apart from one another in the circumferential direction, while the outside peripheral side section of the bottom wall is perforated by a plurality of communication holes 56 with circumferentially elongated extension that are spaced apart from one another in the circumferential direction. Furthermore, the diametrically center section of the bottom wall and locations different from the communication hole 56 in the outside peripheral side of the bottom wall are perforated by a plurality of locking holes 58.

The pressure receiving chamber-side cover member 32 is superposed against the partition member 30 from above. The locking projections 40 of the partition member 30 are respectively slipped through the locking holes 58 of the pressure receiving chamber-side cover member 32 to be locked. By so doing, the partition member 30 and the pressure receiving chamber-side cover member 32 are aligned in the circumferential direction and at the same time fastened to each other, thereby defining the dividing wall member 28. Also, the opening of the housing recess 34 of the partition member 30 is covered by the pressure receiving chamber-side cover member 32. The upper opening of the lower circumferential groove 44 of the partition member 30 is covered by the pressure receiving chamber-side cover member 32. The lower circumferential groove 44 and the upper circumferential groove 48 of the pressure receiving chamber-side cover member 32 are aligned with each other at the other circumferential end of each so as to be connected with each other through the connecting window 52. With this arrangement, the upper circumferential groove 48 and the lower circumferential groove 44 are connected in series to form a circumferential groove of helical shape that extends for a prescribed length along the outside peripheral section of the dividing wall member 28.

Prior to assembly of the flexible film 24 and the second mounting member 14 as described above, the dividing wall member 28 is fitted internally into the second mounting member 14, then the second mounting member 14 is subjected to a diameter reduction process such as 360-degree radial compression to fasten the dividing wall member 28 in a state of intimate contact against the second mounting member 14 via the seal rubber layer 22. By so doing, the space between axially opposed faces of the main rubber elastic body 16 and the flexible film 24 inside the second mounting member 14 is fluid-tightly divided into two parts by the dividing wall member 28.

To one side of the dividing wall member 28 (the upper side in FIG. 1) there is formed a pressure receiving chamber 60 whose wall is partially defined by the main rubber elastic body 16 and that gives rise to pressure fluctuations in association with input of vibration. Meanwhile, to the other side of the dividing wall member 28 (the lower side in FIG. 1) there is formed an equilibrium chamber 62 whose wall is partially defined by the flexible film 24 and that readily permits changes in volume. The pressure receiving chamber 60 and the equilibrium chamber 62 are filled with a non-compressible fluid defined by a low-viscosity fluid having viscosity of 0.1 Pa·s or lower such as water, an alkylene glycol, a polyalkylene glycol or the like, for example.

The upper and lower circumferential grooves 48, 44 of the dividing wall member 28 are sealed off fluid-tightly by the second mounting member 14 via the seal rubber layer 22. With this arrangement, there is formed an orifice passage 64 of helical shape that extends for a prescribed length (in the present embodiment, a length equivalent to between just short of once and just short of once-and-a-half the distance around the circumference) along the outside peripheral section of the dividing wall member 28. The one end of the orifice passage 64 is connected with the pressure receiving chamber 60 through the opening 50 of the pressure receiving chamber-side cover member 32, while the other end of the orifice passage 64 is connected with the equilibrium chamber 62 through the opening 46 of the partition member 30. By so doing, the pressure receiving chamber 60 and the equilibrium chamber 62 are connected with each other by the orifice passage 64 adapted to produce fluid flow through the orifice passage 64 depending on pressure differential between the pressure receiving chamber 60 and the equilibrium chamber 62 due to input of vibration. Thus, vibration damping effect will be exhibited on the basis of resonance action or other flow action of the fluid. The resonance frequency of the fluid that flows through the orifice passage 64 is established based on passage cross sectional area, passage length, or the like, and in the present embodiment, it is established in a low frequency range on the order of 10 Hz, corresponding to engine shake of an automobile, for example.

Additionally, in the partition member 30, the housing recess 34 of annular shape covered by the pressure receiving chamber-side cover member 32 communicates with the pressure receiving chamber 60 through the through-holes 54 and the communication holes 56 of the pressure receiving chamber-side cover member 32, and communicates with the equilibrium chamber 62 through the communication apertures 42 of the partition member 30. In this respect, prior to assembly of the partition member 30 and the pressure receiving chamber-side cover member 32, an obstructing rubber elastic plate 66 is arranged in the housing recess 34 so as to be superposed against the bottom wall of the housing recess 34 from the upper opening thereof, namely, the pressure receiving chamber 60 side.

Figure 5:
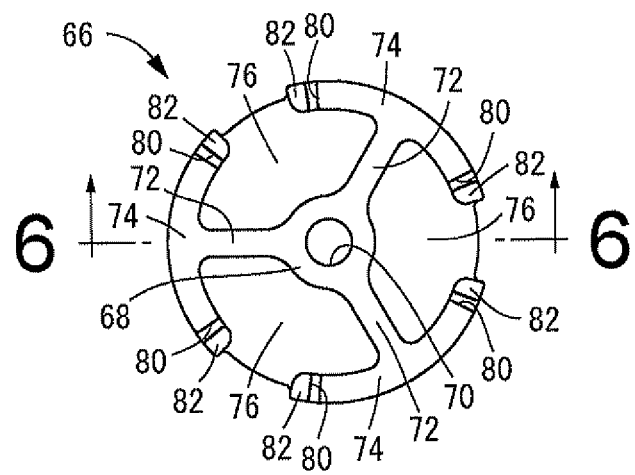
FIG. 5 is a top plane view of the obstructing rubber elastic plate of FIG. 2.
Figure 6:
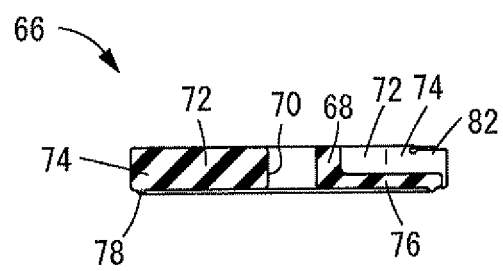
FIG. 6 is a cross sectional view taken along line 6-6 of FIG. 5.

As depicted in FIGS. 5 and 6, the obstructing rubber elastic plate 66 has a generally circular flat-plate shape overall, and is made of a rubber elastic material. In the diametrical center section of the obstructing rubber elastic plate 66 there is formed a center mounting portion 68 of generally round tubular shape. The center projection 36 of the partition member 30 is passed through a borehole 70 of the center mounting portion 68. Accordingly, the lower end face of the center mounting portion 68 is superposed against the upper end face of the bottom wall of the housing recess 34 over the area located diametrically inside of each of the communication apertures 42. Meanwhile, the upper end face of the center mounting portion 68 is superposed against the lower end face of the bottom wall of the pressure receiving chamber-side cover member 32 over the area located diametrically inside of each of the through-holes 54.

In addition, three spoke-shaped retaining portions 72, 72, 72 that extend radially from the center mounting portion 68 towards the outside peripheral section of the obstructing rubber elastic plate 66 are formed at equidistant intervals in the circumferential direction. Each of the spoke-shaped retaining portions 72 is positioned between the bottom wall of the housing recess 34 and the bottom wall of the pressure receiving chamber-side cover member 32 axially opposed to each other, while being arranged between circumferentially adjacent each pair of the communication apertures 42, 42 of the housing recess 34 and also between the plurality of through-holes 54 of the pressure receiving chamber-side cover member 32.

Moreover, an annular seal rib 78 is formed projecting from the lower end face of the obstructing rubber elastic plate 66 in the outside peripheral side thereof, and superposed against the bottom wall of the housing recess 34 over the area located diametrically outside of the each of the communication apertures 42. Specifically, the obstructing rubber elastic plate 66 is superposed against the partition member 30 so as to cover the plurality of the communication aperture 42 entirely while the outer peripheral edge of the obstructing rubber elastic plate 66 is situated diametrically outside of the outer peripheral edge of the each communication aperture 42. In the present embodiment in particular, the outer peripheral edge of the obstructing rubber elastic plate 66 is situated diametrically outside of the each through-hole 54 of the pressure receiving chamber-side cover member 32 while being situated diametrically inside of the each communication hole 56. With this arrangement, each of the communication holes 56 is provided at the location away from the axially opposed portion against the outer peripheral edge of the obstructing rubber elastic plate 66.

Furthermore, in the outer peripheral edge of the obstructing rubber elastic plate 66, three circumference retaining portions 74 of arcuate shape serving as contact retaining portions are formed at equidistant intervals in the circumferential direction. In particular, the circumferentially center section of the each circumference retaining portion 74 is situated in abutment against the distal end portion of the each spoke-shaped retaining portion 72 extending diametrically outward from the center mounting portion 68.

In the obstructing rubber elastic plate 66 according to the present embodiment, the thickness dimension of each of the center mounting portion 68, the spoke-shaped retaining portions 72, and the circumference retaining portions 74 is approximately identical with one another, while being greater than the dimension between axially opposed faces of the bottom wall of the pressure receiving chamber-side cover member 32 and the bottom wall of the housing recess 34 of the partition member 30 (the axial distance between the two bottom walls). With this arrangement, the center mounting portion 68, the spoke-shaped retaining portions 72, and the circumference retaining portions 74 are subjected to compressive deformation in the axial direction between the two bottom walls of the partition member 30 and the pressure receiving chamber-side cover member 32 within the housing recess 34. Meanwhile, the state of compressive deformation is held by fastening force of the partition member 30 and the pressure receiving chamber-side cover member 32, whereby the center mounting portion 68, the spoke-shaped retaining portions 72, and the circumference retaining portions 74 are held clamped by the dividing wall member 28. Additionally, the center mounting portion 68 is elastically secured fitting around the center projection 36 of the partition member 30. Moreover, each of the circumference retaining portions 74 is diametrically pressed at the outside peripheral face of its circumferentially center section against the inside peripheral face of the each outside peripheral projection 38 of the partition member 30. Consequently, the obstructing rubber elastic plate 66 is held in contact against the partition member 30.

On the other hand, in the obstructing rubber elastic plate 66, each area of generally fan-shaped contours that is surrounded by the center mounting portion 68, the circumferentially adjacent each pair of the spoke-shaped retaining portions 72, 72, and the circumferentially adjacent each pair of the circumference retaining portions 74, 74 is arranged so as to have the thickness dimension sufficiently smaller than the dimension between axially opposed faces of the bottom wall of the pressure receiving chamber-side cover member 32 and the bottom wall of the housing recess 34 of the partition member 30. There are provided three generally fan-shaped areas at equidistant intervals in the circumferential direction. Also, the each area has larger contours than those of the each communication aperture 42 and is aligned with the each communication aperture 42 in the circumferential direction so as to cover it entirely. In addition, these areas are positioned in opposition to the pressure receiving chamber-side cover member 32 with a given spacing therebetween in the direction of superposition of the obstructing rubber elastic plate 66 and the partition member 30. By so doing, the pressure of the pressure receiving chamber 60 acts upon the first face of the each area through the through-holes 54 and the communication holes 56 of the pressure receiving chamber-side cover member 32 while the pressure of the equilibrium chamber 62 acts upon the other face of the each area through the communication apertures 42 of the partition member 30. That is, in the state where the obstructing rubber elastic plate 66 is superposed against the partition member 30, the each area of generally fan-shaped contours defines an elastic valve portion 76 serving as an elastic deformation zone that is able to permit elastic deformation of the obstructing rubber elastic plate 66 depending on pressure differential between the pressure receiving chamber 60 and the equilibrium chamber 62.

In the present embodiment in particular, the outer peripheral edge of the elastic valve portion 76 is located diametrically outside of the outer peripheral edge of the communication aperture 42 while being located diametrically inside of the outer peripheral edge of the circumference retaining portion 74. Additionally, the each elastic valve portion 76 positioned between the circumferentially adjacent each pair of the circumference retaining portion 74, 74 of the obstructing rubber elastic plate 66 is arranged so that the circumferentially center section of the outer peripheral edge of the elastic valve portion 76 is aligned with the corresponding circumferentially center section of the outer peripheral edge of the each communication aperture 42 in the circumferential direction.

Figure 7:
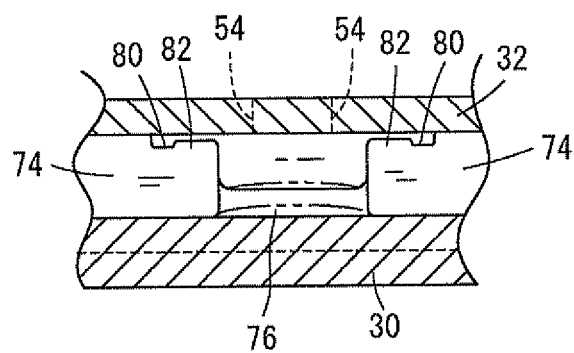
FIG. 7 is an enlarged cross sectional view taken along line 7-7 of FIG. 1.

Furthermore, as depicted in FIG. 7, at the each circumferential end of each of the circumference retaining portions 74 situated on circumferentially opposite sides of the outer peripheral edge of the elastic valve portion 76, there is formed a stepped portion 82 serving as an opposing contact projection by providing a groove 80 that extends in the diametrical direction with a cutout contours. The stepped portion 82 is integrally formed with the elastic valve portion 76 and the circumference retaining portion 74. The thickness dimension (height dimension) of the stepped portion 82 is greater than that of the elastic valve portion 76, while being smaller than that of the circumference retaining portion 74. In the state where the obstructing rubber elastic plate 66 is superposed against the partition member 30, the stepped portion 82 is positioned spaced apart from the pressure receiving chamber-side cover member 32. In the outer peripheral edge of the obstructing rubber elastic plate 66, a zone between the stepped portion 82 and the circumferentially center section of the circumference retaining portion 74 extends in the diametrically outward section of the each communication aperture 42 of the partition member 30 along the edge portion of the communication aperture 42.

As will be apparent from the above description, the center mounting portion 68, the spoke-shaped retaining portions 72, and the circumference retaining portions 74 according to the present embodiment have a greater thickness dimension than that of the elastic valve portion 76 of the obstructing rubber elastic plate 66 so as to define thick rubber portions that are held clamped between the pressure receiving chamber-side cover member 32 and the partition member 30. Meanwhile, rigidity of the thick rubber portions is made sufficiently higher than rigidity of the elastic valve portion 76. In addition, the pressure receiving chamber-side cover member 32 according to the present embodiment will serve as a press retaining portion that presses the thick rubber portions against the partition member 30. In the present embodiment in particular, the peripheral edge portion of the elastic valve portion 76 excluding its outer peripheral edge is constrained by the center mounting portion 68, the spoke-shaped retaining portions 72, the circumference retaining portions 74, and the stepped portions 82. On the other hand, the stepped portions 82 situated on circumferentially opposite sides of the outer peripheral edge of the elastic valve portion 76 are spaced apart from the pressure receiving chamber-side cover member 32. With this arrangement, the center section and the outer peripheral edge of the elastic valve portion 76 have soft spring characteristics in comparison with the spring characteristics of the outside peripheral portion excluding the outer peripheral edge; the inside peripheral portion; and the circumferentially opposite portions.

In the automotive engine mount 10 constructed as above, when low-frequency, large-amplitude vibration corresponding to engine shake is input during driving of the automobile, pressure differential will arise between the pressure receiving chamber 60 and the equilibrium chamber 62. Accordingly, fluid flow will be induced through the orifice passage 64 between the two chambers 60, 62.

Here, during input of vibrations with an amplitude of ±1 to 2 mm, for example, which correspond to engine shake, the stepped portion 82 of the obstructing rubber elastic plate 66 is adapted not to deform or displace to a large extent so as to come into contact with the pressure receiving chamber-side cover member 32. Accordingly, it is possible to maintain the state such that the obstructing rubber elastic plate 66 is superposed against the partition member 30 and the each communication aperture 42 of the partition member 30 is fluid-tightly sealed off by the corresponding elastic valve portion 76. In particular, upon input of vibration as described above, as indicated by chain double-dashed lines in FIG. 7, the soft spring characteristics of the outer peripheral edge side of the elastic valve portion 76 may cause the outer peripheral edge of the elastic valve portion 76 to be spaced away from the partition member 30 so as to open up the communication aperture 42. Even in that case, on the basis of rigid spring characteristics imparted to the stepped portion 82 having a greater thick dimension than that of the elastic valve portion 76 as well as to the circumference retaining portion 74 having an even greater thick dimension than that of the stepped portion 82 while being constrained by the dividing wall member 28, the deformation will reach a sufficient level such that spring characteristics of the elastic valve portion 76 suddenly become more rigid in a non-linear manner. Therefore, it is possible to inhibit the outer peripheral edge of the elastic valve portion 76 from an appreciable deformation of separation from the partition member 30 to an extent such that the stepped portion 82 comes into contact with the pressure receiving chamber-side cover member 32. Accordingly, pressure fluctuations in the pressure receiving chamber 60 will be kept from escaping and being absorbed through the communication aperture 42 any more than necessary. Consequently, a sufficient amount of fluid that flows through the orifice passage 64 can be ensured, thereby stably achieving a desired vibration damping effect (high attenuating or damping action).

On the other hand, during input of high-frequency, small-amplitude vibrations with an amplitude on the order of ±0.05 to 0.1 mm, for example, which correspond to driving rumble or other vibration, the orifice passage 64 will become substantially closed off through antiresonance action of the fluid flowing therethrough. However, as indicated by chain double-dashed lines in FIG. 7, the elastic valve portion 76 will experience minute deformations on the basis of relatively soft spring characteristics of the center section and the outer peripheral edge of the elastic valve portion 76. Thus, a desired vibration damping effect (low dynamic spring effect) will be stably exhibited through liquid pressure-absorbing action of the pressure receiving chamber 60.

Figure 8:
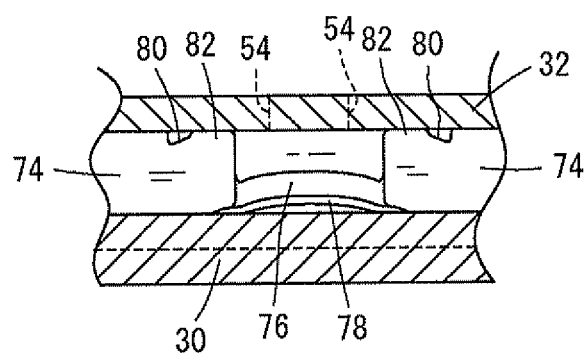
FIG. 8 is an enlarged view in axial or vertical cross section showing a principle part of the automotive engine mount of FIG. 1, in one operation state different from the state shown in FIG. 7.

Furthermore, when the automobile rides up over a curb or drives over very bumpy roadway and an excessive or sharp vibration load with an amplitude of ±2 mm or greater, for example, is input, the pressure in the pressure receiving chamber 60 may considerably drop. In this respect, in the present embodiment, as depicted in FIG. 8, under this condition where the pressure in the pressure receiving chamber 60 has dropped, a high pressure that is enough to cause the stepped portion 82 of the obstructing rubber elastic plate 66 to be spaced apart from the partition member 30 and come into contact with the pressure receiving chamber-side cover member 32 will act on the elastic valve portion 76. Specifically, during input of the excessive, sharp vibration load as described above the elastic valve portion 76 will expand to the circumferentially opposite sides of the outer peripheral edge of the communication aperture 42 where the stepped portion 82 is positioned in addition to the soft spring characteristics zone including the center section and the outer peripheral edge of the elastic valve portion 76. Accordingly, a large amount of deformation of the elastic valve portion 76 being spaced away from the partition member 30 will be ensured, making it possible to open up the communication aperture 42 by a large amount as a whole. Therefore, the pressure receiving chamber 60 and the equilibrium chamber 62 will be rapidly and reliably short-circuited, thereby dispelling the excessive negative pressure within the pressure receiving chamber 60. Consequently, it is possible to limit occurrence of cavitation bubbles and hence to effectively inhibit sharp noise or vibration caused by water hammer pressure in association with burst of the bubbles.

In the present embodiment in particular, a non-linearizing member is provided to endow non-linear elastic characteristics on the elastic valve portion 76 of the obstructing rubber elastic plate 66 such that the elastic characteristics become more rigid in a non-linear manner in association with increase in an amount of elastic deformation of the elastic valve portion 76 by the following elements: (I) the thick rubber portions defined by the center mounting portion 68, the spoke-shaped retaining portions 72, and the circumference retaining portions 74 provided around the elastic valve portion 76 being held clamped between the pressure receiving chamber-side cover member 32 and the partition member 30; (II) the thickness dimension of the elastic valve portion 76 being changed so as to become smaller in a stepwise manner from the circumferentially opposite sides thereof towards the circumferentially center section thereof utilizing the spoke-shaped retaining portions 72 and the stepped portion 82; and (III) the stepped portion 82 coming into contact with the pressure receiving chamber-side cover member 32 during elastic deformation of the elastic valve portion 76 being appreciably spaced apart from the partition member 30. That is, the non-linearizing member is defined by utilizing, in addition to contours or assembly structure of the existing pressure receiving chamber-side cover member 32 and the partition member 30, the obstructing rubber elastic plate 66 that is entirely made of rubber material. Accordingly, it is possible to advantageously simplify the structure and reduce production cost.

A number of alternative embodiments for the fluid filled type vibration damping device according to the present invention will be shown below, whose construction is different from that of the automotive engine mount 10 according to the first embodiment. In the following description, parts and components that are substantially identical in construction to those in the preceding first embodiment are assigned like symbols and will not be discussed in detail.

Figure 9:
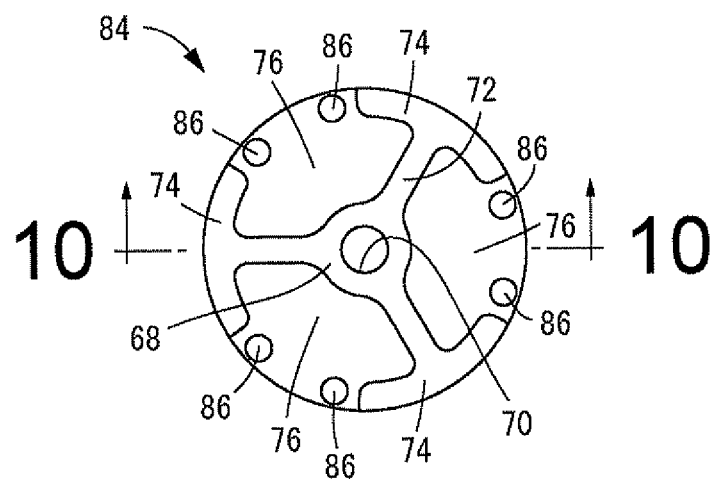
FIG. 9 is a top plane view of an obstructing rubber elastic plate employed in an automotive engine mount of construction according to a second embodiment of the present invention.
Figure 10:
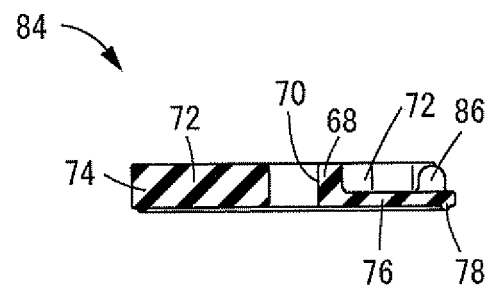
FIG. 10 is a cross sectional view taken along line 10-10 of FIG. 9.

Specifically, referring to FIGS. 9 and 10, there is depicted an obstructing rubber elastic plate 84 employed in an automotive engine mount as a second embodiment according to the present invention. Each of elastic valve portions 76 has abutting projections 86 serving as opposing contact projections that are integrally formed with the outer peripheral edge of the elastic valve portions 76. These abutting projections 86, 86 are integrally formed with the elastic valve portion 76 and project upwardly, being circumferentially spaced apart from one another as well as being circumferentially spaced apart from each circumferential end of the circumference retaining portion 74. The height dimension of the abutting projection 86 is made smaller than that of the circumference retaining portion 74. Accordingly, in the state where the obstructing rubber elastic plate 84 is superposed against the partition member 30, the abutting projection 86 is positioned spaced apart from the pressure receiving chamber-side cover member 32. In addition, a distal end portion of the abutting projection 86 has a generally semispherical shape.

By employing the obstructing rubber elastic plate 84 furnished with the abutting projection 86, it is possible to produce lower spring rigidity than in the case where the opposing contact projection is integrally formed with the circumference retaining portion 74. Thus, the elastic valve portion 76 is able to achieve lower spring. Moreover, in addition to providing the outer peripheral edge of the obstructing rubber elastic plate 84 with a plurality of portions that are spaced apart from one another and strike the pressure receiving chamber-side cover member 32, the abutting surface area is made small. Therefore, large striking noise in association with a sharp strike will be effectively reduced.

Figure 11:
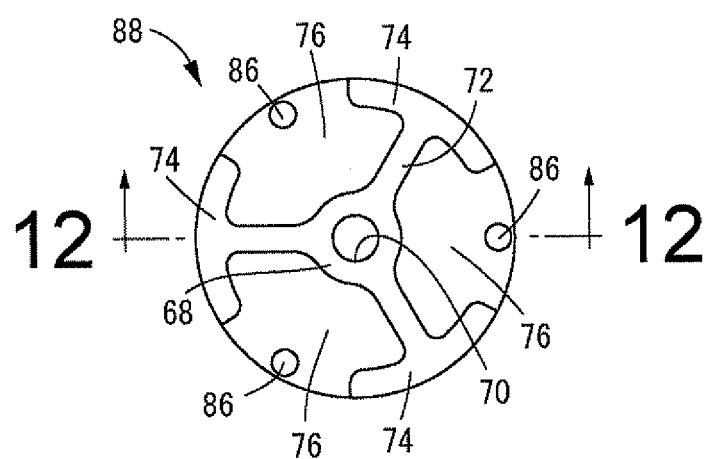
FIG. 11 is a top plane view of an obstructing rubber elastic plate employed in an automotive engine mount of construction according to a third embodiment of the present invention.
Figure 12:
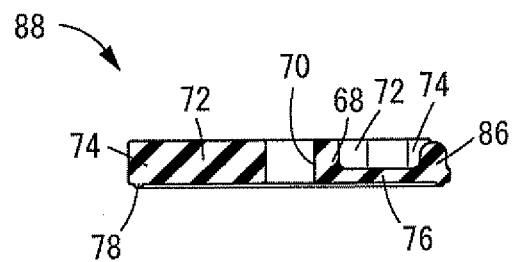
FIG. 12 is a cross sectional view taken along line 12-12 of FIG. 11.

It should be noted that no particular limitation is imposed as to the shape, size, construction, number, placement and other aspects of the abutting projection 86. For example, as depicted in FIGS. 11 and 12, an obstructing rubber elastic plate 88 employed in an automotive engine mount as a third embodiment according to the present invention would also be acceptable. The obstructing rubber elastic plate 88 has a structure in which a single abutting projection 86 is provided to a circumferentially center section of the outer peripheral edge of the each elastic valve portion 76.

Figure 13:
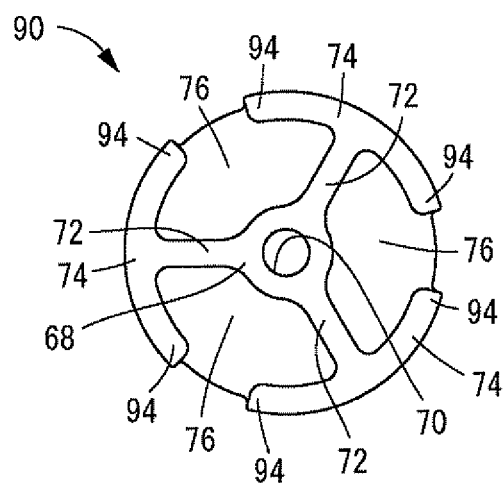
FIG. 13 is a top plane view of an obstructing rubber elastic plate employed in an automotive engine mount of construction according to a fourth embodiment of the present invention.
Figure 14:
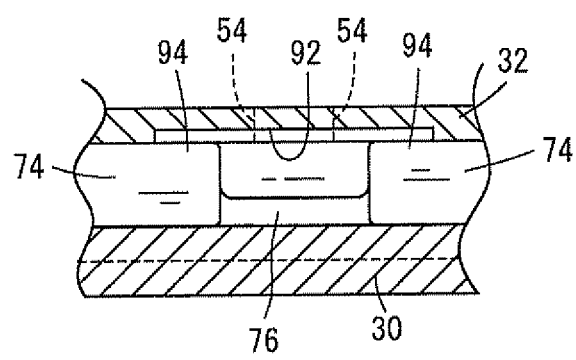
FIG. 14 is an enlarged view in axial or vertical cross section showing a principle part of the automotive engine mount of FIG. 13, in one operation state corresponding to FIG. 7.

Moreover, instead of providing the circumferential end of the circumference retaining portion 74 with the opposing contact projection in the form of the stepped portion 82 that has a different height dimension from that of the circumference retaining portion 74, an obstructing rubber elastic plate 90 as depicted in FIGS. 13 and 14 employed in an automotive engine mount as a fourth embodiment according to the present invention would also be acceptable. Specifically, there is formed a recess 92 in the pressure receiving chamber-side cover member 32 situated in opposition to the circumferentially opposite sides of the circumference retaining portion 74 in the mount axial direction that refers to the direction of superposition of the obstructing rubber elastic plate 90 and the partition member 30. The circumferentially opposite portions of the circumference retaining portion 74 are opposed to the pressure receiving chamber-side cover member 32 with a given spacing therebetween. By so doing, opposing contact projections 94 are defined by the circumferentially opposite portions that have a height dimension identical with that of the circumferentially center section of the circumference retaining portion 74.

Figure 15:
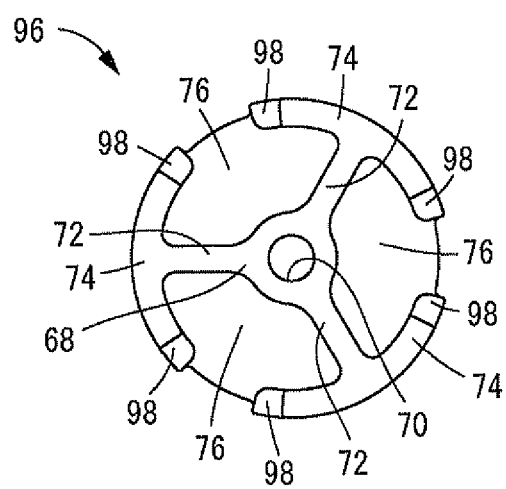
FIG. 15 is a top plane view of an obstructing rubber elastic plate employed in an automotive engine mount of construction according to a fifth embodiment of the present invention.
Figure 16:
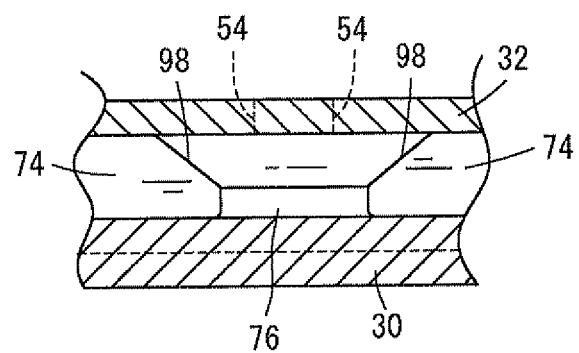
FIG. 16 is an enlarged view in axial or vertical cross section showing a principle part of the automotive engine mount of FIG. 15, in one operation state corresponding to FIG. 7.

Furthermore, as depicted in FIGS. 15 and 16, an obstructing rubber elastic plate 96 employed in an automotive engine mount as a fifth embodiment according to the present invention would also be acceptable. Specifically, stepped portions 98 serving as opposing contact projections are integrally formed with the circumferentially opposite portions of the circumference retaining portion 74 and each stepped portion 98 has a height dimension that becomes gradually smaller towards the circumferentially outside in the direction of separation from the circumference retaining portion 74. With this arrangement, the thickness dimension of the elastic valve portion 76 gradually changes so as to become smaller from the circumferentially opposite sides towards its center.

Figure 17:
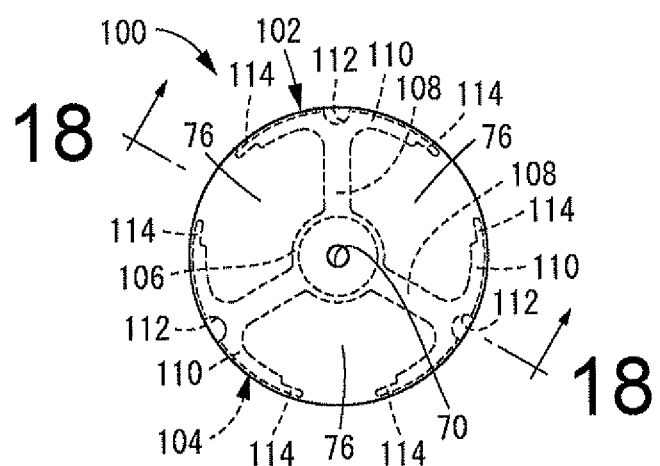
FIG. 17 is a top plane view of an obstructing rubber elastic plate employed in an automotive engine mount of construction according to a sixth embodiment of the present invention.
Figure 18:
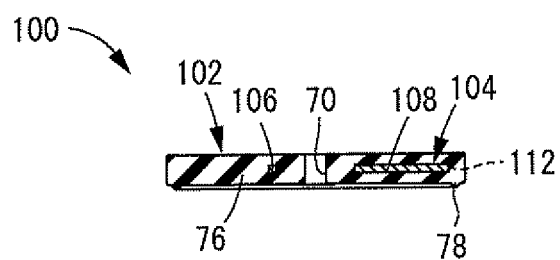
FIG. 18 is a cross sectional view taken along line 18-18 of FIG. 17.

In the preceding first through fifth embodiments, the non-linearizing member is defined by providing the obstructing rubber elastic plate 66, 84, 88, 90, 96 with a thick dimension that partially varies, or by utilizing shape or construction of the pressure receiving chamber-side cover member 32 that is disposed so as to cover the obstructing rubber elastic plate 66, 84, 88, 90, 96 from the pressure receiving chamber 60 side. However, there might also be employed a structure of an automotive engine mount as a sixth embodiment according to the present invention whereby an obstructing rubber elastic plate 100 depicted in FIGS. 17 and 18 is employed, for example. That is, a rubber plate 102 of flat shape having generally unchanging thick dimension is employed and a reinforcing member 104 of metal that is more rigid than the rubber plate 102 is anchored to the rubber plate 102 by being embedded therein, thereby defining the obstructing rubber elastic plate 100. A non-linearizing member is constituted by utilizing rigidity differential in the rubber plate 102 between the portion where the reinforcing member 104 is disposed and the portion where the reinforcing member 104 is not disposed.

Specifically, the reinforcing member 104 has a small-diameter boss-shaped portion 106 formed in the center section of the reinforcing member 104 and the boss-shaped portion 106 is disposed in the center section of the rubber plate 102. A spoke-shaped portion 108 is disposed extending radially from the boss-shaped portion 106 towards the outer peripheral side, and along the outer peripheral edge of the rubber plate 102 there is provided a split rim portion 110 extending from the distal end portion of the spoke-shaped portion 108 in arcuate shape in the circumferential direction. With this arrangement, the elastic valve portion 76 is constituted by the generally fan-shaped portion where the reinforcing member 104 is not disposed in the rubber plate 102. In addition, the split rim portion 110 of the reinforcing member 104 defines the contact retaining portions. Moreover, the split rim portion 110 has at the outer peripheral edge of its circumferentially center section a notched portion 112, thereby making it possible to adjust spring characteristics of the contact retaining portions. Furthermore, an extended retaining portion 114 is integrally formed with the each circumferential end portion of the split rim portion 110 so as to extend towards the elastic valve portion 76 in the circumferential direction. The extended retaining portion 114 is made smaller than the split rim portion 110, thereby being imparted low rigidity. The extended retaining portion 114 provides a low rigidity portion of the reinforcing member 104 so that the elastic valve portion 76 has elastic characteristics that are made more rigid in its circumferentially opposite portions than in its circumferentially center section. By so doing, the non-linearizing member is defined.

Figure 19:
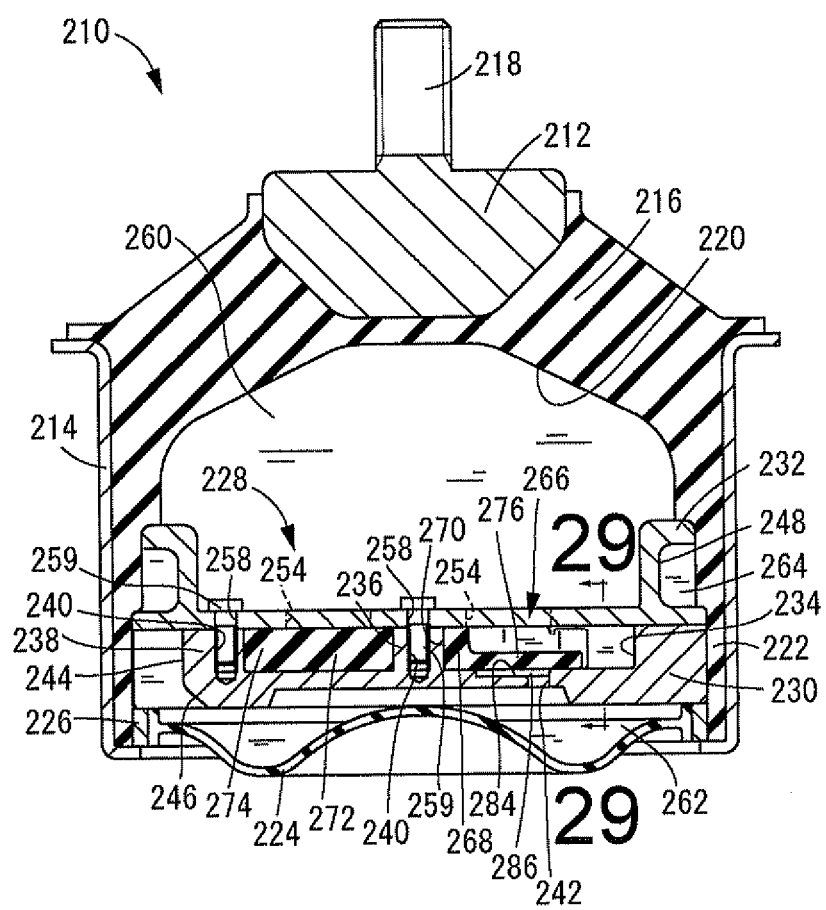
FIG. 19 is an axial or vertical cross sectional view of an automotive engine mount of construction according to a seventh embodiment of the present invention, taken along line 19-19 of FIG. 20.

Referring next to FIG. 19, there is depicted an automotive engine mount 210 as a seventh embodiment of the fluid filled type vibration damping device according to the present invention. The automotive engine mount 210 has a construction in which a first mounting member 212 of metal and a second mounting member 214 of metal are connected to each other by a main rubber elastic body 216. The first mounting member 212 is mounted onto the power unit of the automobile, while the second mounting member 214 is mounted onto the vehicle body, thereby providing vibration damped linkage of the power unit and the vehicle body via the engine mount 210.

Whereas FIG. 19 depicts the automotive engine mount 210 in isolation prior to installation in a vehicle, with the engine mount 210 installed in the vehicle, distributed load of the power unit is input in the mount axial direction (the vertical direction in FIG. 19), thereby inducing displacement of the first mounting member 212 and the second mounting member 214 in the direction closer together in the mount axial direction, whereupon the main rubber elastic body 216 elastically deforms. In this installed state, principle vibration targeted for damping is input approximately in the mount axial direction. In the description hereinbelow, unless indicated otherwise, vertical direction refers to the vertical direction in FIG. 19.

To describe in greater detail, the first mounting member 212 has a generally round block shape and an upwardly projecting mounting bolt 218 is integrally formed with the first mounting member 212. The first mounting member 212 can be attached to the power unit by fastening the mounting bolt 218 to the power unit.

Meanwhile, the second mounting member 214 has a large-diameter, generally round tube shape and will be mounted onto the vehicle body through the agency of a bracket fitting (not shown) or the like. The first mounting member 212 is arranged spaced apart from the second mounting member 214 on the upper opening side thereof, and the main rubber elastic body 216 is positioned between the opposed faces of the first mounting member 212 and the second mounting member 214.

The main rubber elastic body 216 has a generally frusto-conical shape. The outside peripheral face of the first mounting member 212 is affixed to the small-diameter end face of the main rubber elastic body 216 while the inside peripheral face of the second mounting member 214 is affixed to the outside peripheral face of the large-diameter end of the main rubber elastic body 216. With this arrangement, the first mounting member 212 and the second mounting member 214 are elastically linked through the main rubber elastic body 216 while the upper opening of the second mounting member 214 is sealed off fluid-tightly by the main rubber elastic body 216. In addition, a large-diameter recess 220 of inverted conical shape is formed in the large-diameter end face of the main rubber elastic body 216 and opens towards inside of the second mounting member 214, while a thin-walled seal rubber layer 222 is formed covering the inside peripheral face of the second mounting member 214. Moreover, a flexible film 224 is disposed at the lower end of the second mounting member 214.

The flexible film 224 is a rubber film of thin, generally circular shape overall and is allowed to deform readily. A large-diameter ring-shaped fastener fitting 226 is affixed to the outer peripheral edge of the flexible film 224. The fastener fitting 226 is fitted internally into the lower end of the second mounting member 214, then the second mounting member 214 is subjected to a diameter reduction process such as 360-degree radial compression to fasten the fastener fitting 226 in a state of intimate contact against the second mounting member 214 via the seal rubber layer 222. By so doing, the flexible film 224 is secured to the second mounting member 214 so that the lower opening of the second mounting member 214 is sealed off fluid-tightly by the flexible film 224.

Figure 20:
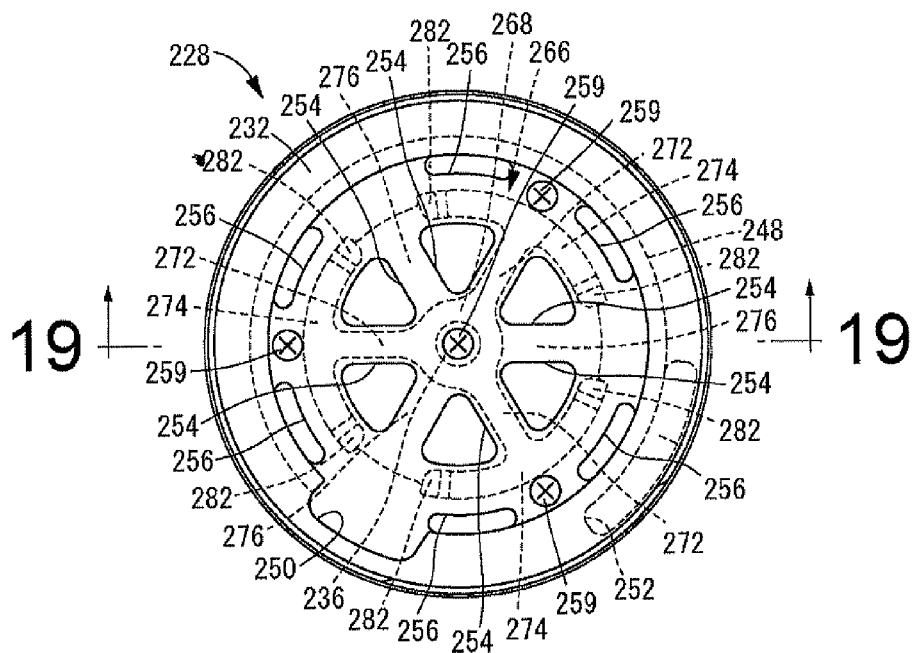
FIG. 20 is a top plane view of a dividing wall member of the automotive engine mount of FIG. 19 with an obstructing rubber elastic plate attached thereto.
Figure 21:
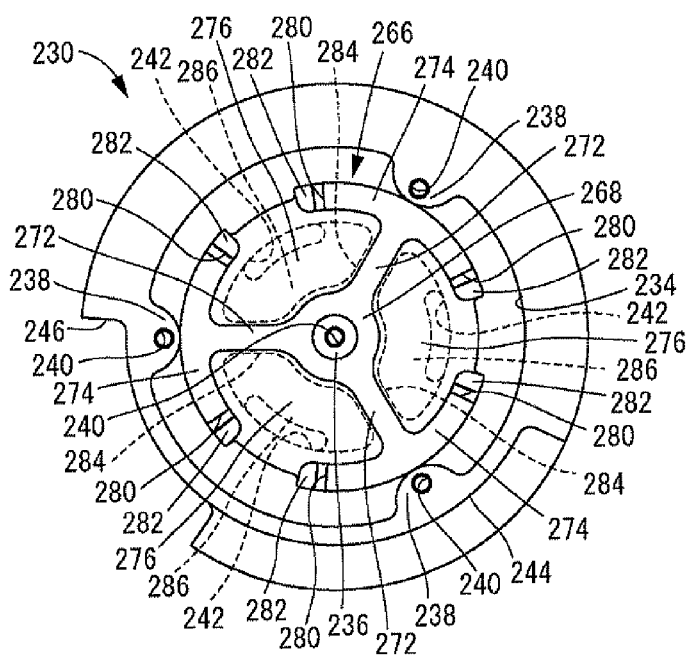
FIG. 21 is a top plane view of a partition member of the dividing wall member of FIG. 20 with the obstructing rubber elastic plate attached thereto.
Figure 22:
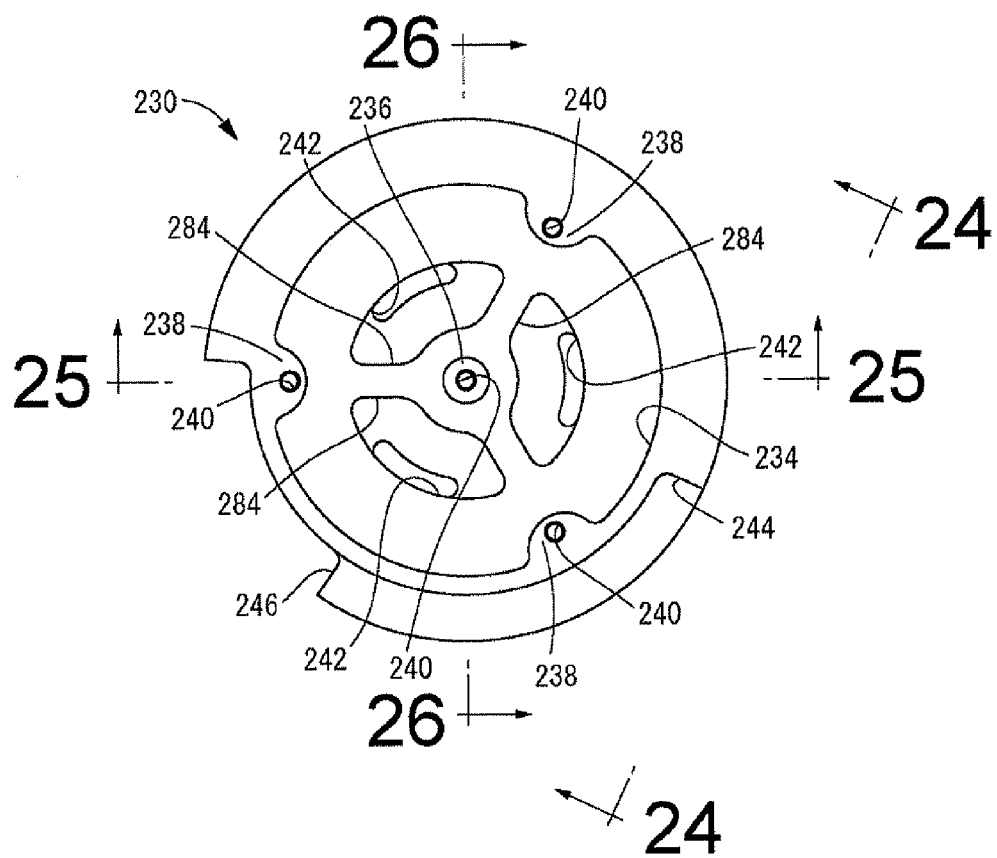
FIG. 22 is a top plane view of the partition member of FIG. 21.
Figure 23:
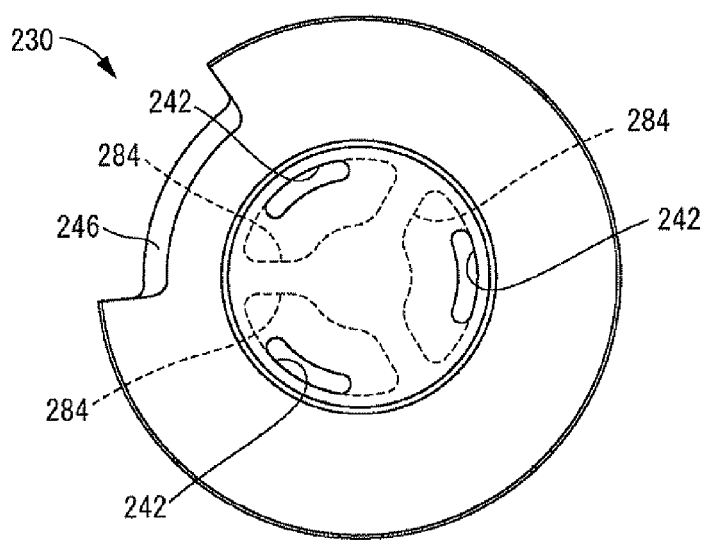
FIG. 23 is a bottom plane view of the partition member of FIG. 22.
Figure 24:
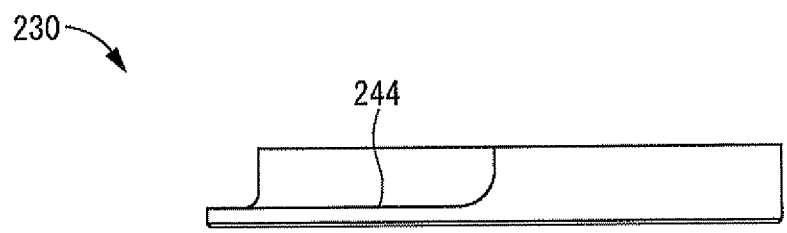
FIG. 24 is a view as seen in a direction indicated by allows 24 of FIG. 22.
Figure 25:
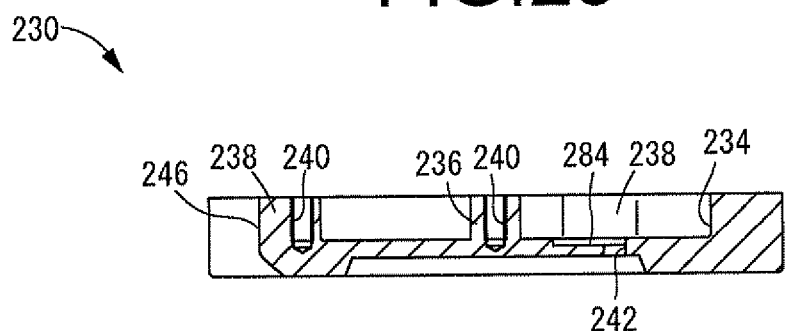
FIG. 25 is a cross sectional view taken along line 25-25 of FIG. 22.
Figure 26:
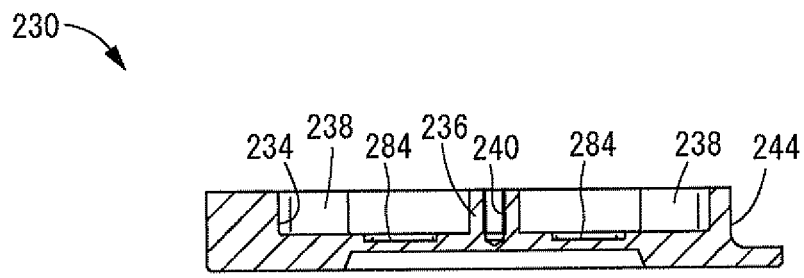
FIG. 26 is a cross sectional view taken along line 26-26 of FIG. 22.

A dividing wall member 228 is disposed between axially opposed faces of the main rubber elastic body 216 and the flexible film 224 inside the second mounting member 214. As depicted in FIG. 20, the dividing wall member 228 has a generally round block shape overall and is made of material having relatively high rigidity, for example a metallic material such as aluminum alloy or a synthetic resin material such as polypropylene (PP). The dividing wall member 228 includes a partition member 230 of metal and a pressure receiving chamber-side cover member 232 of metal.

As depicted in FIGS. 21 through 26, the partition member 230 has a generally circular disk shape and in its diametrically center section there is formed a housing recess 234 of circular shape opening upwardly. In the diametrically center section of the housing recess 234 a center projection 236 is formed projecting from the bottom wall, while on the peripheral wall of the housing recess 234 a plurality of outside peripheral projections 238 are provided projecting diametrically inward and arranged at a uniform interval in the circumferential direction. The upper end face of these center projection 236 and each of the outside peripheral projection 238 has a bored screw hole 240.

The diametrical medial section of the bottom wall of the housing recess 234 is perforated by a plurality of communication apertures 242 that are spaced apart from one another in the circumferential direction. The communication apertures 242 according to the present embodiment take the form of elongated slots extending in the circumferential direction and three communication apertures 242 are arranged at a uniform interval. Additionally, in the outside peripheral section of the partition member 230 there is formed a lower circumferential groove 244 that opens onto the upper end face and the outer circumferential face, extending continuously for a prescribed length in the circumferential direction (in the present embodiment, just short of halfway about the circumference). At one circumferential end side of the lower circumferential groove 244 there is formed an opening 246 that opens onto the lower end face of the partition member 230.

Meanwhile, the pressure receiving chamber-side cover member 232 has a shallow, generally round tubular shape with a bottom. In the tubular section of the pressure receiving chamber-side cover member 232 there is formed an upper circumferential groove 248 that opens onto the outer circumferential face thereof and extends continuously for a prescribed length in the circumferential direction (in the present embodiment, just short of once around the circumference). At one circumferential end side of the upper circumferential groove 248 there is formed an opening 250 that opens onto the inside wall, while at the other circumferential end side of the upper circumferential groove 248 there is formed a connecting window 252 that opens onto the lower end face of the pressure receiving chamber-side cover member 232. The center side section of the bottom wall of the pressure receiving chamber-side cover member 232 is perforated by a plurality of through-holes 254 that are spaced apart from one another in the circumferential direction, while the outside peripheral side of the bottom wall is perforated by a plurality of communication holes 256 with circumferentially elongated extension that are spaced apart from one another in the circumferential direction. Furthermore, the diametrically center section of the bottom wall and locations different from the communication hole 256 in the outside peripheral side of the bottom wall are perforated by a plurality of insertion holes 258.

The pressure receiving chamber-side cover member 232 is superposed against the partition member 230 from above. At the same time, the screw holes 240 of the partition member 230 and the insertion holes 258 of the pressure receiving chamber-side cover member 232 are respectively aligned with one another, with a plurality of fastening machine screws 259 inserted through the respective insertion holes 258 and screw-fastened to the corresponding screw holes 240. By so doing, the partition member 230 and the pressure receiving chamber-side cover member 232 are aligned in the circumferential direction and at the same time fastened to each other, thereby defining the dividing wall member 228. Also, the opening of the housing recess 234 of the partition member 230 is covered by the pressure receiving chamber-side cover member 232. The upper opening of the lower circumferential groove 244 of the partition member 230 is covered by the pressure receiving chamber-side cover member 232. The lower circumferential groove 244 and the upper circumferential groove 248 of the pressure receiving chamber-side cover member 232 are aligned with each other at the other circumferential end of each so as to be connected with each other through the connecting window 252. With this arrangement, the upper circumferential groove 248 and the lower circumferential groove 244 are connected in series to form a circumferential groove of helical shape that extends for a prescribed length along the outside peripheral section of the dividing wall member 228.

Prior to assembly of the flexible film 224 and the second mounting member 214 as described above, the dividing wall member 228 is fitted internally into the second mounting member 214, then the second mounting member 214 is subjected to a diameter reduction process such as 360-degree radial compression to fasten the dividing wall member 228 in a state of intimate contact against the second mounting member 214 via the seal rubber layer 222. By so doing, the space between axially opposed faces of the main rubber elastic body 216 and the flexible film 224 inside the second mounting member 214 is fluid-tightly divided into two parts by the dividing wall member 228.

To one side of the dividing wall member 228 (the upper side in FIG. 19) there is formed a pressure receiving chamber 260 whose wall is partially defined by the main rubber elastic body 216 and that gives rise to pressure fluctuations in association with input of vibration. Meanwhile, to the other side of the dividing wall member 228 (the lower side in FIG. 19) there is formed an equilibrium chamber 262 whose wall is partially defined by the flexible film 224 and that readily permits changes in volume. The pressure receiving chamber 260 and the equilibrium chamber 262 are filled with a non-compressible fluid defined by a low-viscosity fluid having viscosity of 0.1 Pa·s or lower such as water, an alkylene glycol, a polyalkylene glycol or the like, for example.

The upper and lower circumferential grooves 248, 244 of the dividing wall member 228 are sealed off fluid-tightly by the second mounting member 214 via the seal rubber layer 222. With this arrangement, there is formed an orifice passage 264 of helical shape that extends for a prescribed length (in the present embodiment, a length equivalent to between just short of once and just short of once-and-a-half the distance around the circumference) along the outside peripheral section of the dividing wall member 228. The one end of the orifice passage 264 is connected with the pressure receiving chamber 260 through the opening 250 of the pressure receiving chamber-side cover member 232, while the other end of the orifice passage 264 is connected with the equilibrium chamber 262 through the opening 246 of the partition member 230. By so doing, the pressure receiving chamber 260 and the equilibrium chamber 262 are connected with each other by the orifice passage 264 adapted to produce fluid flow through the orifice passage 264 depending on pressure differential between the pressure receiving chamber 260 and the equilibrium chamber 262 due to input of vibration. Thus, vibration damping effect will be exhibited on the basis of resonance action or other flow action of the fluid. The resonance frequency of the fluid that flows through the orifice passage 264 is established based on passage cross sectional area, passage length, or the like, and in the present embodiment, it is established in a low frequency range on the order of 10 Hz, corresponding to engine shake of an automobile, for example.

Additionally, in the partition member 230, the housing recess 234 of annular shape covered by the pressure receiving chamber-side cover member 232 communicates with the pressure receiving chamber 260 through the through-holes 254 and the communication holes 256 of the pressure receiving chamber-side cover member 232, and communicates with the equilibrium chamber 262 through the communication apertures 242 of the partition member 230. In this respect, prior to assembly of the partition member 230 and the pressure receiving chamber-side cover member 232, an obstructing rubber elastic plate 266 is arranged in the housing recess 234 so as to be superposed against the bottom wall of the housing recess 234 from the upper opening thereof, namely, the pressure receiving chamber 260 side.

Figure 27:
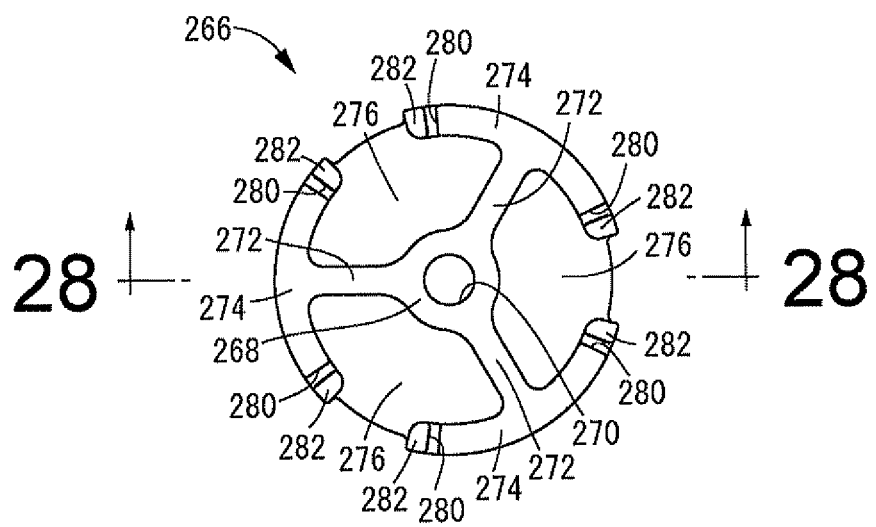
FIG. 27 is a top plane view of the obstructing rubber elastic plate of FIG. 20.
Figure 28:
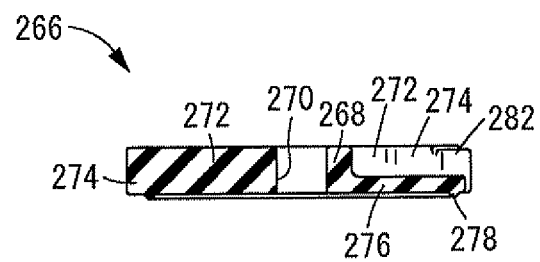
FIG. 28 is a cross sectional view taken along line 28-28 of FIG. 27.

As depicted in FIGS. 27 and 28, the obstructing rubber elastic plate 266 has a generally circular flat-plate shape overall, and is made of a rubber elastic material. In the diametrical center section of the obstructing rubber elastic plate 266 there is formed a center mounting portion 268 of generally round tubular shape. The center projection 236 of the partition member 230 is passed through a borehole 270 of the center mounting portion 268. Accordingly, the lower end face of the center mounting portion 268 is superposed against the upper end face of the bottom wall of the housing recess 234 over the area located diametrically inside of each of the communication apertures 242. Meanwhile, the upper end face of the center mounting portion 268 is superposed against the lower end face of the bottom wall of the pressure receiving chamber-side cover member 232 over the area located diametrically inside of each of the through-holes 254.

In addition, three spoke-shaped retaining portions 272, 272, 272 that extend radially from the center mounting portion 268 towards the outside peripheral section of the obstructing rubber elastic plate 266 are formed at equidistant intervals in the circumferential direction. Accordingly, each of the spoke-shaped retaining portions 272 is positioned between the bottom wall of the housing recess 234 and the bottom wall of the pressure receiving chamber-side cover member 232 axially opposed to each other, while being arranged between circumferentially adjacent each pair of the communication apertures 242, 242 of the housing recess 234 and also between the plurality of through-holes 254 of the pressure receiving chamber-side cover member 232.

Moreover, a seal rib 278 of generally annular shape is integrally formed with the lower end face of the obstructing rubber elastic plate 266 in the outside peripheral side thereof, and extends continuously in the circumferential direction. The seal rib 278 is superposed against the bottom wall of the housing recess 234 over the area located diametrically outside of the each of the communication apertures 242. Specifically, the obstructing rubber elastic plate 266 is superposed against the partition member 230 so as to cover the plurality of the communication aperture 242 entirely while the outer peripheral edge of the obstructing rubber elastic plate 266 is situated diametrically outside of the outer peripheral edge of the each communication aperture 242. In the present embodiment in particular, the outer peripheral edge of the obstructing rubber elastic plate 266 is situated diametrically outside of the each through-hole 254 of the pressure receiving chamber-side cover member 232 while being situated diametrically inside of the each communication hole 256. With this arrangement, each of the communication holes 256 is provided at the location away from the axially opposed portion against the outer peripheral edge of the obstructing rubber elastic plate 266. Additionally, the generally entire lower end surface of the obstructing rubber elastic plate 266 has a generally planar shape except in the section where the projecting seal rib 278 is formed.

Furthermore, in the outer peripheral edge of the obstructing rubber elastic plate 266, three circumference retaining portions 274 of arcuate shape are formed at equidistant intervals in the circumferential direction. In particular, the circumferentially center section of the each circumference retaining portion 274 is situated in abutment against the distal end portion of the each spoke-shaped retaining portion 272 extending diametrically outward from the center mounting portion 268.

In the obstructing rubber elastic plate 266 according to the present embodiment, the thickness dimension of each of the center mounting portion 268, the spoke-shaped retaining portions 272, and the circumference retaining portions 274 is approximately identical with one another, while being greater than the dimension between axially opposed faces of the bottom wall of the pressure receiving chamber-side cover member 232 and the bottom wall of the housing recess 234 of the partition member 230 (the axial distance between the two bottom walls). With this arrangement, the center mounting portion 268, the spoke-shaped retaining portions 272, and the circumference retaining portions 274 are subjected to compressive deformation in the axial direction between the two bottom walls of the partition member 230 and the pressure receiving chamber-side cover member 232 within the housing recess 234. Meanwhile, the state of compressive deformation is held by fastening force of the partition member 230 and the pressure receiving chamber-side cover member 232, whereby the center mounting portion 268, the spoke-shaped retaining portions 272, and the circumference retaining portions 274 are held clamped by the dividing wall member 228. Additionally, the seal rib 278 of the obstructing rubber elastic plate 266 is also subjected to compressive deformation and is in intimate contact against the diametrically outside of the plurality of communication apertures 242 of the bottom wall of the housing recess 234. Moreover, the center mounting portion 268 is elastically secured fitting around the center projection 236 of the partition member 230. Furthermore, each of the circumference retaining portions 274 is pressed at the outside peripheral face of its circumferentially center section against the projecting distal end face of the each outside peripheral projection 238 of the partition member 230 situated diametrically inside. Consequently, the obstructing rubber elastic plate 266 is held in contact against the partition member 230, whereby the plurality of communication apertures 242 are fluid-tightly sealed off by the obstructing rubber elastic plate 266.

On the other hand, in the obstructing rubber elastic plate 266, each area that is surrounded by the center mounting portion 268, the circumferentially adjacent each pair of the spoke-shaped retaining portions 272, 272, and the circumferentially adjacent each pair of the circumference retaining portions 274, 274 defines an elastic valve portion 276 that has a thickness dimension smaller than that of the center mounting portion 268, spoke-shaped retaining portion 272, and the circumference retaining portion 274. The elastic valve portion 276 has generally fan-shaped contours that expand from the center section of the obstructing rubber elastic plate 266 towards the outside in the diametrical direction and there are provided three elastic valve portions 276 at equidistant intervals in the circumferential direction. In addition, the each elastic valve portion 276 has the thickness dimension sufficiently smaller than the dimension between axially opposed faces of the bottom wall of the pressure receiving chamber-side cover member 232 and the bottom wall of the housing recess 234 of the partition member 230. Thus, the each elastic valve portion 276 is positioned in opposition to the pressure receiving chamber-side cover member 232 with a given spacing therebetween in the direction of superposition of the obstructing rubber elastic plate 266 and the partition member 230.

In the present embodiment in particular, the outer peripheral edge of the elastic valve portion 276 situated between the each pair of the circumference retaining portions 274, 274 that are adjacent to one another in the circumferential direction of the obstructing rubber elastic plate 266 is located diametrically outside of the outer peripheral edge of the communication aperture 242 while being located diametrically inside of the outer peripheral edge of the circumference retaining portion 274. In addition, the inner peripheral edge of the circumference retaining portion 274 is located diametrically outside of the outer peripheral edge of the communication aperture 242. Moreover, the circumferentially center section of the elastic valve portion 276 is aligned with the corresponding circumferentially center section of the communication aperture 242 in the circumferential direction. By so doing, the each communication aperture 242 is positioned under the generally center section of the each elastic valve portion 276 in the diametrical and circumferential direction.

Furthermore, at the each circumferential end of each of the circumference retaining portions 274 situated on circumferentially opposite sides of the outer peripheral edge of the elastic valve portion 276, there is formed a stepped portion 282 by providing a groove 280 that extends in the diametrical direction with a cutout contours. The stepped portion 282 is integrally formed with the elastic valve portion 276 and the circumference retaining portion 274. The thickness dimension (height dimension) of the stepped portion 282 is greater than that of the elastic valve portion 276, while being smaller than that of the circumference retaining portion 274. In the state where the obstructing rubber elastic plate 266 is superposed against the partition member 230, the stepped portion 282 is positioned spaced apart from the pressure receiving chamber-side cover member 232. In the outer peripheral edge of the obstructing rubber elastic plate 266, a zone between the stepped portion 282 and the circumferentially center section of the circumference retaining portion 274 extends in the diametrically outward section of the each communication aperture 242 of the partition member 230 along the edge portion of the communication aperture 242.

Specifically, in the obstructing rubber elastic plate 266 employed in the present embodiment, the center mounting portion 268, the spoke-shaped retaining portions 272, and the circumference retaining portions 274 have a greater thickness dimension than that of the elastic valve portion 276 so as to define thick rubber portions that are held clamped between the pressure receiving chamber-side cover member 232 and the partition member 230. Meanwhile, rigidity of the thick rubber portions is made sufficiently higher than rigidity of the elastic valve portion 276. In particular, the edge portion of the elastic valve portion 276 excluding its outer peripheral edge is constrained by the center mounting portion 268, the spoke-shaped retaining portions 272, the circumference retaining portions 274, and the stepped portions 282. On the other hand, the stepped portions 282 situated on circumferentially opposite sides of the outer peripheral edge of the elastic valve portion 276 are spaced apart from the pressure receiving chamber-side cover member 232. With this arrangement, the center section and the outer peripheral edge of the elastic valve portion 276 have soft spring characteristics in comparison with the spring characteristics of: the outside peripheral portion excluding the outer peripheral edge; the inside peripheral portion; and the circumferentially opposite portions.

As will be apparent from the above description, the pressure receiving chamber-side cover member 232 will serve as a press retaining portion that presses the thick rubber portions of the obstructing rubber elastic plate 266 against the partition member 230. Moreover, contact retaining portions of the obstructing rubber elastic plate 266 that are positioned in abutment with and elastically held in contact against the partition member 230 include the thick rubber portions of the obstructing rubber elastic plate 266.

In this respect, in the upper end face of the bottom wall of the housing recess 234 of the partition member 230 that is superposed against the lower end face of the obstructing rubber elastic plate 266 there are formed recesses 284 opening towards the each elastic valve portion 276 of the obstructing rubber elastic plate 266. Each of the recesses 284 has generally fan-shaped contours that is slightly smaller than that of the each elastic valve portion 276 of the obstructing rubber elastic plate 266 and is positioned in opposition to the each elastic valve portion 276 in the direction of superposition of the obstructing rubber elastic plate 266 and the partition member 230. Specifically, there are provided three recesses 284 at equidistant intervals in the circumferential direction in the diametrical medial section of the housing recess 234 of the partition member 230. The each recess 284 is provided at a location away from the thick rubber portions of the obstructing rubber elastic plate 266. Therefore, the entire opening of the each recess 284 is covered by the corresponding elastic valve portion 276. With this arrangement, there are formed three obstructed spaces 286, 286, 286 between the obstructing rubber elastic plate 266 and the partition member 230 superposed against each other. The each obstructed space 286 is fluid-tightly divided from the housing recess 234 and hence the pressure receiving chamber 260 on the basis of the outer peripheral edge of the obstructing rubber elastic plate 266 being in intimate contact against the bottom wall of the housing recess 234 via the seal rib 278.

Furthermore, the each communication aperture 242 is made smaller than the each recess 284 with respect to the spread in the extending direction of superposed surfaces between the partition member 230 and the obstructing rubber elastic plate 266 (the extending direction of the plane of the page in FIGS. 20 through 23). In the circumferentially center section of the bottom wall of the each recess 284, the communication aperture 242 opens at a location eccentric towards the outside in the diametrical direction. In the present embodiment in particular, the communication aperture 242 extends in the circumferential direction so that its diametrically outside edge is tangent to the diametrically outside edge of the recess 284. By so doing, the communication aperture 242 is connected with the outer peripheral portion of the each obstructed space 286 whereby pressure of the equilibrium chamber 262 acts on the lower end face of the elastic valve portion 276 through the communication aperture 242 and the obstructed space 286. On the other hand, the pressure of the pressure receiving chamber 260 acts on the each upper end face of the elastic valve portion 276 and the stepped portion 282 of the obstructing rubber elastic plate 266 through the through-hole 254 and the communication hole 256 of the pressure receiving chamber-side cover member 232. Specifically, in the obstructing rubber elastic plate 266, the principal elastic deformation zone that undergoes deformation and displacement depending on pressure differential between the pressure receiving chamber 260 and the equilibrium chamber 262 is defined by the elastic valve portion 276 and the stepped portion 282 or the like that are not held clamped by the dividing wall member 228.

In the automotive engine mount 210 constructed as above, during input of vibration that is in a high frequency range equal to or greater than a medium-frequency vibration and corresponds to idling vibration or driving rumble etc., the orifice passage 264 tuned to lower frequency range than the input vibration will become substantially closed off through antiresonance action or other action of the fluid flowing therethrough. In addition, in the case where the above-described high-frequency vibration has an amplitude on the order of ±0.05 to 0.1 mm, for example, and pressure differential between the pressure receiving chamber 260 and the equilibrium chamber 262 acting respectively on the front and back faces of the obstructing rubber elastic plate 266 is small, each of the stepped portions 282 provided to the circumferentially opposite sides of the corresponding elastic valve portion 276 is positioned in abutment with the partition member 230.

Figure 29:
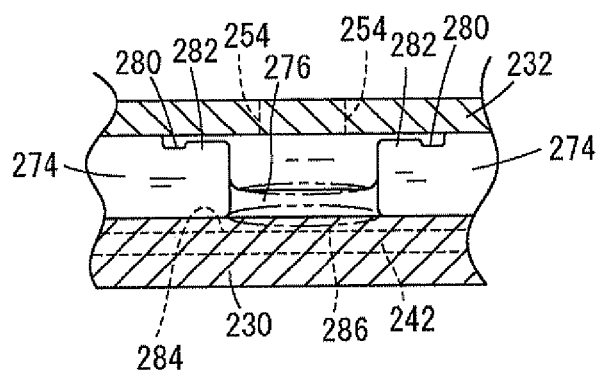
FIG. 29 is an enlarged cross sectional view taken along line 29-29 of FIG. 19.

At this point, in the obstructing rubber elastic plate 266, the center side section of the each elastic valve portion 276 is situated in opposition to the partition member 230 with the obstructed space 286 being interposed therebetween. Therefore, as indicated by chain double-dashed line in FIG. 29, when the elastic valve portion 276 experiences minute deformations, the abutment against the bottom wall of the recess 284 of the partition member 230 can be actively avoided. Meanwhile, in a state as depicted in FIG. 19 wherein no vibration is input to the device, no particular limitation is imposed as to the height dimension of the obstructed space 286 (the depth dimension of the recess 284) which refers to the distance between the opposed faces of the elastic valve portion 276 and the bottom wall of the recess 284. However, in preferred practice, the height dimension of the obstructed space 286 will be set sufficiently larger than the maximum value of deformation or displacement of the elastic valve portion 276 towards the bottom wall of the recess 284 when high-frequency, small-amplitude vibration intended to be damped is input to the device in a state wherein no vibration is input. With this arrangement, it is possible to avoid considerable limitation of the amount of minute deformations on the basis of relatively soft spring characteristics of the center section of the elastic valve portion 276 due to contact of the elastic valve portion 276 against the bottom wall of the recess 284. Accordingly, intended vibration damping effect (low dynamic spring effect) will be stably exhibited through liquid pressure-absorbing action of the pressure receiving chamber 260 owing to the above-described deformations.

On the other hand, during input of low-frequency, large-amplitude vibrations with an amplitude of ±1 to 2 mm, for example, which correspond to engine shake, the center side section of the elastic valve portion 276 undergoes appreciable elastic deformation due to its soft spring characteristics towards the equilibrium chamber 262 side. Here, in the partition member 230, the elastic valve portion 276 is positioned in opposition not only to the communication aperture 242 but also to the bottom wall of the recess 284 that defines the wall of the obstructed space 286. Additionally, in a state as depicted in FIG. 19 wherein no vibration is input to the device, the height dimension of the obstructed space 286 which corresponds to the distance between the opposed faces of the elastic valve portion 276 and the bottom wall of the recess 284 is made smaller than the maximum value of deformation or displacement of the elastic valve portion 276 towards the bottom wall of the recess 284 when low-frequency, large-amplitude vibration is input to the device. With this arrangement, during input of low-frequency, large-amplitude vibration, the elastic valve portion 276 comes into contact with the bottom wall of the recess 284, whereby elastic deformation of the elastic valve portion 276 will be limited.

Moreover, the obstructing rubber elastic plate 266 is endowed with elastic rigidity so that during input of above-described low-frequency, large-amplitude vibration the stepped portion 282 will not deform or displace to a large extent so as to be spaced away from the partition member 230 and come into contact with the pressure receiving chamber-side cover member 232. Accordingly, the communication between the pressure receiving chamber 260 and the equilibrium chamber 262 through the communication aperture 242 is substantially cut off by the obstructing rubber elastic plate 266. Specifically, there may be a case where the soft spring characteristics of the elastic valve portion 276 cause the outer peripheral edge of the elastic valve portion 276 to be spaced away from the partition member 230 so as to open up the communication aperture 242. Even in that case, on the basis of rigid spring characteristics imparted to the stepped portion 282 having a greater thick dimension than that of the elastic valve portion 276 as well as to the circumference retaining portion 274, the spoke-shaped retaining portion 272 or the like having an even greater thick dimension than that of the stepped portion 282 while being constrained by the dividing wall member 228, the deformation will reach a sufficient level such that spring characteristics of the elastic valve portion 276 suddenly become more rigid in a non-linear manner. Therefore, it is possible to inhibit the outer peripheral edge of the elastic valve portion 276 from an appreciable deformation of separation from the partition member 230 to an extent such that the stepped portion 282 comes into contact with the pressure receiving chamber-side cover member 232.

Accordingly, during input of low-frequency, large-amplitude vibration that corresponds to engine shake or other vibration, pressure fluctuations in the pressure receiving chamber 260 will be kept from escaping through the communication aperture 242 any more than necessary. In addition, liquid pressure absorption of the pressure receiving chamber 260 due to deformation and displacement of the elastic valve portion 276 will be limited. Consequently, a sufficient amount of fluid that flows through the orifice passage 264 can be ensured, thereby stably achieving a desired vibration damping effect (high attenuating or damping action).

Figure 30:
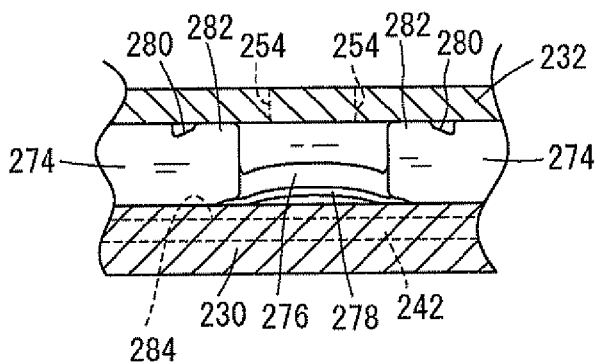
FIG. 30 is an enlarged view in axial or vertical cross section showing a principle part of the automotive engine mount of FIG. 19, in one operation state different from the state shown in FIG. 29.

Furthermore, when the automobile rides up over a curb or drives over very bumpy roadway and an excessive or sharp vibration load with an amplitude of ±2 mm or greater, for example, is input, there may be occur an excessive fluctuations of the pressure differential between the pressure receiving chamber 260 and the equilibrium chamber 262, causing the pressure in the pressure receiving chamber 260 to considerably drop. In this respect, in the present embodiment, the pressure of the equilibrium chamber 262 that acts on the elastic valve portion 276 through the communication aperture 242 will efficiently act on the entire elastic valve portion 276 via the obstructed space 286. By so doing, as depicted in FIG. 30, the elastic valve portion 276 will expand to the circumferentially opposite sides of the outer peripheral edge of the communication aperture 242 where the stepped portion 282 is positioned in addition to the soft spring characteristics zone including the center section and the outer peripheral edge of the elastic valve portion 276. Accordingly, a large amount of deformation of elastic valve portion 276 being spaced away from the partition member 230 will be ensured, allowing the obstructed space 286 to widely open to the pressure receiving chamber 260 from the housing recess 234. Therefore, it is possible to realize an excess pressure avoiding mechanism such that the pressure receiving chamber 260 and the equilibrium chamber 262 become rapidly and reliably short-circuited via the communication aperture 242, thereby effectively limiting sharp noise or vibration caused by occurrence of cavitation bubbles in the pressure receiving chamber 260.

Specifically, the automotive engine mount 210 according to the present embodiment is able to exhibit excess pressure avoiding effect comparable to that of the structure wherein a short-circuit hole passes through the partition member 230 with an opening area equal to the dimension of the obstructed space 286 that spreads in the extending direction of superposed surfaces between the partition member 230 and the obstructing rubber elastic plate 266 whereby pressure of the equilibrium chamber 262 acts on the obstructing rubber elastic plate 266 through the short-circuit hole. Moreover, the automotive engine mount 210 is furnished with a deformation limiting member of the obstructing rubber elastic plate 266 against low-frequency, large-amplitude vibration. Consequently, in addition to sufficiently achieving high attenuating or damping action through the orifice passage 264, the dimension of the obstructed space 286 in the extending direction of superposed surfaces between the partition member 230 and the obstructing rubber elastic plate 266 can be made large, thereby attaining further improved excess pressure avoiding effect. This makes it possible to more effectively limit noise or vibration due to occurrence of cavitation during arising of excessive negative pressure which can be a problem in the pressure receiving chamber 260.

In the present embodiment, a non-linearizing member is provided to endow non-linear elastic characteristics on the elastic valve portion 276 such that the elastic characteristics become more rigid in a non-linear manner in association with increase in an amount of elastic deformation of the elastic valve portion 276 by the following elements: (I) the thick rubber portions defined by the center mounting portion 268, the spoke-shaped retaining portions 272, and the circumference retaining portions 274 provided around the elastic valve portion 276 being held clamped between the pressure receiving chamber-side cover member 232 and the partition member 230; (II) the thickness dimension of the elastic valve portion 276 being changed so as to become smaller in a stepwise manner from the circumferentially opposite sides thereof towards the circumferentially center section thereof utilizing the spoke-shaped retaining portions 272 and the stepped portion 282; (III) the stepped portion 282 coming into contact against the pressure receiving chamber-side cover member 232 during elastic deformation of the elastic valve portion 276 being appreciably spaced apart from the partition member 230; (IV) the elastic valve portion 276 being positioned in opposition to the bottom wall of the recess 284 of the partition member 230 that defines the obstructed space 286 and coming into contact against the bottom wall depending on pressure differential between the pressure receiving chamber 260 and the equilibrium chamber 262; and other elements. This arrangement will more advantageously exhibit minute deformation action of the elastic valve portion 276 during input of high-frequency, small-amplitude vibration as well as deformation limiting action of the elastic valve portion 276 during input of low-frequency, large-amplitude vibration.

A number of alternative embodiments for the fluid filled type vibration damping device according to the present invention will be shown below, whose construction is different from that of the automotive engine mount 210 according to the seventh embodiment. In the following description, parts and components that are substantially identical in construction to those in the preceding seventh embodiment are assigned like symbols and will not be discussed in detail.

Figure 31:
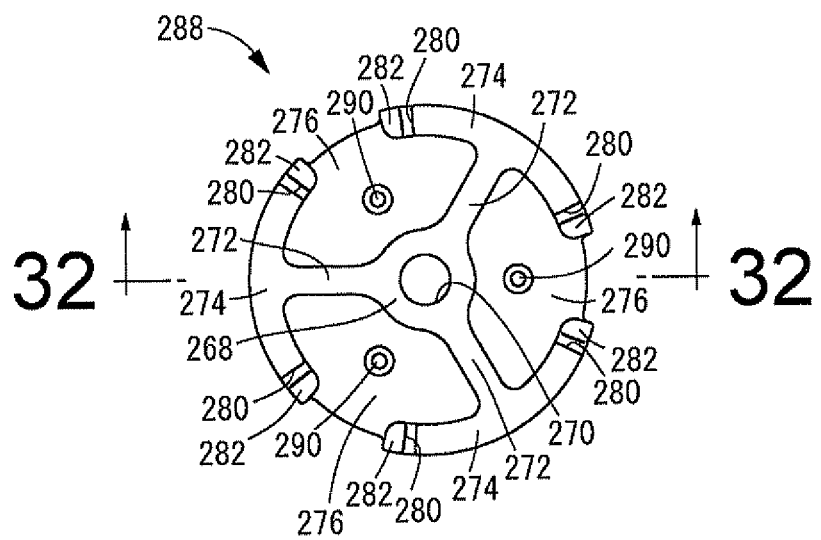
FIG. 31 is a top plane view of an obstructing rubber elastic plate employed in an automotive engine mount of construction according to an eighth embodiment of the present invention.
Figure 32:
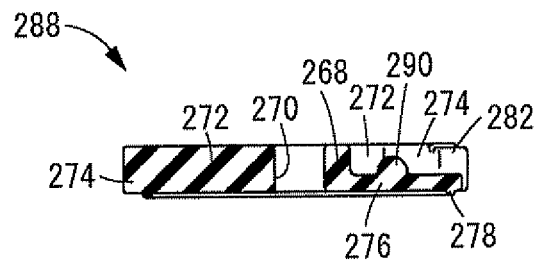
FIG. 32 is a cross sectional view taken along line 32-32 of FIG. 31.

Specifically, referring to FIGS. 31 and 32, there is depicted an obstructing rubber elastic plate 288 employed in an automotive engine mount as an eighth embodiment according to the present invention. Each of the elastic valve portions 276 of the obstructing rubber elastic plate 288 has a contacting projection 290 at the generally center section in the diametrical and circumferential direction of the elastic valve portion 276. The contacting projection 290 is integrally formed with the elastic valve portion 276 and projects towards the pressure receiving chamber-side cover member 232. The height dimension of the contacting projection 290 is made smaller than that of the stepped portion 282. Accordingly, in the state where the obstructing rubber elastic plate 288 is superposed against the partition member 230, the distance separating the contacting projection 290 from the pressure receiving chamber-side cover member 232 is made larger than the distance separating the stepped portion 282 from the pressure receiving chamber-side cover member 232. In addition, a distal end portion of the contacting projection 290 has a generally semispherical shape.

In the obstructing rubber elastic plate 288 furnished with this contacting projection 290, at times of input of low-frequency, large-amplitude vibration, for example, the contacting projection 290 comes into contact against the pressure receiving chamber-side cover member 232. Consequently, deformation and displacement of the center section of the elastic valve portion 276 is limited, thereby ensuring pressure in the pressure receiving chamber 260 more advantageously. In addition, for instance, during input of sharp vibration load, the center section of the elastic valve portion 276 strikes the pressure receiving chamber-side cover member 232 via the contacting projection 290. Thus, the abutting surface area is made smaller, thereby effectively reducing large striking noise in association with a sharp strike.

Figure 33:
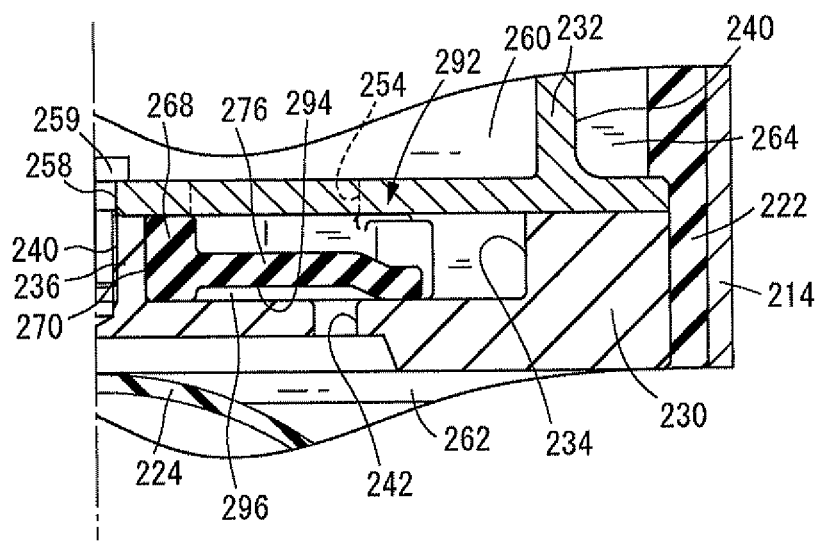
FIG. 33 is an enlarged view in axial or vertical cross section showing a principle part of an automotive engine mount of construction according to a ninth embodiment of the present invention.

Moreover, an automotive engine mount as depicted in FIG. 33 as a ninth embodiment according to the present invention would also be acceptable. Specifically, the bottom wall of the housing recess 234 of the partition member 230 has a planar shape and the lower end face of the each elastic valve portion 276 of an obstructing rubber elastic plate 292 includes a recess 294 that opens towards the bottom wall of the housing recess 234. Accordingly, in the state where the outer peripheral edge of the obstructing rubber elastic plate 292 is superposed against the bottom wall of the housing recess 234, the recess 294 is covered by the bottom wall of the housing recess 234 thereby forming an obstructed space 296. According to the present embodiment, fabrication of the partition member 230 can be easier and the recess 294 can be realized through a simple structure utilizing the shape of the obstructing rubber elastic plate 292.

Figure 34:
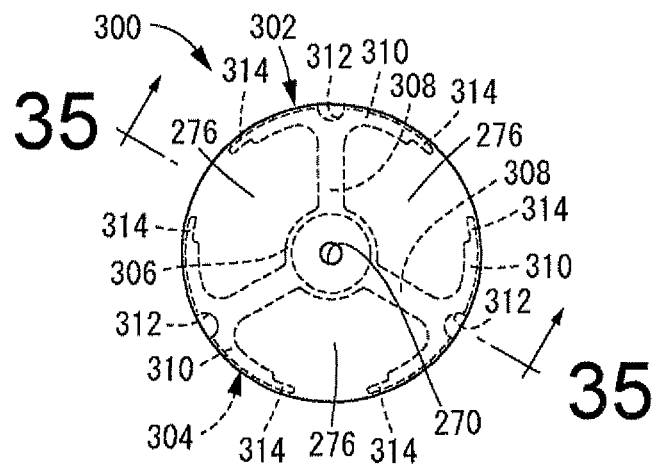
FIG. 34 is a top plane view of an obstructing rubber elastic plate employed in an automotive engine mount of construction according to a tenth embodiment of the present invention.
Figure 35:
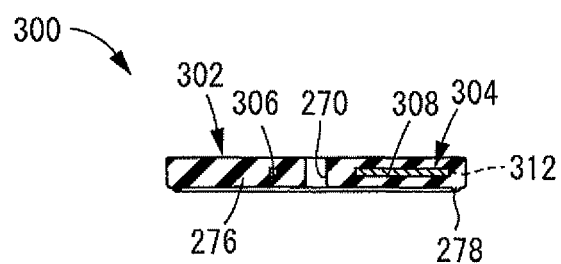
FIG. 35 is a cross sectional view taken along line 35-35 of FIG. 34.

In the preceding seventh embodiment, the non-linearizing member is defined by providing the obstructing rubber elastic plate 266 with a thick dimension that partially varies, or by utilizing shape or construction of the pressure receiving chamber-side cover member 232 that is disposed so as to cover the obstructing rubber elastic plate 266 from the pressure receiving chamber 260 side. However, there might also be employed a structure of an automotive engine mount as a tenth embodiment according to the present invention whereby an obstructing rubber elastic plate 300 depicted in FIGS. 34 and 35 is employed, for example. That is, a rubber plate 302 of flat shape having generally unchanging thick dimension is employed and a reinforcing member 304 of metal that is more rigid than the rubber plate 302 is anchored to the rubber plate 302 by being embedded therein, thereby defining the obstructing rubber elastic plate 300. A non-linearizing member is constituted by utilizing rigidity differential in the rubber plate 302 between the portion where the reinforcing member 304 is disposed and the portion where the reinforcing member 304 is not disposed.

Specifically, the reinforcing member 304 has a small-diameter boss-shaped portion 306 formed in the center section of the reinforcing member 304 and the boss-shaped portion 306 is disposed in the center section of the rubber plate 302. A spoke-shaped portion 308 is disposed extending radially from the boss-shaped portion 306 towards the outer peripheral side, and along the outer peripheral edge of the rubber plate 302 there is provided a split rim portion 310 extending from the distal end portion of the spoke-shaped portion 308 in arcuate shape in the circumferential direction. With this arrangement, the elastic valve portion 276 is constituted by the generally fan-shaped portion where the reinforcing member 304 is not disposed in the rubber plate 302. In addition, the obstructing rubber elastic plate 300 is situated in abutment against the partition member 230 at the portion where the reinforcing member 304 is disposed, thereby defining the contact retaining portions which come into contact and are held in contact against the partition member 230 in the obstructing rubber elastic plate 300. Moreover, the split rim portion 310 has at the outer peripheral edge of its circumferentially center section a notched portion 312, thereby making it possible to adjust spring characteristics of the outer peripheral edge of the obstructing rubber elastic plate 300. Furthermore, an extended retaining portion 314 is integrally formed with the circumferential end portion of the split rim portion 310 so as to extend towards the elastic valve portion 276 in the circumferential direction. The extended retaining portion 314 is made smaller than the split rim portion 310, thereby being imparted low rigidity. The extended retaining portion 314 provides a low rigidity portion of the reinforcing member 304 so that elastic characteristics of the elastic valve portion 276 are made more rigid in its circumferentially opposite portions than in its circumferentially center section. By so doing, the non-linearizing member is defined.

While the present invention has been described in detail in terms of the first through tenth embodiments, it is to be understood that the invention is by no means limited to the specific disclosure of the illustrated embodiments, and may be embodied with various changes, modifications and improvements which may occur to those skilled in the art without departing from the spirit and scope of the invention.

For example, in the preceding first through tenth embodiments, the portion imparted higher rigidity compared to the elastic valve portion 76, 276 in the obstructing rubber elastic plate 66, 84, 88, 90, 96, 100, 266, 288, 292, 300 is defined by the thick rubber portions or the portion of the rubber plate 102, 302 to which the reinforcing member 104, 304 is disposed by being embedded therein. However, it would also be possible that the partition member 30, 230 or the pressure receiving chamber-side cover member 32, 232 is provided with a projection that partially comes into abutment or undergoes constrained deformation against a rubber plate having thick dimension unchanging throughout. With this arrangement, the rubber plate includes a high-rigidity portion by means of the portion where the projection strikes. Alternatively, it is acceptable to define a high-rigidity portion through a single-layer structure of rigid member such as a metal fitting, a synthetic resin material, or the like.

Moreover, in the state where the obstructing rubber elastic plate 66, 84, 88, 90, 96, 266, 288, 292 is superposed against the partition member 30, 230, there is no need for the center mounting portion 68, 268, the spoke-shaped retaining portion 72, 272, the circumference retaining portion 74, 274 etc. of the obstructing rubber elastic plate 66, 84, 88, 90, 96, 266, 288, 292 to be held clamped between the pressure receiving chamber-side cover member 32, 232 and the partition member 30, 230. For instance, the center mounting portion 68, 268, the spoke-shaped retaining portion 72, 272, and the circumference retaining portion 74, 274 could instead be simply situated in abutment against the pressure receiving chamber-side cover member 32, 232 or be positioned in opposition to the pressure receiving chamber-side cover member 32, 232 with a given spacing therebetween.

Furthermore, in the preceding first through fifth, and seventh through ninth embodiments, the center section of the obstructing rubber elastic plate 66, 84, 88, 90, 96, 266, 288, 292 (center mounting portion 68, 268) is elastically fitted around the center projection 36, 236 of the partition member 30, 230 while the center section and the outside peripheral section of the obstructing rubber elastic plate 66, 84, 88, 90, 96, 266, 288, 292 is held clamped by the dividing wall member 28, 228, thereby securing the obstructing rubber elastic plate 66, 84, 88, 90, 96, 266, 288, 292 to the dividing wall member 28, 228. However, it would also be possible for example to secure the obstructing rubber elastic plate 66, 84, 88, 90, 96, 266, 288, 292 to at least one of the pressure receiving chamber-side cover member 32, 232 and the partition member 30, 230 of the dividing wall member 28, 228 with machine screws, bolts, or the like.

It would also be acceptable that both of the surface of the partition member 230 superposed against the obstructing rubber elastic plate 266, 288, 292, 300 and the surface of the obstructing rubber elastic plate 266, 288, 292, 300 superposed against the partition member 230 include recesses that are identical with or different from each other. An obstructed space can be defined cooperatively by the two recesses.

Figure 36:
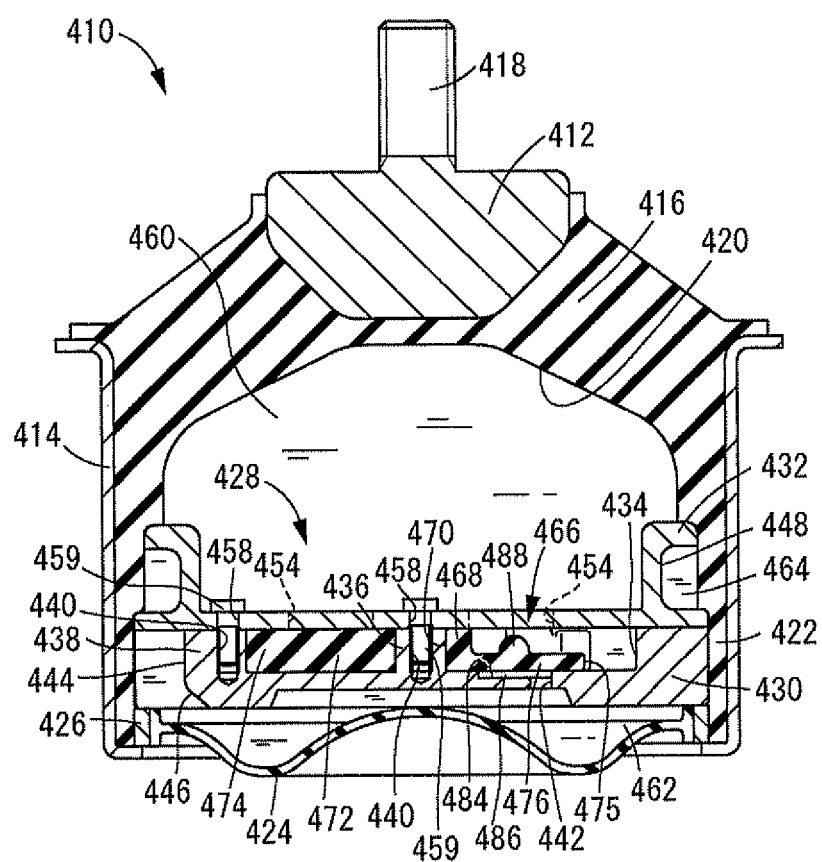
FIG. 36 is an axial or vertical cross sectional view of an automotive engine mount of construction according to an eleventh embodiment of the present invention, taken along line 36-36 of FIG. 37.

Referring next to FIG. 36, there is depicted an automotive engine mount 410 as a seventh embodiment of the fluid filled type vibration damping device according to the present invention. The automotive engine mount 410 has a construction in which a first mounting member 412 of metal and a second mounting member 414 of metal are connected to each other by a main rubber elastic body 416. The first mounting member 412 is mounted onto the power unit of the automobile, while the second mounting member 414 is mounted onto the vehicle body, thereby providing vibration damped linkage of the power unit and the vehicle body via the engine mount 410.

Whereas FIG. 36 depicts the automotive engine mount 410 in isolation prior to installation in a vehicle, with the engine mount 410 installed in the vehicle, distributed load of the power unit is input in the mount axial direction (the vertical direction in FIG. 36), thereby inducing displacement of the first mounting member 412 and the second mounting member 414 in the direction closer together in the mount axial direction, whereupon the main rubber elastic body 416 elastically deforms. In this installed state, principle vibration targeted for damping is input approximately in the mount axial direction. In the description hereinbelow, unless indicated otherwise, vertical direction refers to the vertical direction in FIG. 36.

To describe in greater detail, the first mounting member 412 has a generally round block shape and an upwardly projecting mounting bolt 418 is integrally formed with the first mounting member 412. The first mounting member 412 can be attached to the power unit by fastening the mounting bolt 418 to the power unit.

Meanwhile, the second mounting member 414 has a large-diameter, generally round tube shape and will be mounted onto the vehicle body through the agency of a bracket fitting (not shown) or the like. The first mounting member 412 is arranged spaced apart from the second mounting member 414 on the upper opening side thereof, and the main rubber elastic body 416 is positioned between the opposed faces of the first mounting member 412 and the second mounting member 414.

The main rubber elastic body 416 has a generally frusto-conical shape. The outside peripheral face of the first mounting member 412 is affixed to the small-diameter end face of the main rubber elastic body 416 while the inside peripheral face of the second mounting member 414 is affixed to the outside peripheral face of the large-diameter end of the main rubber elastic body 416. With this arrangement, the first mounting member 412 and the second mounting member 414 are elastically linked through the main rubber elastic body 216 while the upper opening of the second mounting member 414 is sealed off fluid-tightly by the main rubber elastic body 416. In addition, a large-diameter recess 420 of inverted conical shape is formed in the large-diameter end face of the main rubber elastic body 416 and opens to inside of the second mounting member 414, while a thin-walled seal rubber layer 422 is formed covering the inside peripheral face of the second mounting member 414. Moreover, a flexible film 424 is disposed at the lower end of the second mounting member 414.

The flexible film 424 is a rubber film of thin, generally circular shape overall and is allowed to deform readily. A large-diameter ring-shaped fastener fitting 426 is affixed to the outer peripheral edge of the flexible film 424. The fastener fitting 426 is fitted internally into the lower end of the second mounting member 414, then the second mounting member 414 is subjected to a diameter reduction process such as 360-degree radial compression to fasten the fastener fitting 426 in a state of intimate contact against the second mounting member 414 via the seal rubber layer 422. By so doing, the flexible film 424 is secured to the second mounting member 414 so that the lower opening of the second mounting member 414 is sealed off fluid-tightly by the flexible film 424.

Figure 37:
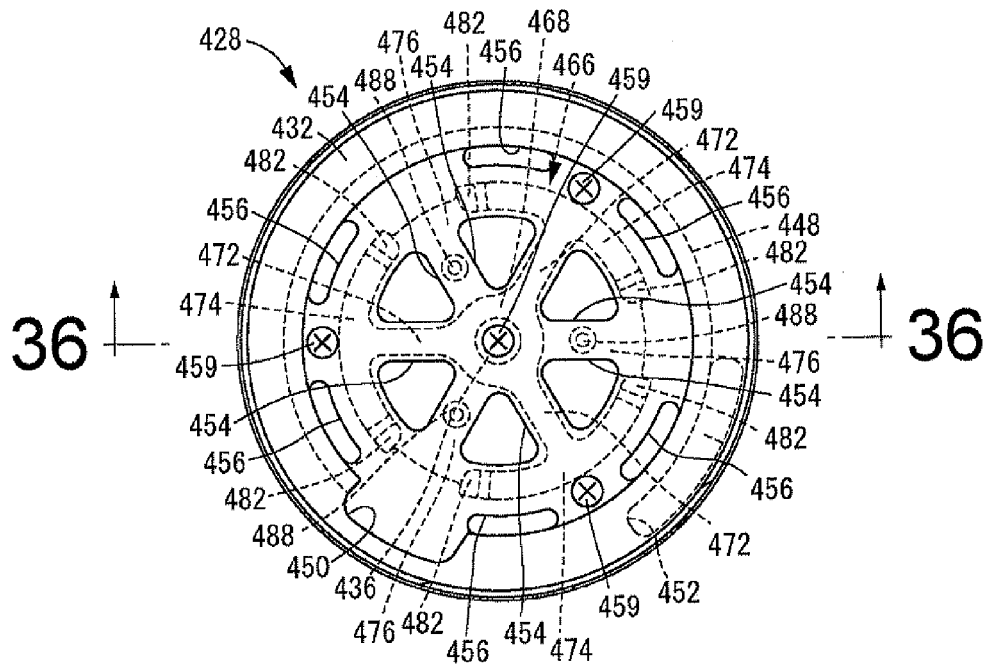
FIG. 37 is a top plane view of a dividing wall member of the automotive engine mount of FIG. 36 with an obstructing rubber elastic plate attached thereto.
Figure 38:
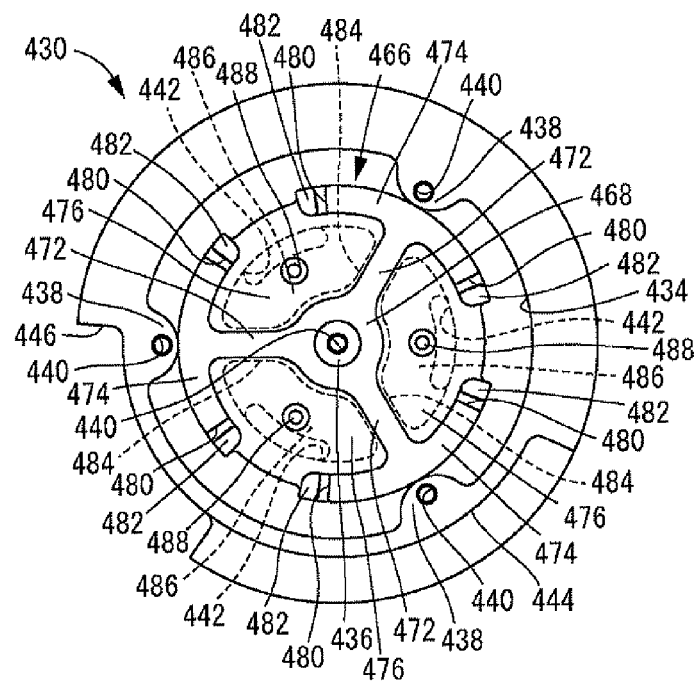
FIG. 38 is a top plane view of a partition member of the dividing wall member of FIG. 37 with the obstructing rubber elastic plate attached thereto.
Figure 39:
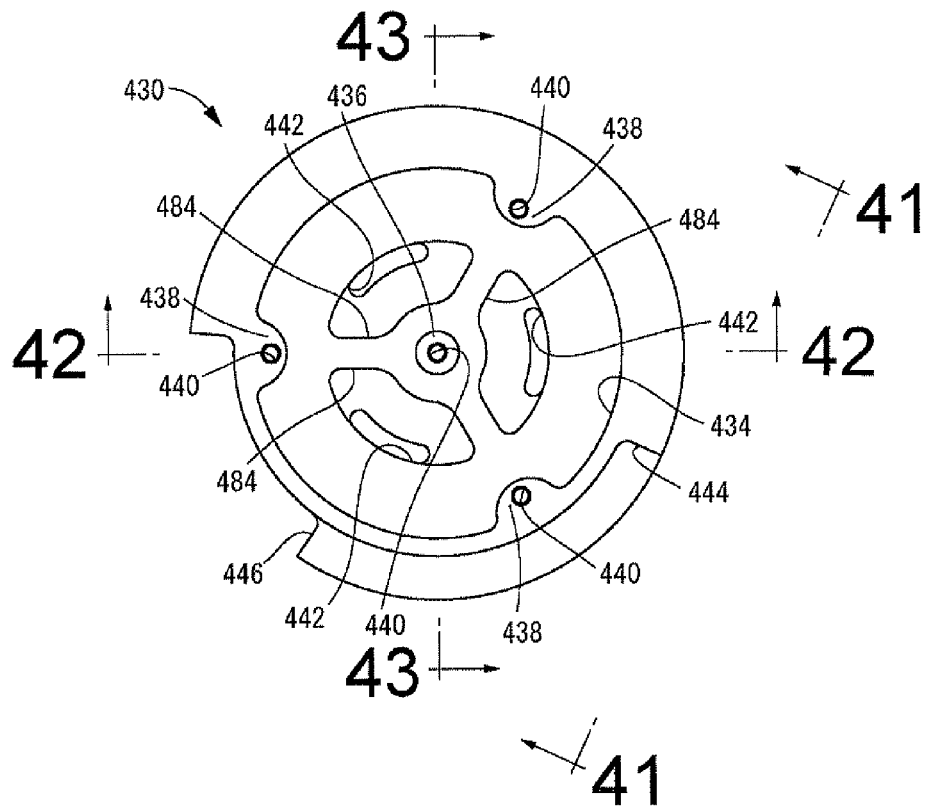
FIG. 39 is a top plane view of the partition member of FIG. 38.
Figure 40:
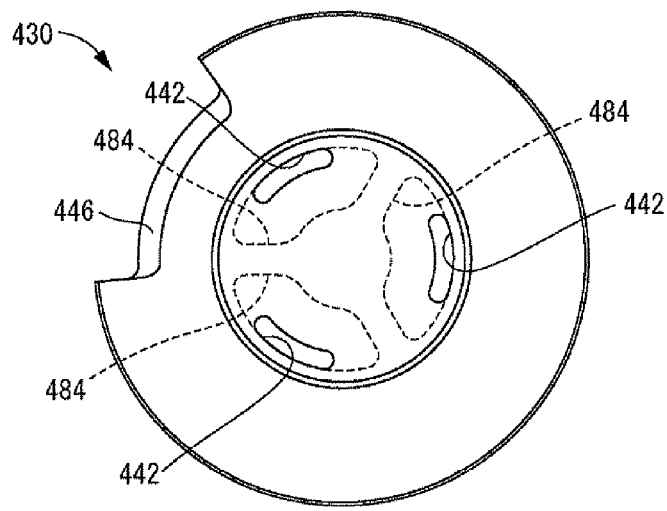
FIG. 40 is a bottom plane view of the partition member of FIG. 39.
Figure 41:
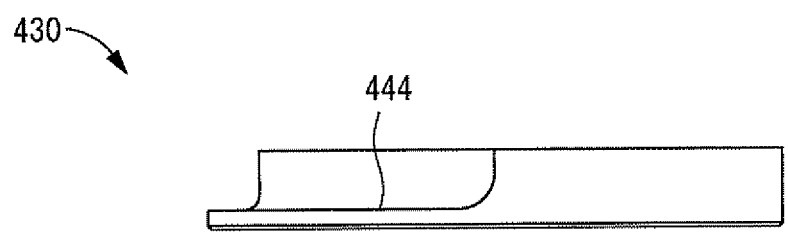
FIG. 41 is a view as seen in a direction indicated by allows 41 of FIG. 39.
Figure 42:
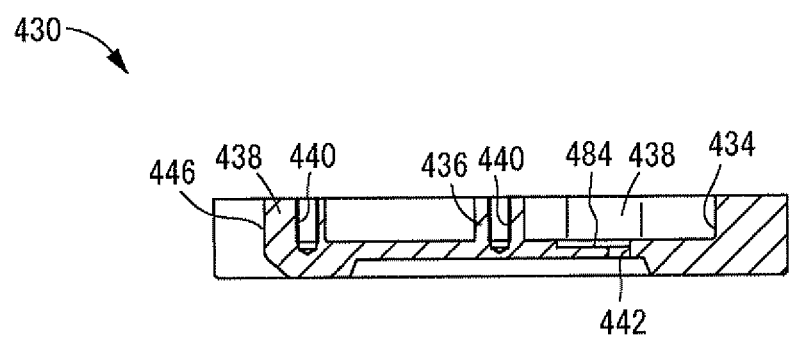
FIG. 42 is a cross sectional view taken along line 42-42 of FIG. 39.
Figure 43:
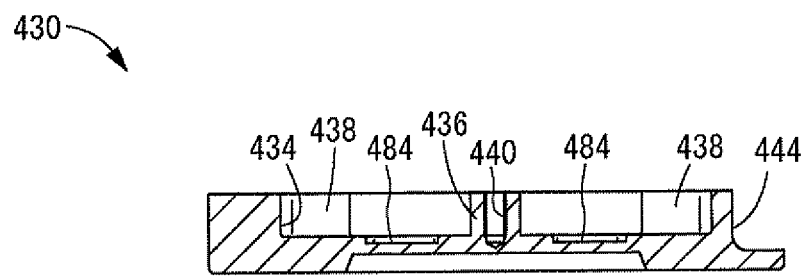
FIG. 43 is a cross sectional view taken along line 43-43 of FIG. 39.

A dividing wall member 428 is disposed between axially opposed faces of the main rubber elastic body 416 and the flexible film 424 inside the second mounting member 414. As depicted in FIG. 37, the dividing wall member 428 has a generally round block shape overall and is made of material having relatively high rigidity, for example a metallic material such as aluminum alloy or a synthetic resin material such as polypropylene (PP). The dividing wall member 428 includes a partition member 430 of metal and a pressure receiving chamber-side cover member 432 of metal.

As depicted in FIGS. 38 through 43, the partition member 430 has a generally circular disk shape and in its diametrically center section there is formed a housing recess 434 of circular shape opening upwardly. In the diametrically center section of the housing recess 434 a center projection 436 is formed projecting from the bottom wall, while on the peripheral wall of the housing recess 434 a plurality of outside peripheral projections 438 are provided projecting diametrically inward and arranged at a uniform interval in the circumferential direction. The upper end face of these center projection 436 and each of the outside peripheral projection 438 has a bored screw hole 440.

In the diametrical medial section of the bottom wall of the housing recess 434 is perforated by a plurality of communication apertures 442 that are spaced apart from one another in the circumferential direction. The communication apertures 442 according to the present embodiment take the form of elongated slots extending in the circumferential direction and three communication apertures 442 are arranged at a uniform interval. Additionally, in the outside peripheral section of the partition member 430 there is formed a lower circumferential groove 444 that opens onto the upper end face and the outer circumferential face, extending continuously for a prescribed length in the circumferential direction (in the present embodiment, just short of halfway about the circumference). At one circumferential end side of the lower circumferential groove 444 there is formed an opening 446 that opens onto the lower end face of the partition member 430.

Meanwhile, the pressure receiving chamber-side cover member 432 has a shallow, generally round tubular shape with a bottom. In the tubular section of the pressure receiving chamber-side cover member 432 there is formed an upper circumferential groove 448 that opens onto the outer circumferential face thereof and extends continuously for a prescribed length in the circumferential direction (in the present embodiment, just short of once around the circumference). At one circumferential end side of the upper circumferential groove 448 there is formed an opening 450 that opens onto the inside wall, while at the other circumferential end side of the upper circumferential groove 448 there is formed a connecting window 452 that opens onto the lower end face of the pressure receiving chamber-side cover member 432. The center side section of the bottom wall of the pressure receiving chamber-side cover member 432 is perforated by a plurality of through-holes 454 that are spaced apart from one another in the circumferential direction, while the outside peripheral side section of the bottom wall is perforated by a plurality of communication holes 456 with circumferentially elongated extension that are spaced apart from one another in the circumferential direction. Furthermore, the diametrically center section of the bottom wall and locations different from the communication hole 456 in the outside peripheral side of the bottom wall are perforated by a plurality of insertion holes 458.

The pressure receiving chamber-side cover member 432 is superposed against the partition member 430 from above. At the same time, the screw holes 440 of the partition member 430 and the insertion holes 458 of the pressure receiving chamber-side cover member 432 are respectively aligned with one another, with a plurality of fastening machine screws 459 inserted through the respective insertion holes 458 and screw-fastened to the corresponding screw holes 440. By so doing, the partition member 430 and the pressure receiving chamber-side cover member 432 are aligned in the circumferential direction and at the same time fastened to each other, thereby defining the dividing wall member 428. Also, the opening of the housing recess 434 of the partition member 430 is covered by the pressure receiving chamber-side cover member 432. The upper opening of the lower circumferential groove 444 of the partition member 430 is covered by the pressure receiving chamber-side cover member 432. The lower circumferential groove 444 and the upper circumferential groove 448 of the pressure receiving chamber-side cover member 432 are aligned with each other at the other circumferential end of each so as to be connected with each other through the connecting window 452. With this arrangement, the upper circumferential groove 448 and the lower circumferential groove 444 are connected in series to form a circumferential groove of helical shape that extends for a prescribed length along the outside peripheral section of the dividing wall member 428.

Prior to assembly of the flexible film 424 and the second mounting member 414 as described above, the dividing wall member 428 is fitted internally into the second mounting member 414, then the second mounting member 414 is subjected to a diameter reduction process such as 360-degree radial compression to fasten the dividing wall member 228 in a state of intimate contact against the second mounting member 414 via the seal rubber layer 422. By so doing, the space between axially opposed faces of the main rubber elastic body 416 and the flexible film 424 inside the second mounting member 414 is fluid-tightly divided into two parts by the dividing wall member 428.

To one side of the dividing wall member 428 (the upper side in FIG. 36) there is formed a pressure receiving chamber 460 whose wall is partially defined by the main rubber elastic body 416 and that gives rise to pressure fluctuations in association with input of vibration across the first mounting member 412 and the second mounting member 414. Meanwhile, to the other side of the dividing wall member 428 (the lower side in FIG. 36) there is formed an equilibrium chamber 462 whose wall is partially defined by the flexible film 424 and that readily permits changes in volume. The pressure receiving chamber 460 and the equilibrium chamber 462 are filled with a non-compressible fluid defined by a low-viscosity fluid having viscosity of 0.1 Pa·s or lower such as water, an alkylene glycol, a polyalkylene glycol or the like, for example.

The upper and lower circumferential grooves 448, 444 of the dividing wall member 428 are sealed off fluid-tightly by the second mounting member 414 via the seal rubber layer 422. With this arrangement, there is formed an orifice passage 464 of helical shape that extends for a prescribed length (in the present embodiment, a length equivalent to between just short of once and just short of once-and-a-half the distance around the circumference) along the outside peripheral section of the dividing wall member 428. The one end of the orifice passage 464 is connected with the pressure receiving chamber 460 through the opening 450 of the pressure receiving chamber-side cover member 432, while the other end of the orifice passage 464 is connected with the equilibrium chamber 462 through the opening 446 of the partition member 430. By so doing, the pressure receiving chamber 460 and the equilibrium chamber 462 are connected with each other by the orifice passage 464 adapted to produce fluid flow through the orifice passage 464 depending on pressure differential between the pressure receiving chamber 460 and the equilibrium chamber 462 due to input of vibration. Thus, vibration damping effect will be exhibited on the basis of resonance action or other flow action of the fluid. The resonance frequency of the fluid that flows through the orifice passage 464 is established based on passage cross sectional area, passage length, or the like, and in the present embodiment, it is established in a low frequency range on the order of 10 Hz, corresponding to engine shake of an automobile, for example.

Additionally, in the partition member 430, the housing recess 434 of annular shape covered by the pressure receiving chamber-side cover member 432 communicates with the pressure receiving chamber 460 through the through-holes 454 and the communication holes 456 of the pressure receiving chamber-side cover member 432, and communicates with the equilibrium chamber 462 through the communication apertures 442 of the partition member 430. In this respect, prior to assembly of the partition member 430 and the pressure receiving chamber-side cover member 432, an obstructing rubber elastic plate 466 is arranged in the housing recess 434 so as to be superposed against the bottom wall of the housing recess 434 from the upper opening thereof, namely, the pressure receiving chamber 460 side.

Figure 44:
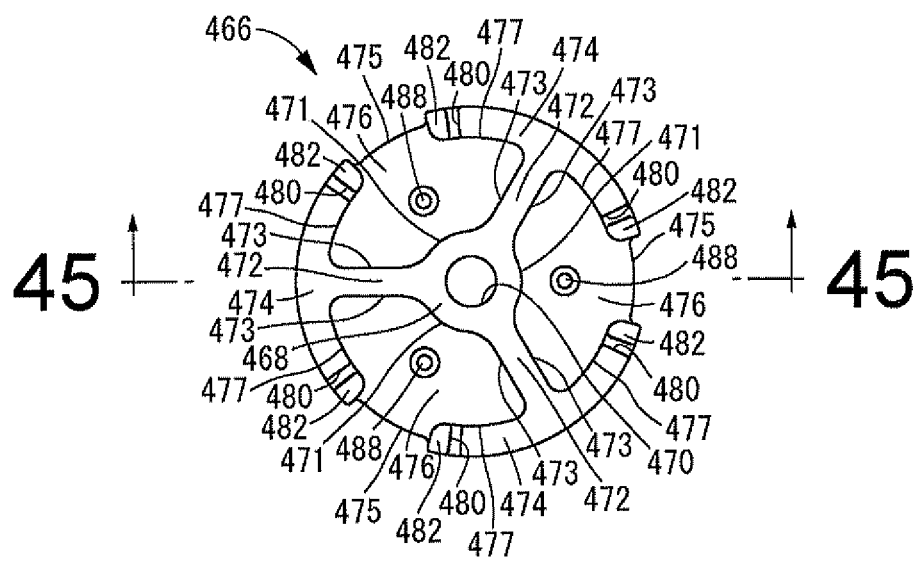
FIG. 44 is a top plane view of the obstructing rubber elastic plate of FIG. 37.
Figure 45:
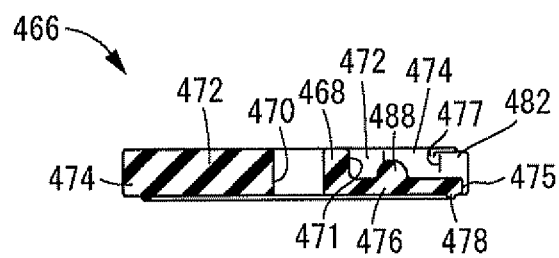
FIG. 45 is a cross sectional view taken along line 45-45 of FIG. 44.

As depicted in FIGS. 44 and 45, the obstructing rubber elastic plate 466 has a generally circular disk shape overall, and is made of a rubber elastic material. In the diametrical center section of the obstructing rubber elastic plate 466 there is formed a center mounting portion 468 of generally round tubular shape. The center projection 436 of the partition member 430 is passed through a borehole 470 of the center mounting portion 468. Accordingly, the lower end face of the center mounting portion 468 is superposed against the upper end face of the bottom wall of the housing recess 434 over the area located diametrically inside of each of the communication apertures 442. Meanwhile, the upper end face of the center mounting portion 468 is superposed against the lower end face of the bottom wall of the pressure receiving chamber-side cover member 432 over the area located diametrically inside of each of the through-holes 454.

In addition, in the diametrically medial section of the obstructing rubber elastic plate 466, three spoke-shaped retaining portions 472 that extend radially from the center mounting portion 468 towards the outside peripheral section of the obstructing rubber elastic plate 466 are formed at equidistant intervals in the circumferential direction. Accordingly, each of the spoke-shaped retaining portions 472 is positioned between the bottom wall of the housing recess 434 and the bottom wall of the pressure receiving chamber-side cover member 432 axially opposed to each other, while being arranged between circumferentially adjacent each pair of the communication apertures 442, 442 of the housing recess 434 and also between the plurality of through-holes 454 of the pressure receiving chamber-side cover member 432.

Moreover, a seal rib 478 of generally annular shape is integrally formed with the lower end face of the obstructing rubber elastic plate 466 in the outside peripheral side thereof, and extends continuously in the circumferential direction. The seal rib 478 is superposed against the bottom wall of the housing recess 434 over the area located diametrically outside of the each of the communication apertures 442. Specifically, the obstructing rubber elastic plate 466 is superposed against the partition member 430 so as to cover the plurality of the communication aperture 442 entirely while the outer peripheral edge of the obstructing rubber elastic plate 466 is situated diametrically outside of the outer peripheral edge of the each communication aperture 442. Also, the outer peripheral edge of the obstructing rubber elastic plate 466 is situated diametrically outside of the each through-hole 454 of the pressure receiving chamber-side cover member 432 while being situated diametrically inside of the each communication hole 456. Additionally, the generally entire lower end surface of the obstructing rubber elastic plate 466 has a generally planar shape except in the section where the projecting seal rib 478 is formed.

Furthermore, in the outer peripheral edge of the obstructing rubber elastic plate 466 according to the present embodiment, three circumference retaining portions 474 of generally arcuate shape are formed at equidistant intervals in the circumferential direction. The circumferentially center section of the each circumference retaining portion 474 is situated in abutment against the distal end portion of the each spoke-shaped retaining portion 472 extending diametrically outward from the center mounting portion 468.

The thickness dimension of each of the center mounting portion 468, the spoke-shaped retaining portions 472, and the circumference retaining portions 474 is approximately identical with one another, while being greater than the dimension between axially opposed faces of the bottom wall of the pressure receiving chamber-side cover member 432 and the bottom wall of the housing recess 434 of the partition member 430 (the axial distance between the two bottom walls). With this arrangement, the center mounting portion 468, the spoke-shaped retaining portions 472, and the circumference retaining portions 474 are subjected to compressive deformation in the axial direction between the two bottom walls of the partition member 430 and the pressure receiving chamber-side cover member 432 within the housing recess 434. Meanwhile, the state of compressive deformation is held by fastening force of the partition member 430 and the pressure receiving chamber-side cover member 432, whereby the center mounting portion 468, the spoke-shaped retaining portions 472, and the circumference retaining portions 474 are held clamped by the dividing wall member 428. Additionally, the seal rib 478 of the obstructing rubber elastic plate 466 is also subjected to compressive deformation and is in intimate contact against the diametrically outside of the plurality of communication apertures 442. Moreover, the center mounting portion 468 is elastically secured fitting around the center projection 436 of the partition member 430. Furthermore, each of the circumference retaining portions 474 is pressed at the outside peripheral face of its circumferentially center section against the projecting distal end face of the each outside peripheral projection 438 of the partition member 430 situated diametrically inside. Consequently, the obstructing rubber elastic plate 466 is held in contact against the partition member 430, whereby the plurality of communication apertures 442 are fluid-tightly sealed off by the obstructing rubber elastic plate 466. As will be apparent from the above description, contact retaining portions that hold the obstructing rubber elastic plate 466 of the present embodiment in contact against the partition member 430 include the center mounting portion 468, spoke-shaped retaining portions 472, and the circumference retaining portions 474, while being integrally formed with the obstructing rubber elastic plate 466.

On the other hand, an elastic valve portion 476 serving as an elastic deformation zone is formed between the circumferentially adjacent each pair of the spoke-shaped retaining portions 472, 472 of the obstructing rubber elastic plate 466. The elastic valve portion 476 has generally fan-shaped contours that expand from the center of the obstructing rubber elastic plate 466 towards the outside in the diametrical direction. An inner peripheral edge 471 of the elastic valve portion 476 is in contact with the outer peripheral edge portion (face) of the center mounting portion 468 while end edges 473 on the circumferentially opposite sides of the elastic valve portion 476 are in contact with the circumferential end portions (faces) of the each spoke-shaped retaining portion 472. The each elastic valve portion 476 has a thickness dimension smaller than that of the center mounting portion 468, the spoke-shaped retaining portion 472, and the circumference retaining portion 474. In addition, the thickness dimension of the each elastic valve portion 476 is made smaller than the dimension between axially opposed faces of the bottom wall of the pressure receiving chamber-side cover member 432 and the bottom wall of the housing recess 434 of the partition member 430. Thus, the each elastic valve portion 476 is positioned in opposition to the pressure receiving chamber-side cover member 432 with a given spacing therebetween in the direction of superposition of the obstructing rubber elastic plate 466 and the partition member 430.

Furthermore, at the each circumferential end of each of the circumference retaining portions 474 of the obstructing rubber elastic plate 466, there is integrally formed a stepped portion 482 by providing a groove 480 that extends in the diametrical direction with a cutout contours. The thickness dimension (height dimension) of the stepped portion 482 is greater than that of the elastic valve portion 476, while being smaller than that of the circumference retaining portion 474. In the state where the obstructing rubber elastic plate 466 is superposed against the partition member 430, the stepped portion 482 is positioned spaced apart from the pressure receiving chamber-side cover member 432.

In the present embodiment in particular, the outer peripheral edge of the elastic valve portion 476 includes a central outer peripheral edge 475 situated in its circumferential center and a pair of end-side outer peripheral edges 477, 477 situated in its circumferential ends. Between the stepped portions 482, 482 situated between the circumferentially adjacent pair of the circumference retaining portions 474, 474, the central outer peripheral edge 475 is positioned diametrically outside of the inner peripheral edge of the circumference retaining portion 474 while being positioned diametrically inside of the outer peripheral edge of the circumference retaining portion 474. The each end-side outer peripheral edge 477 is in contact with the circumferential end of the stepped portion 482 as well as with the inner peripheral edges of the stepped portion 482 and the circumference retaining portion 474 so as to protrude from the each circumferential end of the central outer peripheral edge 475 into the inside of the obstructing rubber elastic plate 466. That is, in the present embodiment, the circumference retaining portion 474 and the stepped portion 482 are integrally formed with the end-side outer peripheral edge 477 of the elastic valve portion 476. Additionally, the outer peripheral edges 475, 477 are situated diametrically inside of the each communication hole 456 of the pressure receiving chamber-side cover member 432. With this arrangement, the each communication hole 456 is provided at the location away from the axially opposed portion against the outer peripheral edges 475, 477 of the elastic valve portion 476. Also, the central outer peripheral edge 475 of the each elastic valve portion 476 is positioned in opposition to the corresponding communication aperture 442 of the partition member 430 at the diametrically outside of the communication aperture 442.

Moreover, in the upper end face of the bottom wall of the housing recess 434 of the partition member 430 that is superposed against the lower end face of the obstructing rubber elastic plate 466 there are formed recesses 484 opening towards the each elastic valve portion 476 of the obstructing rubber elastic plate 466. Each of the recesses 484 has generally fan-shaped contours that is slightly smaller than that of the each elastic valve portion 476 of the obstructing rubber elastic plate 466 and is positioned in opposition to the each elastic valve portion 476 in the direction of superposition of the obstructing rubber elastic plate 466 and the partition member 430. Therefore, the entire opening of the each recess 484 is covered by the corresponding elastic valve portion 476. With this arrangement, there are formed three obstructed spaces 486, 486, 486 at equidistant intervals in the circumferential direction between the obstructing rubber elastic plate 466 and the partition member 430 superposed against each other. The each obstructed space 486 is fluid-tightly divided from the housing recess 434 and hence the pressure receiving chamber 460 on the basis of the outer peripheral edge of the obstructing rubber elastic plate 466 being in intimate contact against the bottom wall of the housing recess 434 via the seal rib 478. Additionally, the each communication aperture 442 of the partition member 430 is positioned so as to open at the diametrically outer edge side in the circumferentially center section of the bottom wall of the corresponding recess 484. Accordingly, the each obstructed space 486 communicates with the equilibrium chamber 462 through the communication aperture 442.

At this point, each of the elastic valve portions 476 of the obstructing rubber elastic plate 466 has a contacting projection 488 at the generally center section in the diametrical and circumferential direction of the elastic valve portion 476. The contacting projection 488 is made of a rubber elastic material that is integrally formed with the elastic valve portion 476 and projects towards the pressure receiving chamber-side cover member 432. A distal end portion of the contacting projection 488 has a generally semispherical shape so as to provide the contacting projection 488 with a tapered contour. In addition, the height dimension of the contacting projection 488 is made smaller than that of the stepped portion 482. Accordingly, in the state where the obstructing rubber elastic plate 466 is superposed against the partition member 430, the contacting projection 488 is positioned spaced apart from the bottom wall of the pressure receiving chamber-side cover member 432 situated circumferentially between the each through-hole 454 with a separation distance larger than a distance separating the stepped portion 482 from the pressure receiving chamber-side cover member 432. In particular, the each contacting projection 488 according to the present embodiment is arranged diametrically inside of the corresponding communication aperture 442 of the partition member 430.

In the obstructing rubber elastic plate 466 as described above, pressure of the pressure receiving chamber 460 acts on the each upper end face of the elastic valve portion 476, stepped portion 482, and contacting projection 488 through the through-hole 454 and the communication hole 456 of the pressure receiving chamber-side cover member 432. Meanwhile, pressure of the equilibrium chamber 462 acts on the lower end face of the elastic valve portion 476 through the obstructed space 486 and the communication aperture 442 of the partition member 430. With this arrangement, the elastic valve portion 476, the stepped portion 482, and the contacting projection 488 will undergo deformation and displacement depending on pressure differential between the pressure receiving chamber 460 and the equilibrium chamber 462. Also, the stepped portion 482 will come into abutment against the pressure receiving chamber-side cover member 432 thereby limiting deformation and displacement of the elastic valve portion 476 in the direction of separation from the partition member 430 in the end-side outer peripheral edge 477 and in the vicinity of the end-side outer peripheral edge 477. Here, the contacting projection 488 will come into abutment against the pressure receiving chamber-side cover member 432 so as to limit deformation and displacement of the elastic valve portion 476 in the direction of separation from the partition member 430 at the generally center section in the diametrical and circumferential direction of the elastic valve portion 476. Accordingly, an elastic deformation limiting member of the center section of the elastic valve portion 476 includes the contacting projection 488 and the pressure receiving chamber-side cover member 432.

In the automotive engine mount 410 constructed as above, during input of vibration that is in a high frequency range equal to or greater than a medium-frequency vibration and corresponds to idling vibration or driving rumble etc., the orifice passage 464 tuned to lower frequency range than the input vibration will become substantially closed off through antiresonance action or other action of the fluid flowing therethrough. In addition, in the case where the above-described high-frequency vibration has an amplitude on the order of ±0.05 to 0.1 mm, for example, and pressure differential between the pressure receiving chamber 460 and the equilibrium chamber 462 acting respectively on the front and back faces of the obstructing rubber elastic plate 466 is small, the each of the stepped portions 482 provided to the circumferentially opposite sides of the corresponding elastic valve portion 476 is positioned in abutment with the partition member 430.

Figure 46:
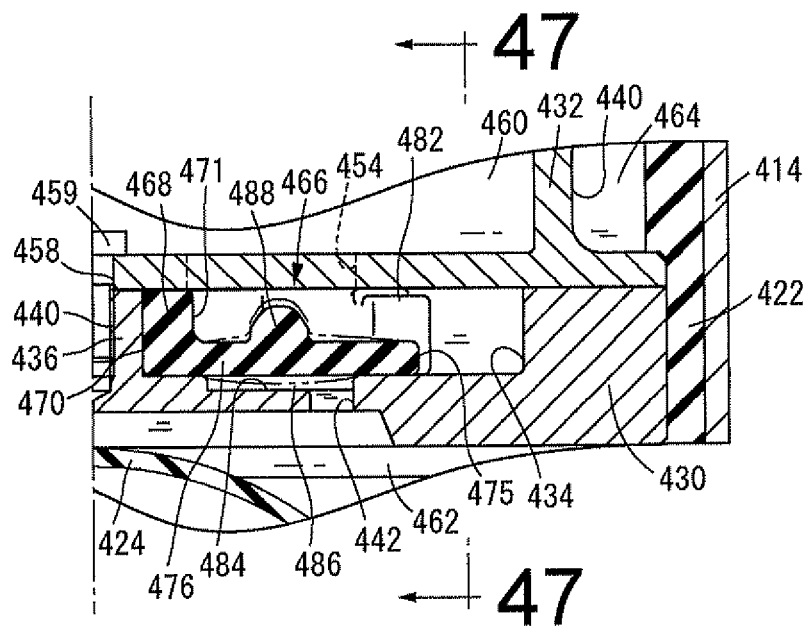
FIG. 46 is an enlarged view in axial or vertical cross section showing a principle part of the automotive engine mount of FIG. 36.
Figure 47:
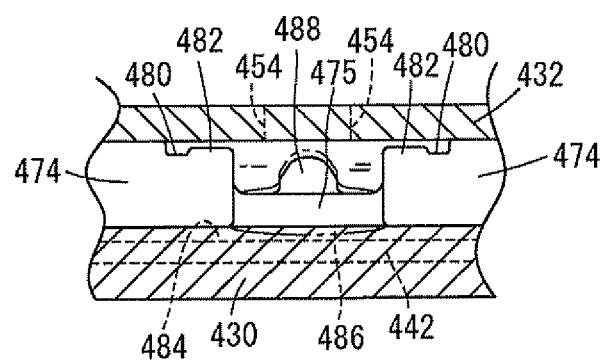
FIG. 47 is a cross sectional view taken along line 47-47 of FIG. 46.

Here, at times of input of above-described high-frequency, small-amplitude vibration, as indicated by chain double-dashed line in FIGS. 46 and 47, the elastic valve portion 476 furnished with the contacting projection 488 will experience minute deformations. In the present embodiment in particular, in a state as depicted in FIG. 36 wherein no vibration is input to the device, the each contacting projection 488 is positioned spaced apart from the pressure receiving chamber-side cover member 432 while the each elastic valve portion 476 is positioned spaced apart from the bottom wall of the recess 484. Accordingly, when the elastic valve portion 476 experiences minute deformations, the abutment of the contacting projection 488 and the pressure receiving chamber-side cover member 432 as well as the abutment of the elastic valve portion 476 and the partition member 430 can be actively avoided. The distance separating the elastic valve portion 476 from the bottom wall of the recess 484 and the distance separating the contacting projection 488 from the pressure receiving chamber-side cover member 432 are preferably set large enough so that, when high-frequency, small-amplitude vibration intended to be damped is input and the elastic valve portion 476 undergoes deformation and displacement to the maximum extent, the elastic valve portion 476 and the contacting projection 488 will not come into abutment against the partition member 430 and the pressure receiving chamber-side cover member 432 respectively. With this arrangement, it is possible to prevent the elastic valve portion 476 from coming into contact against the pressure receiving chamber-side cover member 432 via the contacting projection 488 or against the partition member 430 and hence to avoid considerably limiting the amount of minute deformations of the elastic valve portion 476. Accordingly, intended vibration damping effect (low dynamic spring effect) will be stably exhibited through liquid pressure-absorbing action of the pressure receiving chamber 460 owing to the above-described deformations.

Figures 48, 49:
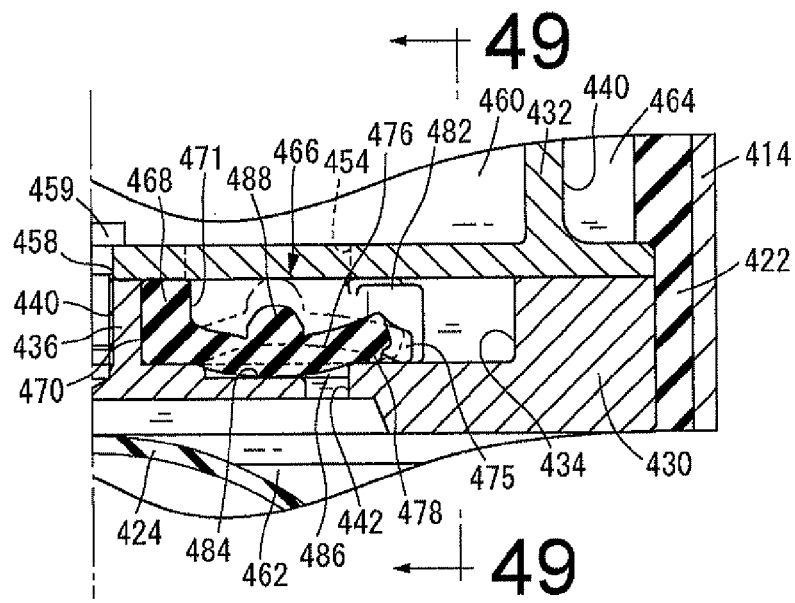
FIG. 48 is an enlarged view in axial or vertical cross section showing a principle part of the automotive engine mount of FIG. 36, in one operation state different from the state shown in FIG. 46.
FIG. 49 is a cross sectional view taken along line 49-49 of FIG. 48.

On the other hand, during input of low-frequency, large-amplitude vibrations with an amplitude of ±1 to 2 mm, for example, which correspond to engine shake, as depicted in FIGS. 48 and 49, the elastic valve portion 476 undergoes appreciable elastic deformation towards the equilibrium chamber 462 side and comes into abutment against the bottom wall of the recess 484. Specifically, in a state as depicted in FIG. 36 wherein no vibration is input to the device, the height dimension of the obstructed space 486 which corresponds to the distance between the opposed faces of the elastic valve portion 476 and the bottom wall of the recess 484 is made smaller than the maximum value of deformation or displacement of the elastic valve portion 476 towards the bottom wall of the recess 484 when low-frequency, large-amplitude vibration is input to the device. With this arrangement, deformation and displacement of the elastic valve portion 476 will be limited.

Moreover, the obstructing rubber elastic plate 466 is endowed with elastic rigidity so that during input of low-frequency, large-amplitude vibration the stepped portion 482 will not deform or displace to a large extent so as to be spaced away from the partition member 430 and come into contact with the pressure receiving chamber-side cover member 432. With this arrangement, even in the case, for example, where the central outer peripheral edge 475 of the elastic valve portion 476 becomes spaced away from the partition member 430 so as to open up the communication aperture 442, displacement of the end-side outer peripheral edges 477 of the elastic valve portion 476 away from the partition member 430 will be inhibited through limitation of deformation and displacement of the stepped portion 482. By so doing, the obstructed space 486 will opens by a sufficiently small amount with respect to the housing recess 434, whereby the communication between the pressure receiving chamber 460 and the equilibrium chamber 462 through the communication aperture 442 is substantially cut off by the obstructing rubber elastic plate 466. This makes it possible to prevent extreme pressure leakage from the pressure receiving chamber 460 through the communication aperture 442.

It would also be possible for example to design the obstructing rubber elastic plate 466 and the dividing wall member 428 so that during input of low-frequency, large-amplitude vibration the contacting projection 488 will come into contact with the pressure receiving chamber-side cover member 432, as indicated by the chain double-dashed line in FIGS. 48 and 49. By so doing, deformation and displacement of the elastic valve portion 476 as well as an amount of opening of the obstructed space 486 will be further limited.

Accordingly, during input of low-frequency, large-amplitude vibration that corresponds to engine shake or other vibration, pressure fluctuations in the pressure receiving chamber 460 will be kept from escaping through the communication aperture 442 any more than necessary. In addition, liquid pressure absorption of the pressure receiving chamber 460 due to deformation and displacement of the elastic valve portion 476 will be limited. Consequently, a sufficient amount of fluid that flows through the orifice passage 464 can be ensured, thereby stably achieving a desired vibration damping effect (high attenuating or damping action).

Furthermore, when the automobile rides up over a curb or drives over very bumpy roadway and an excessive or sharp vibration load with an amplitude of ±2 mm or greater, for example, is input, there may be occur an excessive fluctuations of the pressure differential between the pressure receiving chamber 460 and the equilibrium chamber 462, causing the pressure in the pressure receiving chamber 460 to considerably drop. Here, the pressure that causes the elastic valve portion 476 to undergo elastic deformation in the direction of separation from the partition member 430 is sufficiently greater than the force that holds the obstructing rubber elastic plate 466 in contact against the partition member 430 by means of the contact retaining portions defined by the center mounting portion 468, the spoke-shaped retaining portions 472, and the circumference retaining portions 474. With this arrangement, the elastic valve portion 476 undergoes appreciable elastic deformation from the partition member 430 towards the pressure receiving chamber 460 and the contacting projection 488 comes into abutment against the pressure receiving chamber-side cover member 432. Consequently, elastic deformation of the elastic valve portion 476 will be limited at the portion which is superposed against the pressure receiving chamber-side cover member 432 via the contacting projection 488. At the same time, strain (elastic deformation) of the portion where no contacting projection 488 is provided will be greater.

In this respect, the contacting projection 488 is provided at the generally center section of the elastic valve portion 476 in the diametrical and circumferential direction that is spaced away from each of the inner peripheral edge 471, the end edges 473, and the outer peripheral edges 475, 477 by an approximately equal distance. In addition, in the obstructing rubber elastic plate 466, the contact retaining portions defined by the center mounting portion 468, the spoke-shaped retaining portions 472, and the circumference retaining portions 474 are made thicker than the elastic valve portion 476 while being constrained by the dividing wall member 428. This makes spring characteristics of the contact retaining portions 468, 472, and 474 sufficiently more rigid than spring characteristics of the elastic valve portion 476. Since the inner peripheral edge 471 and the end edges 473 of the elastic valve portion 476 are in contact against the contact retaining portions 468, 472, and 474, spring characteristics of the inner peripheral edge 471 and the end edges 473 are made more rigid than the spring characteristics of the outer peripheral edges 475, 477 of the elastic valve portion 476. Furthermore, the end-side outer peripheral edge 477 of the elastic valve portion 476 is in contact against the stepped portion 482 having greater thickness than the circumference retaining portions 474 or the elastic valve portion 476. This makes spring characteristics of the end-side outer peripheral edge 477 of the elastic valve portion 476 more rigid than spring characteristics of the central outer peripheral edge 475.

Figure 50:
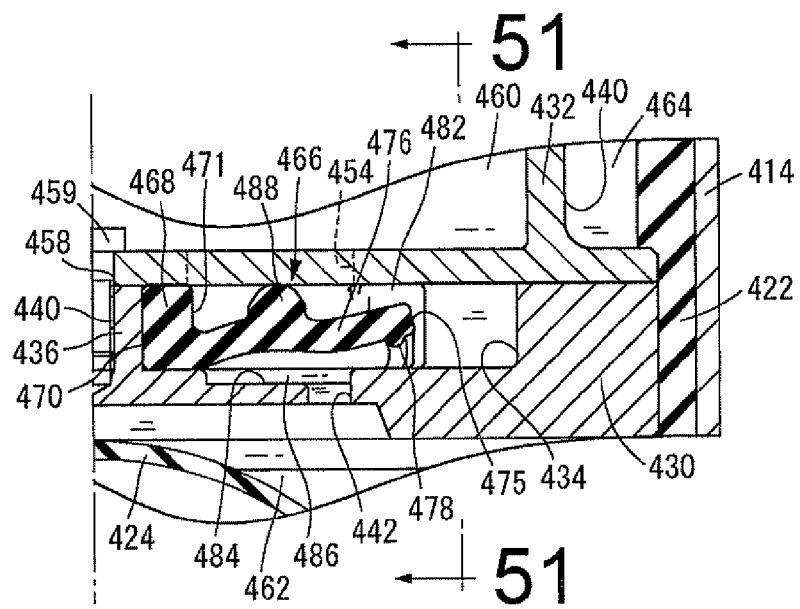
FIG. 50 is an enlarged view in axial or vertical cross section showing a principle part of the automotive engine mount of FIG. 36, in another operation state different from the states shown in FIG. 46 and FIG. 48.
Figure 51:
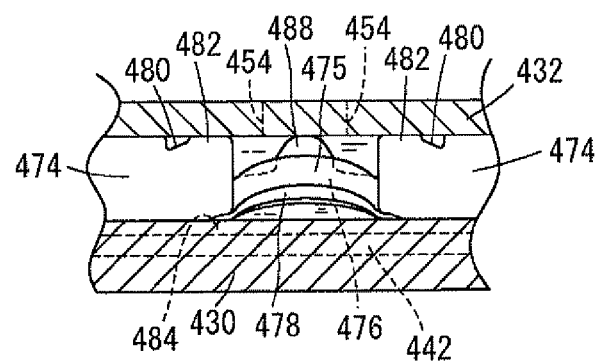
FIG. 51 is a cross sectional view taken along line 51-51 of FIG. 50.

With this arrangement, as depicted in FIGS. 50 and 51, when the contacting projection 488 comes into contact with the pressure receiving chamber-side cover member 432, deformation and displacement of the center section of the elastic valve portion 476 will be limited. Consequently, strain of the elastic valve portion 476 in the direction of separation from the partition member 430 will be concentrated on the central outer peripheral edge 475, which is a soft spring characteristics zone, and at the same time expand from the central outer peripheral edge 475 to the end-side outer peripheral edges 477, 477 on the circumferentially opposite sides where the stepped portions 482 are disposed. As a result, a large amount of deformation of the outer peripheral edges 475, 477 of the elastic valve portion 476 being spaced away from the partition member 430 can be ensured to an extent such that the stepped portion 482 comes into contact with the pressure receiving chamber-side cover member 432.

In the present embodiment in particular, since the contacting projection 488 is made smaller than the elastic valve portion 476 in shape, and provided at the generally center section of the elastic valve portion 476 in the diametrical and circumferential direction. Therefore, the strain as described above will more efficiently arise in the outer peripheral edge 475, 477 side of the elastic valve portion 476. In addition, pressure of the equilibrium chamber 462 is adapted to act on the generally entire lower end face of the elastic valve portion 476 through the communication aperture 442 and via the obstructed space 486 that spreads in the extending direction of superposed surfaces between the partition member 430 and the elastic valve portion 476. Accordingly, a sufficient amount of deformation of the entire elastic valve portion 476 in the direction of separation from the partition member 430 can be attained, thereby ensuring abutment of the contacting projection 488 against the pressure receiving chamber-side cover member 432. Thus, deformation of the center section of the elastic valve portion 476 will be limited, whereby the strain of the elastic valve portion 476 can be more reliably exerted on the outer peripheral edge 475, 477 side. Moreover, the communication aperture 442 of the partition member 430 is formed so as to open in a section thereof that is situated to the outside peripheral side of a forming portion of the contacting projection 488 of the elastic valve portion 476. Consequently, in a state where the contacting projection 488 is in abutment against the pressure receiving chamber-side cover member 432, pressure of the equilibrium chamber 462 will be able to act efficiently on the outside peripheral side of the elastic valve portion 476 through the communication aperture 442. This makes it possible to further increase displacement of the outer peripheral edges 475, 477 of the elastic valve portion 476 away from the partition member 430.

Specifically, in the automotive engine mount 410 according to the present embodiment, the contacting projection 488 is provided not only for limiting elastic deformation of the elastic valve portion 476. It should be noted that the contacting projection 488 is provided at the position that is adapted to limit deformation and displacement of the center section of the elastic valve portion 476 so as to deliberately increase deformation and displacement of the outer peripheral edges 475, 477. Accordingly, it is possible to sufficiently and early achieve an amount of displacement of the outer peripheral edges 475, 477 away from the partition member 430 and hence an amount of opening of the obstructed space 486 with respect to the housing recess 434 in proportion to an amount of relieving liquid pressure from the equilibrium chamber 462 to the pressure receiving chamber 460, where excellent technical achievements exist. Therefore, the pressure receiving chamber 460 and the equilibrium chamber 462 become rapidly and reliably short-circuited via the communication aperture 442, thereby effectively limiting sharp noise or vibration caused by occurrence of cavitation bubbles in the pressure receiving chamber 460.

In the present embodiment, a non-linearizing member is provided to endow non-linear elastic characteristics on the elastic valve portion 476 such that the elastic characteristics become more rigid in a non-linear manner in association with increase in an amount of elastic deformation of the elastic valve portion 476 by the following elements: (I) the contact retaining portions defined by the center mounting portion 468, the spoke-shaped retaining portions 472, and the circumference retaining portions 474 provided around the elastic valve portion 476 being held clamped between the pressure receiving chamber-side cover member 432 and the partition member 430; (II) the stepped portion 482 coming into contact against the pressure receiving chamber-side cover member 432 during elastic deformation of the elastic valve portion 476 being appreciably spaced apart from the partition member 430; (III) the elastic valve portion 476 being positioned in opposition to the bottom wall of the recess 484 of the partition member 430 that defines the obstructed space 486 and coming into contact against the bottom wall depending on pressure differential between the pressure receiving chamber 460 and the equilibrium chamber 462; (IV) the contacting projection 488 being integrally formed with the elastic valve portion 476 and coming into abutment against the pressure receiving chamber-side cover member 432 during elastic deformation of the elastic valve portion 476 being appreciably spaced apart from the partition member 430; and other elements. This arrangement will more advantageously exhibit minute deformation action of the elastic valve portion 476 during input of high-frequency, small-amplitude vibration as well as deformation limiting action of the elastic valve portion 476 during input of low-frequency, large-amplitude vibration.

Additionally, in the present embodiment, the center mounting portion 468 is securely attached to the partition member 430 while the spoke-shaped retaining portions 472 extend from the center mounting portion 468 to the outer peripheral side, with the circumference retaining portions 474 provided so as to extend in the circumferential direction from the distal end portions of the spoke-shaped retaining portions 472. This arrangement makes spring characteristics of the spoke-shaped retaining portions 472 and the circumference retaining portions 474 more rigid than spring characteristics of the elastic valve portions 476 surrounded by the spoke-shaped retaining portions 472 and the circumference retaining portions 474 in the obstructing rubber elastic plate 466. Thus, fastening force of the center mounting portion 468 to the partition member 430 will be transmitted to each of the circumference retaining portions 474 via the plurality of spoke-shaped retaining portions 472 and act as contact retaining force. Accordingly, the obstructing rubber elastic plate 466 can be held in a superposed state more effectively against the partition member 430, thereby more stably achieving intended deformation action of the elastic valve portions 476.

A number of alternative embodiments for the fluid filled type vibration damping device according to the present invention will be shown below, whose construction is different from that of the automotive engine mount 410 according to the eleventh embodiment. In the following description, parts and components that are substantially identical in construction to those in the preceding eleventh embodiment are assigned like symbols and will not be discussed in detail.

Figure 52:
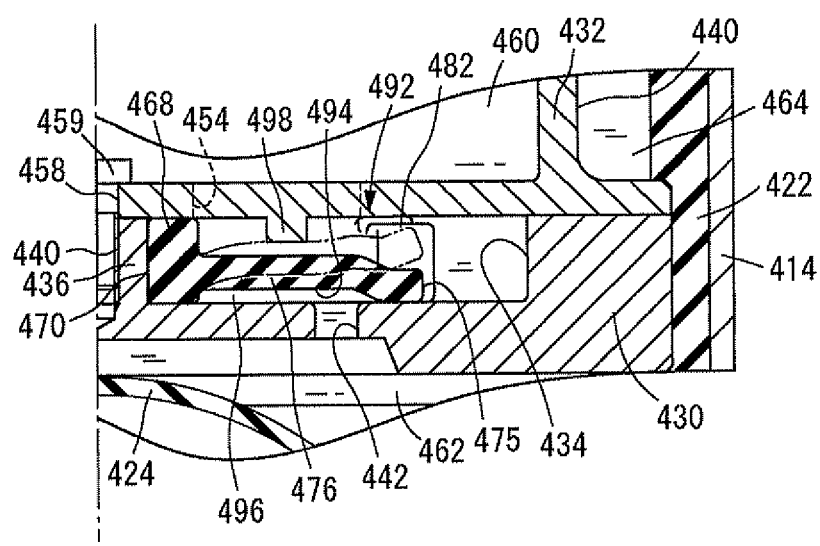
FIG. 52 is an enlarged view in axial or vertical cross section showing a principle part of an automotive engine mount of construction according to a twelfth embodiment of the present invention.

Specifically, referring to FIG. 52, there is depicted a principle part of an automotive engine mount of construction according to a twelfth embodiment of the present invention. The bottom wall of the housing recess 434 of the partition member 430 has a planar shape and the lower end face of the each elastic valve portion 476 of an obstructing rubber elastic plate 492 includes a recess 494 that opens towards the bottom wall of the housing recess 434. Accordingly, in the state where the outer peripheral edge of the obstructing rubber elastic plate 492 is superposed against the bottom wall of the housing recess 434, the recess 494 is covered by the bottom wall of the housing recess 434 thereby forming an obstructed space 496.

In addition, a contacting projection 498 is integrally formed with the pressure receiving chamber-side cover member 432 and projects towards the obstructing rubber elastic plate 492. In the state where the obstructing rubber elastic plate 492 is superposed against the partition member 430, the contacting projection 498 is positioned in opposition to the generally center section of the elastic valve portion 476 in the diametrical and circumferential direction with a given spacing therebetween.

According to the twelfth embodiment as described above, when an excessive or sharp vibration load is input, as indicated by a chain double-dashed line in FIG. 52, the center section of the elastic valve portion 476 will come into contact with the contacting projection 498 of the pressure receiving chamber-side cover member 432. Consequently, strain of the elastic valve portion 476 in the direction of separation from the partition member 430 effectively arises in the outer peripheral edge 475, 477 side. Thus, similar to the eleventh embodiment, a sufficient amount of liquid pressure will be relieved early between the pressure receiving chamber 460 and the equilibrium chamber 462, thereby effectively preventing occurrence of cavitation.

In the present embodiment in particular, the contacting projection 498 is integrally formed with the rigid pressure receiving chamber-side cover member 432, thereby improving durability. Moreover, the recess 494 can be easily realized by utilizing the shape of the obstructing rubber elastic plate 492. In addition, since the recess 494 and the contacting projection 498 are not integrally formed with the obstructing rubber elastic plate 492, the mold of the obstructing rubber elastic plate 492 can be fabricated through a simple structure.

Figure 53:
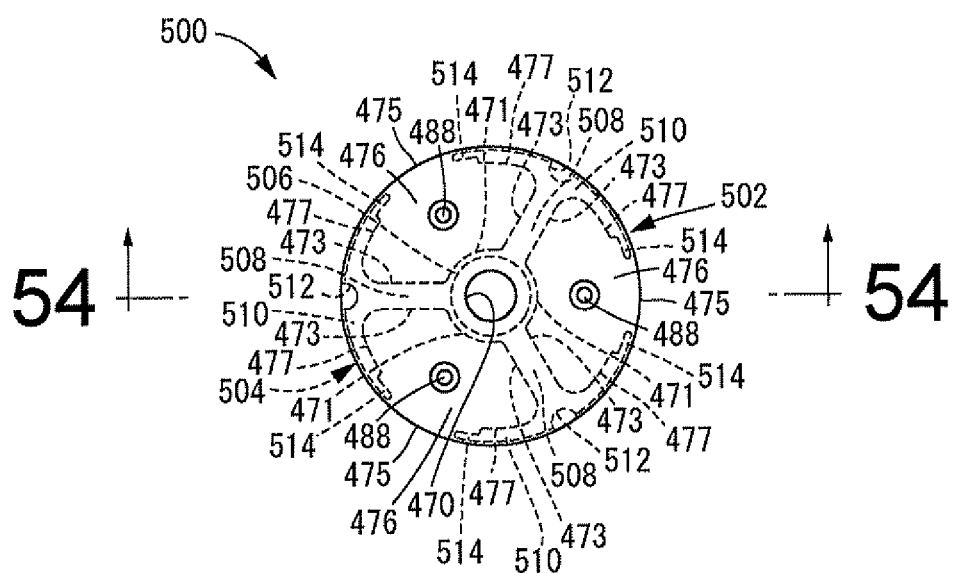
FIG. 53 is a top plane view of an obstructing rubber elastic plate employed in an automotive engine mount of construction according to a thirteenth embodiment of the present invention.
Figure 54:
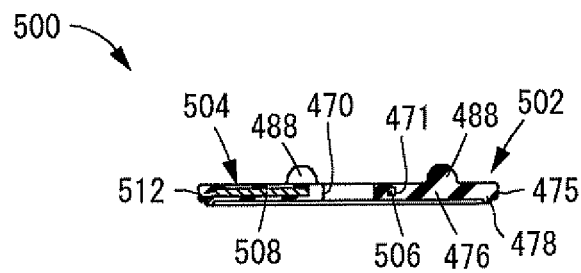
FIG. 54 is a cross sectional view taken along line 54-54 of FIG. 53.

There might also be employed a structure of an automotive engine mount as a thirteenth embodiment according to the present invention whereby an obstructing rubber elastic plate 500 depicted in FIGS. 53 and 54 is employed. That is, the obstructing rubber elastic plate 500 has a structure wherein a rubber plate 502 of flat shape having generally unchanging thick dimension is employed and a reinforcing member 504 of metal that is more rigid than the rubber plate 502 is anchored to the rubber plate 502 by being embedded therein.

More specifically, a small-diameter boss-shaped portion 506 serving as a center mounting portion is formed in the diametrically center section of the reinforcing member 504 and disposed around the borehole 470 situated in the diametrical center of the rubber plate 502. A plurality of spoke-shaped portions 508 serving as spoke-shaped retaining portions are disposed extending radially from the center of the rubber plate 502 towards the outside in the diametrical direction. Moreover, split rim portions 510 circumferentially extending in arcuate shape are integrally formed with the distal end portions of the spoke-shaped portions 508 and each of the split rim portions 510 is disposed along the outer peripheral edge of the rubber plate 502. The elastic valve portion 476 is constituted by the generally fan-shaped portion where the reinforcing member 504 is not disposed in the rubber plate 502. Furthermore, a notched portion 512 is formed at the distal end portion of the spoke-shaped portion 508 extending diametrically outward from the boss-shaped portion 506, in other words, at the outer peripheral edge of the circumferentially center section of the split rim portion 510.

In addition, an extended retaining portion 514 is integrally formed with the each circumferential end portion of the split rim portion 510 so as to extend towards the elastic valve portion 476 in the circumferential direction. The extended retaining portion 514 is made smaller than the split rim portion 510, thereby being imparted low rigidity. The extended retaining portion 514 provides a low rigidity portion of the reinforcing member 504 so that elastic characteristics of the elastic valve portion 476 are made more rigid in the end-side outer peripheral edges 477 than in the central outer peripheral edge 475.

Figure 55:
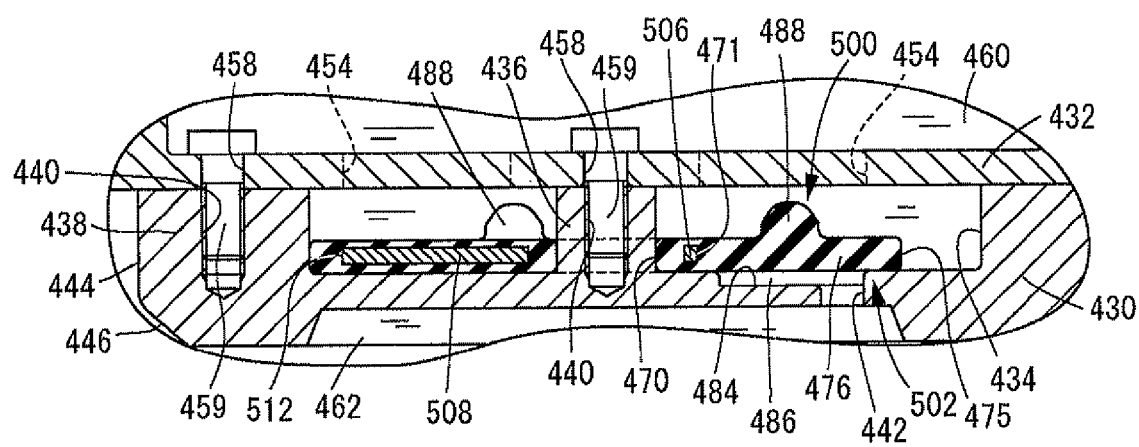
FIG. 55 is an enlarged view in axial or vertical cross section showing a principle part of the automotive engine mount wherein the obstructing rubber elastic plate of FIG. 53 is employed.

As depicted in FIG. 55, the obstructing rubber elastic plate 500 as described above is superposed against the bottom wall of the housing recess 434 so that the each elastic valve portion 476 covers the corresponding recess 484 of the partition member 430. In this state, all parts of the obstructing rubber elastic plate 500 including the contacting projection 488 provided at the center section of the elastic valve portion 476 in the diametrical and circumferential direction are positioned in opposition to the pressure receiving chamber-side cover member 432 with a given spacing therebetween.

Here, the boss-shaped portion 506 of the reinforcing member 504 is secured fitting around the center projection 436 of the partition member 430 via the rubber plate 502 while the each notched portion 512 is secured fitting to the corresponding outside peripheral projection 438 of the partition member 430 via the rubber plate 502. With this arrangement, the obstructing rubber elastic plate 500 is partially constrained by the partition member 430 via the reinforcing member 504, thereby being held in contact against the partition member 430.

Specifically, in the automotive engine mount according to the thirteenth embodiment, owing to the contacting projection 488 provided at the center section of the elastic valve portion 476, a sufficient amount of liquid pressure will be relieved early between the pressure receiving chamber 460 and the equilibrium chamber 462, thereby effectively preventing occurrence of cavitation, similar to the eleventh and twelfth embodiments. Additionally, in particular, since the contact retaining portions that hold the obstructing rubber elastic plate 500 in contact against the partition member 430 is defined by the reinforcing member 504, it is possible to achieve more improved durability while at the same time ensuring deformation characteristics of the elastic valve portion 476. Moreover, the obstructing rubber elastic plate 500 is held by the partition member 430 only, thereby avoiding troubles including the one wherein difference in dimension between the partition member 430 and the pressure receiving chamber-side cover member 432 or variation in screw-fastening force on the partition member 430 among individual fastening machine screws 459 makes it difficult to achieve uniform retaining force of the contact retaining portions throughout the entirety.

While the present invention has been described in detail in terms of the eleventh through thirteenth embodiments, it is to be understood that the invention is by no means limited to the specific disclosure of the illustrated embodiments, and may be embodied with various changes, modifications and improvements which may occur to those skilled in the art without departing from the spirit and scope of the invention.

For example, in the preceding eleventh through thirteenth embodiments, in the initial state wherein the obstructing rubber elastic plate 466, 492, 500 is superposed against the partition member 430 and no vibration is input to the device, the contacting projection 488, 498 formed projecting from one of the obstructing rubber elastic plate 466, 492, 500 and the pressure receiving chamber-side cover member 432 is positioned spaced apart from the other. However, the contacting projection 488, 498 may alternatively be disposed in contact against the other. With this arrangement, it would be possible that in association with vibration input, the elastic valve portion 476 becomes spaced apart from the partition member 430 so that the contacting projection 488, 498 is pressed against the other, whereby elastic deformation limiting behavior will affect the center section of the elastic valve portion 476. In this respect, in the initial state wherein the contacting projection 488, 498 is disposed in contact against the other, the contacting projection 488, 498 is preferably in contact against the other without being compressively deformed, in consideration of effective deformation characteristics or the like during input of high-frequency, small-amplitude vibration.

The contacting projections 488, 498 are not limited to those taught herein by way of example. It would also be acceptable for example that two or more contacting projections are provided for limiting the amount of deformation of the each elastic valve portion 476. The contacting projections may also be provided to both of the elastic valve portion 476 and the pressure receiving chamber-side cover member 432. In this case, these contacting projections may mutually come into contact against each other, or may individually come into contact against the elastic valve portion 476 and the pressure receiving chamber-side cover member 432 respectively.

Alternatively, a contacting projection made of rigid member or rubber material may be formed separately from the elastic valve portion 476 or the pressure receiving chamber-side cover member 432 and be affixed to at least one of the elastic valve portion 476 and the pressure receiving chamber-side cover member 432. As a specific example, it would be possible that a part of the reinforcing member 504 according to the thirteenth embodiment extends into the elastic valve portion 476 and the extended portion projects from the rubber plate 502 towards the pressure receiving chamber-side cover member 432 so as to define the contacting projection. In order to reduce contact noise between this contacting projection and the pressure receiving chamber-side cover member 432, it is desirable that a rubber layer would be affixed to at least one of the contacting projection and the pressure receiving chamber-side cover member 432.

Moreover, the circumference retaining portion 474, the stepped portion 482, the split rim portion 510, and the extended retaining portion 514 of the obstructing rubber elastic plate 466, 492, 500 are not indispensable elements, neither are the obstructed space 486, 496 or the like that are formed between the superposed surfaces between the obstructing rubber elastic plate 466, 492, 500 and the partition member 430.

Furthermore, in the preceding eleventh through thirteenth embodiments, the center mounting portion 468 of the obstructing rubber elastic plate 466, 492, 500 or the boss-shaped portion 506 of the reinforcing member 504 is secured fitting around the center projection 436 of the partition member 430 while the center mounting portion 468 and the spoke-shaped retaining portion 472 are held clamped by the dividing wall member 428 or the spoke-shaped portion 508 of the reinforcing member 504 is supported between the boss-shaped portion 506 and the outside peripheral projection 438 of the partition member 430, thereby defining the contact retaining portions of the obstructing rubber elastic plate 466, 492, 500 against the partition member 430. However, it would also be possible for example to define the contact retaining portions by securing a diametrically center section of the obstructing rubber elastic plate 466, 492, 500 or a plurality of portions that extend radially from the diametrically center section to at least one of the pressure receiving chamber-side cover member 432 and the partition member 430 with machine screws, bolts, or the like.

Whereas the automotive engine mount 10, 210, 410 according to the preceding first through thirteenth embodiments employs a construction wherein a single orifice passage 64, 264, 464 is provided, it would also be possible to employ a plurality of orifice passages.

In addition, in the preceding first through thirteenth embodiments, the present invention has been shown reduced to practice in an automotive engine mount by way of example. However, the present invention may also be implemented in automotive body mounts, differential mounts, suspension mounts, suspension bushings etc., or in fluid filled type vibration damping devices for various types of vibrating bodies in non-automotive applications.

KEY TO SYMBOLS

10, 210, 410: automotive engine mount (fluid filled type vibration damping device); 12, 212, 412: first mounting member; 14, 214, 414: second mounting member; 16, 216, 416: main rubber elastic body; 24, 224, 424: flexible film; 30, 230, 430: partition member; 32, 232: pressure receiving chamber-side cover member (press retaining portion); 432: pressure receiving chamber-side cover member; 42, 242, 442: communication aperture; 56, 256, 456: communication hole; 60, 260, 460: pressure receiving chamber; 62, 262, 462: equilibrium chamber; 64, 264, 464: orifice passage; 66, 84, 88, 90, 96, 100, 266, 288, 292, 300, 466, 492, 500: obstructing rubber elastic plate; 68, 268, 468: center mounting portion (contact retaining portions); 72, 272, 472: spoke-shaped retaining portion (contact retaining portions); 74, 274, 474: circumference retaining portion (contact retaining portions); 76, 276, 476: elastic valve portion (elastic deformation zone); 282: stepped portion (elastic deformation zone); 78, 278, 478: seal rib; 82, 98: stepped portion (opposing contact projection); 86: abutting projection (opposing contact projection); 94: opposing contact projection; 104, 304, 504: reinforcing member; 114, 314, 514: extended retaining portion; 284, 484: recess; 286, 296, 486, 496: obstructed space; 294, 494: recess; 488, 498: contacting projection; 506: boss-shaped portion (center mounting portion); 508: spoke-shaped portion (spoke-shaped retaining portion)

The invention claimed is:

1. A fluid filled type vibration damping device comprising:
   a first mounting member and a second mounting member linked by a main rubber elastic body;
   a pressure receiving chamber whose wall is partially defined by the main rubber elastic body; and
   an equilibrium chamber whose wall is partially defined by a flexible film, the pressure receiving chamber and the equilibrium chamber being filled with a non-compressible fluid, and the pressure receiving chamber and the equilibrium chamber communicating with each other through an orifice passage, wherein
   a partition member that partitions the pressure receiving chamber and the equilibrium chamber is provided with a communication aperture that connects the pressure receiving chamber and the equilibrium chamber,
   an obstructing rubber elastic plate is superposed against the communication aperture from a pressure receiving chamber side so as to obstruct the communication aperture, and is arranged such that pressure of the pressure receiving chamber acts upon a first face of the obstructing rubber elastic plate while pressure of the equilibrium chamber acts on another face thereof through the communication aperture,
   a plurality of contact retaining portions that are held in contact against the partition member are arranged circumferentially on an outer peripheral edge of the obstructing rubber elastic plate,
   an elastic deformation zone is arranged circumferentially between the contact retaining portions adjacently situated on the obstructing rubber elastic plate, so as to undergo elastic deformation on a basis of pressure differential between the pressure receiving chamber and the equilibrium chamber to be spaced away from the partition member to cause the communication aperture to open up, and
   a non-linearizing member is provided to endow non-linear elastic characteristics on the elastic deformation zone of the obstructing rubber elastic plate such that the elastic characteristics become more rigid in a non-linear manner in association with increase in an amount of elastic deformation of the elastic deformation zone.

2. The fluid filled type vibration damping device according to claim 1, wherein
   a center mounting portion is integrally formed in a center section of the obstructing rubber elastic plate,
   the center mounting portion is securely attached to the partition member,
   at least one spoke-shaped retaining portion that extends radially from the center mounting portion towards an outer peripheral side is provided, and
   the contact retaining portions are provided so as to extend in a circumferential direction from a distal end portion of the spoke-shaped retaining portion.

3. The fluid filled type vibration damping device according to claim 1, wherein
   a center mounting portion is integrally formed in a center section of the obstructing rubber elastic plate,
   the center mounting portion is securely attached to the partition member,
   at least one spoke-shaped retaining portion that extends radially from the center mounting portion towards an outer peripheral side is provided,
   a circumference retaining portion that extends in a circumferential direction from a distal end portion of the spoke-shaped retaining portion is provided, and
   in the obstructing rubber elastic plate, spring characteristics of the spoke-shaped retaining portion and the circumference retaining portion are made more rigid than that of a zone surrounded by the spoke-shaped retaining portion and the circumference retaining portion so that the contact retaining portions comprise the center mounting portion, the spoke-shaped retaining portion, and the circumference retaining portion.

4. The fluid filled type vibration damping device according to claim 1, wherein
   the contact retaining portions comprise thick rubber portions,
   a press retaining portion is provided on an opposite side of the partition member with the thick rubber portions being interposed therebetween,
   the thick rubber portions are pressed against the partition member by the press retaining portion and held elastically clamped therebetween,
   the elastic deformation zone situated circumferentially between the thick rubber portions is made thinner than the thick rubber portions, and a thickness dimension of the elastic deformation zone changes so as to become smaller gradually or in a stepwise manner from the thick rubber portions located on circumferentially opposite sides thereof towards a circumferentially center section thereof so as to constitute the non-linearizing member.

5. The fluid filled type vibration damping device according to claim 1, wherein a reinforcing member that is more rigid than the main rubber elastic body is attached to the outer peripheral edge of the obstructing rubber elastic plate so as to constitute the contact retaining portions while the elastic deformation zone situated circumferentially between the contact retaining portions is not attached by the reinforcing member and is allowed to readily deform, the reinforcing member is provided an extended retaining portion that extends in a circumferential direction from the contact retaining portions towards the elastic deformation zone and has lower rigidity than the contact retaining portions, and the extended retaining portion makes the elastic characteristics of the elastic deformation zone more rigid in circumferentially opposite sides rather than in a circumferentially center section so as to constitute the non-linearizing member.

6. The fluid filled type vibration damping device according to claim 2, wherein a reinforcing member that is integrally furnished with the center mounting portion and the at least one spoke-shaped retaining portion comprising a plurality of the spoke-shaped retaining portions is employed, and the reinforcing member partially limits elastic deformation of the obstructing rubber elastic plate so as to constitute the contact retaining portions.

7. The fluid filled type vibration damping device according to claim 2, wherein the center mounting portion and the plurality of the spoke-shaped retaining portions are integrally formed with the obstructing rubber elastic plate so as to constitute the contact retaining portions.

8. The fluid filled type vibration damping device according to claim 1, wherein a pressure receiving chamber-side cover member is provided for covering the elastic deformation zone of the obstructing rubber elastic plate from the pressure receiving chamber side with a gap therebetween, an opposing contact projection is provided projecting from one of opposed faces of the elastic deformation zone and the pressure receiving chamber-side cover member towards another with a distal end portion thereof opposing to the other with a given spacing therebetween, and the elastic deformation zone is adapted to undergo elastic deformation so as to be separated away from the partition member with the opposing contact projection coming into contact with the other to constitute the non-linearizing member.

9. The fluid filled type vibration damping device according to claim 1, wherein a pressure receiving chamber-side cover member is provided for covering the obstructing rubber elastic plate from the pressure receiving chamber side with a gap therebetween, and the pressure receiving chamber-side cover member is provided with a communication hole that connects an inside area between the pressure receiving chamber-side cover member and the obstructing rubber elastic plate with the pressure receiving chamber at a location away from an opposed portion against the elastic deformation zone of the obstructing rubber elastic plate.

10. The fluid filled type vibration damping device according to claim 1, wherein the obstructing rubber elastic plate is superposed against and disposed on a center section of the partition member, and the orifice passage is formed so as to extend along an outside peripheral section of the partition member in a circumferential direction.

11. A fluid filled type vibration damping device comprising:

a first mounting member and a second mounting member linked by a main rubber elastic body;

a pressure receiving chamber whose wall is partially defined by the main rubber elastic body; and an equilibrium chamber whose wall is partially defined by a flexible film, the pressure receiving chamber and the equilibrium chamber being filled with a non-compressible fluid, and the pressure receiving chamber and the equilibrium chamber communicating with each other through an orifice passage, wherein a partition member that partitions the pressure receiving chamber and the equilibrium chamber is provided with a communication aperture that connects the pressure receiving chamber and the equilibrium chamber, an obstructing rubber elastic plate is superposed against the communication aperture from a pressure receiving chamber side so as to obstruct the communication aperture, and is arranged such that pressure of the pressure receiving chamber acts upon a first face of the obstructing rubber elastic plate while pressure of the equilibrium chamber acts on another face thereof through the communication aperture, a plurality of contact retaining portions that are held in contact against the partition member are arranged circumferentially on an outer peripheral edge of the obstructing rubber elastic plate, an elastic deformation zone is arranged circumferentially between the contact retaining portions adjacently situated on the obstructing rubber elastic plate, so as to undergo elastic deformation on a basis of pressure differential between the pressure receiving chamber and the equilibrium chamber to be spaced away from the partition member to cause the communication aperture to open up, a non-linearizing member is provided to endow non-linear elastic characteristics on the elastic deformation zone of the obstructing rubber elastic plate such that the elastic characteristics become more rigid in a non-linear manner in association with increase in an amount of elastic deformation of the elastic deformation zone, an excess pressure avoiding mechanism is provided in which the obstructing rubber elastic plate is adapted to undergo elastic deformation on the basis of pressure differential between the pressure receiving chamber and the equilibrium chamber so that the outer peripheral edge of the obstructing rubber elastic plate is separated from the partition member so as to cause the communication aperture to open up, an obstructed space is formed so as to extend between superposed surfaces between the partition member and the obstructing rubber elastic plate, and the communication aperture is connected with an outer peripheral portion of the obstructed space so that the pressure of the equilibrium chamber adapted to act on the obstructing rubber elastic plate through the communication aperture acts thereon via the obstructed space.

12. The fluid filled type vibration damping device according to claim 11, wherein
a recess is formed on at least one of superposed surfaces between the partition member and the obstructing rubber elastic plate, and
the obstructed space is defined by the recess being covered.

13. A fluid filled type vibration damping device comprising:
a first mounting member and a second mounting member linked by a main rubber elastic body;
a pressure receiving chamber whose wall is partially defined by the main rubber elastic body; and
an equilibrium chamber whose wall is partially defined by a flexible film, the pressure receiving chamber and the equilibrium chamber being filled with a non-compressible fluid, and the pressure receiving chamber and the equilibrium chamber communicating with each other through an orifice passage, wherein
a partition member that partitions the pressure receiving chamber and the equilibrium chamber is provided with a communication aperture that connects the pressure receiving chamber and the equilibrium chamber,
an obstructing rubber elastic plate is superposed against the communication aperture from a pressure receiving chamber side so as to obstruct the communication aperture, and is arranged such that pressure of the pressure receiving chamber acts upon a first face of the obstructing rubber elastic plate while pressure of the equilibrium chamber acts on another face thereof through the communication aperture,
a plurality of contact retaining portions that are held in contact against the partition member are arranged circumferentially on an outer peripheral edge of the obstructing rubber elastic plate,
an elastic deformation zone is arranged circumferentially between the contact retaining portions adjacently situated on the obstructing rubber elastic plate, so as to undergo elastic deformation on a basis of pressure differential between the pressure receiving chamber and the equilibrium chamber to be spaced away from the partition member to cause the communication aperture to open up,
a non-linearizing member is provided to endow non-linear elastic characteristics on the elastic deformation zone of the obstructing rubber elastic plate such that the elastic characteristics become more rigid in a non-linear manner in association with increase in an amount of elastic deformation of the elastic deformation zone,
the contact retaining portions, which are held in contact against the partition member on the obstructing rubber elastic plate, include a center mounting portion located in a center section of the obstructing rubber elastic plate and a plurality of spoke-shaped retaining portions that extend radially from the center mounting portion towards an outer peripheral side,
a zone situated circumferentially between the spoke-shaped retaining portions that are adjacently situated in a circumferential direction on the obstructing rubber elastic plate defines the elastic deformation zone adapted to undergo elastic deformation on the basis of pressure differential between the pressure receiving chamber and the equilibrium chamber such that the elastic deformation zone undergoes elastic deformation in a direction of separation from the partition member so as to cause the communication aperture to become an open state via an outer peripheral edge of the elastic deformation zone, and
the elastic deformation zone is provided with an elastic deformation limiting member in a center section thereof that is spaced away from both the spoke-shaped retaining portions located on circumferentially opposite sides thereof and the outer peripheral edge thereof such that the elastic deformation limiting member is adapted to limit an amount of displacement of the elastic deformation zone in the direction of separation from the partition member.

14. The fluid filled type vibration damping device according to claim 13, wherein
a pressure receiving chamber-side cover member is provided for covering the elastic deformation zone of the obstructing rubber elastic plate from the pressure receiving chamber side with a gap therebetween,
a contacting projection is provided projecting from one of opposed faces of the elastic deformation zone and the pressure receiving chamber-side cover member towards another with a distal end portion thereof opposing to the other with a given spacing therebetween, and
the elastic deformation zone is adapted to undergo elastic deformation so as to be spaced away from the partition member with the contacting projection coming into contact with the other so as to constitute the elastic deformation limiting member.

15. The fluid filled type vibration damping device according to claim 14, wherein the communication aperture of the partition member is formed so as to open in a section thereof that is situated to the outside peripheral side of a forming portion of the contacting projection between the opposed faces of the elastic deformation zone of the obstructing rubber elastic plate and the pressure receiving chamber-side cover member.

16. A fluid filled type vibration damping device comprising:
a first mounting member and a second mounting member linked by a main rubber elastic body;
a pressure receiving chamber whose wall is partially defined by the main rubber elastic body; and
an equilibrium chamber whose wall is partially defined by a flexible film, the pressure receiving chamber and the equilibrium chamber being filled with a non-compressible fluid, and the pressure receiving chamber and the equilibrium chamber communicating with each other through an orifice passage, wherein
a partition member that partitions the pressure receiving chamber and the equilibrium chamber is provided with a communication aperture that connects the pressure receiving chamber and the equilibrium chamber,
an obstructing rubber elastic plate is superposed against the communication aperture from a pressure receiving chamber side so as to obstruct the communication aperture, and is arranged such that pressure of the pressure receiving chamber acts upon a first face of the obstructing rubber elastic plate while pressure of the equilibrium chamber acts on another face thereof through the communication aperture,
a plurality of contact retaining portions that are held in contact against the partition member are arranged circumferentially on an outer peripheral edge of the obstructing rubber elastic plate,
an elastic deformation zone is arranged circumferentially between the contact retaining portions adjacently situated on the obstructing rubber elastic plate, so as to undergo elastic deformation on a basis of pressure differential between the pressure receiving chamber and the equilibrium chamber to be spaced away from the partition member to cause the communication aperture to open up, a non-linearizing member is provided to endow non-linear elastic characteristics on the elastic deformation zone of the obstructing rubber elastic plate such that the elastic characteristics become more rigid in a non-linear manner in association with increase in an amount of elastic deformation of the elastic deformation zone, an annular seal rib is integrally formed with an outside peripheral section of the obstructing rubber elastic plate so as to project from an opposed face thereof against the partition member and extend continuously about an entire circumference in a circumferential direction, and in a superposed state of the obstructing rubber elastic plate against the partition member, the seal rib is positioned in abutment with the partition member.

* * * * *